US012652672B2

(12) United States Patent
Jang et al.

(10) Patent No.: US 12,652,672 B2
(45) Date of Patent: Jun. 9, 2026

(54) METHOD AND APPARATUS FOR TRANSMITTING DATA IN NETWORK COOPERATIVE COMMUNICATIONS

(71) Applicant: Samsung Electronics Co., Ltd., Suwon-si (KR)

(72) Inventors: Youngrok Jang, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 17/736,591

(22) Filed: May 4, 2022

(65) Prior Publication Data

US 2022/0408468 A1 Dec. 22, 2022

(30) Foreign Application Priority Data

May 6, 2021 (KR) ......................... 10-2021-0058771

(51) Int. Cl.
| | |
|---|---|
| *H04W 72/23* | (2023.01) |
| *H04L 5/00* | (2006.01) |
| *H04W 72/1273* | (2023.01) |

(52) U.S. Cl.
CPC ........... *H04W 72/23* (2023.01); *H04L 5/0035* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 2020/0351926 A1* | 11/2020 | Bagheri | ................ | H04W 72/23 |
| 2020/0367208 A1 | 11/2020 | Khoshnevisan et al. | | |
| 2021/0014837 A1* | 1/2021 | Papasakellariou | .... | H04L 5/0053 |
| 2022/0070895 A1 | 3/2022 | Gao et al. | | |

(Continued)

FOREIGN PATENT DOCUMENTS

| | | |
|---|---|---|
| WO | 2020/140838 A1 | 7/2020 |
| WO | 2021/091361 A1 | 5/2021 |

OTHER PUBLICATIONS

OPPO, "Text proposals for M-TRP transmission", 3GPP TSG RAN WG1 #104b-e e-Meeting, Apr. 12-20, 2021, R1-2102373.*

(Continued)

*Primary Examiner* — Abdullahi Ahmed
*Assistant Examiner* — Ahmed Saifuddin
(74) *Attorney, Agent, or Firm* — Jefferson IP Law, LLP

(57) ABSTRACT

A method, performed by a user equipment (UE), in a wireless communication system is provided. The method includes transmitting, to a base station (BS), UE capability for physical downlink shared channel (PDSCH) reception, receiving, from the BS, configuration information related to control information, receiving, from the BS, the control information based on the configuration information, identifying that information related to transmission configuration indication (TCI) state is not included in the received control information, determining whether PDSCH transmission scheduled by the control information is based on single-transmission and reception point (TRP) or multi-TRP, and receiving, from the BS, the scheduled PDSCH based on the determination.

16 Claims, 27 Drawing Sheets

(56) References Cited

U.S. PATENT DOCUMENTS

| | | | |
|---|---|---|---|
| 2024/0205925 A1* | 6/2024 | Matsumura | H04W 72/23 |
| 2024/0276338 A1* | 8/2024 | Jung | H04W 48/20 |

OTHER PUBLICATIONS

OPPO, "Text proposals for M-TRP transmission", 3GPP TSG RAN WG1#104b-e e-Meeting, Apr. 12-20, 2021, R1-2102373 (Year: 2021).*

Samsung, "Enhancements on Multi-TRP for PDCCH, PUCCH and PUSCH", 3GPP TSG RAN WG1 #104b-e R1-2103222, e-Meeting, Apr. 12-20, 2021.

OPPO, "Text proposals for M-TRP transmission", 3GPP TSG RAN WG1 #104b-e, R1-2102373, e-Meeting, Apr. 12-20, 2021.

Moderator (Qualcomm), "Summary #2 of email discussions [104b-e-NR-feMIMO-02] for mTRP, PDCCH enhancements", 3GPP TSG-RAN WG1 Meeting #104-bis-e, R1-2103820, e-Meeting, Apr. 12-Apr. 20, 2021.

International Search Report dated Aug. 10, 2022, in International Application No. PCT/KR2022/006424.

Extended European Search Report dated Sep. 4, 2024, issued in European Patent Application No. 22799129.6.

Korean Office Action dated Mar. 27, 2026, issued in Korean Patent Application No. 10-2021-0058771.

* cited by examiner

FIG. 6

TCI state #0      TCI state #1      TCI state #2

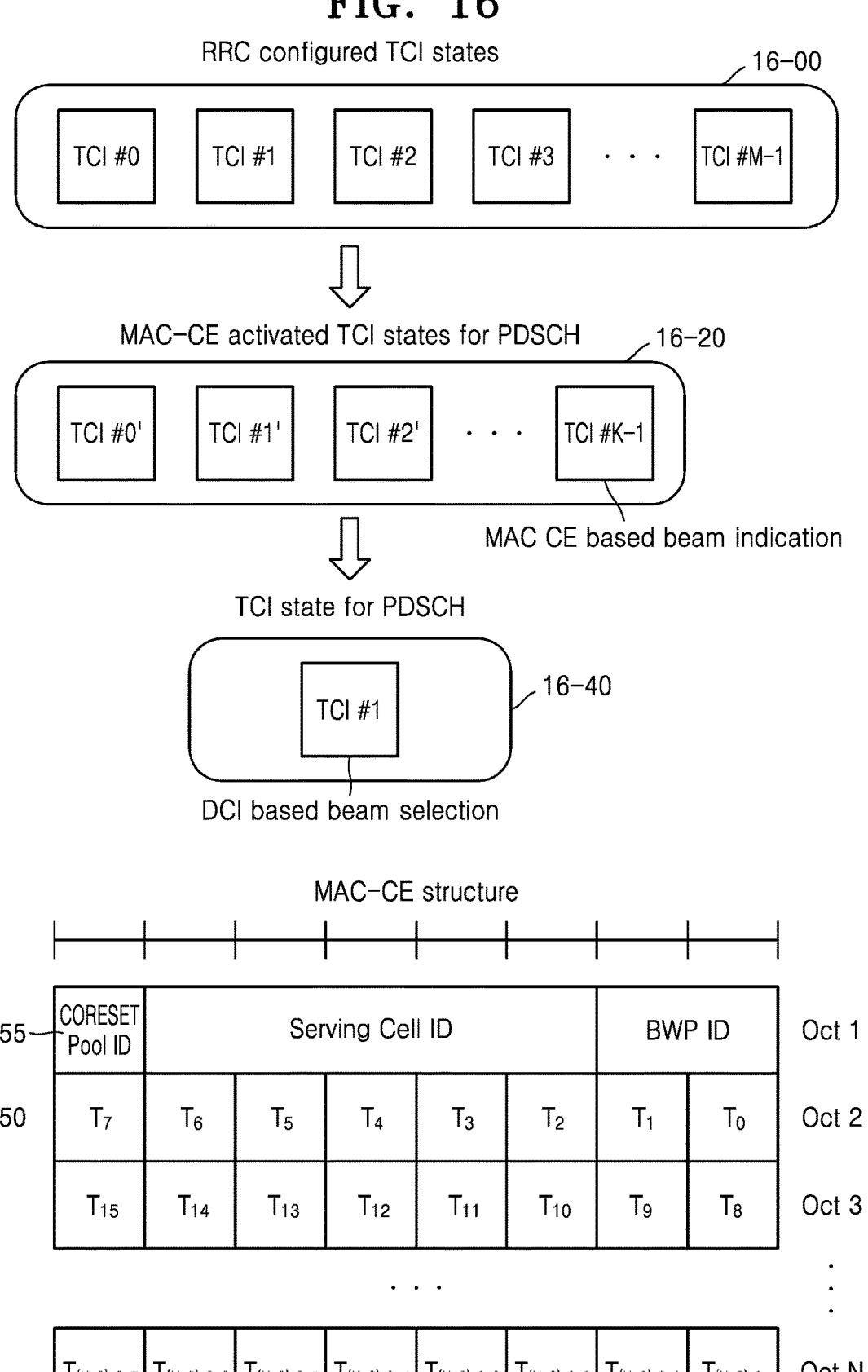

RRC configured TCI states 16-00

| TCI #0 | TCI #1 | TCI #2 | TCI #3 | · · · | TCI #M-1 |

MAC-CE activated TCI states for PDSCH 16-20

| TCI #0' | TCI #1' | TCI #2' | · · · | TCI #K-1 |

MAC CE based beam indication

TCI state for PDSCH

| TCI #1 |

16-40

DCI based beam selection

MAC-CE structure

| 16-55 | CORESET Pool ID | Serving Cell ID | | | | | BWP ID | | Oct 1 |
|---|---|---|---|---|---|---|---|---|---|
| 16-50 | $T_7$ | $T_6$ | $T_5$ | $T_4$ | $T_3$ | $T_2$ | $T_1$ | $T_0$ | Oct 2 |
| | $T_{15}$ | $T_{14}$ | $T_{13}$ | $T_{12}$ | $T_{11}$ | $T_{10}$ | $T_9$ | $T_8$ | Oct 3 |
| | · · · | | | | | | | | |
| | $T_{(N-2)x8+7}$ | $T_{(N-2)x8+6}$ | $T_{(N-2)x8+5}$ | $T_{(N-2)x8+4}$ | $T_{(N-2)x8+3}$ | $T_{(N-2)x8+2}$ | $T_{(N-2)x8+1}$ | $T_{(N-2)x8}$ | Oct N |

METHOD AND APPARATUS FOR TRANSMITTING DATA IN NETWORK COOPERATIVE COMMUNICATIONS

CROSS-REFERENCE TO RELATED APPLICATION(S)

This application is based on and claims priority under 35 U.S.C. § 119(a) of a Korean patent application number 10-2021-0058771, filed on May 6, 2021, in the Korean Intellectual Property Office, the disclosure of which is incorporated by reference herein in its entirety.

BACKGROUND

1. Field

The disclosure relates to operations of a user equipment (UE) and a base station (BS) in a wireless communication system. More particularly, the disclosure relates to a method of transmitting data in network cooperative communications and an apparatus capable of performing the method.

2. Description of Related Art

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems (including New Radio (NR) communication system) to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, methods for seamlessly providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for further effectively providing a service in a mobile communication system.

Additional aspects will be set forth in part in the description which follows and, in part, will be apparent from the description, or may be learned by practice of the presented embodiments.

In accordance with an aspect of the disclosure, a method, performed by a user equipment (UE), in a wireless communication system is provided. The method includes transmitting, to a base station (BS), UE capability for physical downlink shared channel (PDSCH) reception, receiving, from the BS, configuration information related to control information, receiving, from the BS, the control information based on the configuration information, identifying that information related to transmission configuration indication (TCI) state is not included in the received control information, determining whether PDSCH transmission scheduled by the control information is based on single-transmission and reception point (TRP) or multi-TRP, and receiving, from the BS, the scheduled PDSCH based on the determination.

In accordance with another aspect of the disclosure, a user equipment (UE) in a wireless communication system is provided. The UE includes a transceiver configured to transmit or receive a signal to or from a base station (BS), a memory, and a processor connected with the transceiver and the memory. In the embodiment, the processor is configured to transmit, to the BS, UE capability for physical downlink shared channel (PDSCH) reception, receive, from the BS, configuration information related to control information, receive, from the BS, the control information based on the configuration information, identify that information related to TCI state is not included in the received control information, determine whether PDSCH transmission scheduled by the control information is based on single-TRP or multi-TRP, and receive, from the BS, the scheduled PDSCH based on the determination.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an example of a Discontinuous Reception (DRX) operation in a wireless communication system according to an embodiment of the disclosure;

FIG. 10 is a diagram illustrating an example of beam configuration of a control resource set and search space in a wireless communication system according to an embodiment of the disclosure;

FIG. 16 illustrates a procedure for beam configuration and activation for a PDSCH according to an embodiment of the disclosure;

Throughout the drawings, it should be noted that like reference numbers are used to depict the same or similar elements, features, and structures.

DETAILED DESCRIPTION

Figure 1:
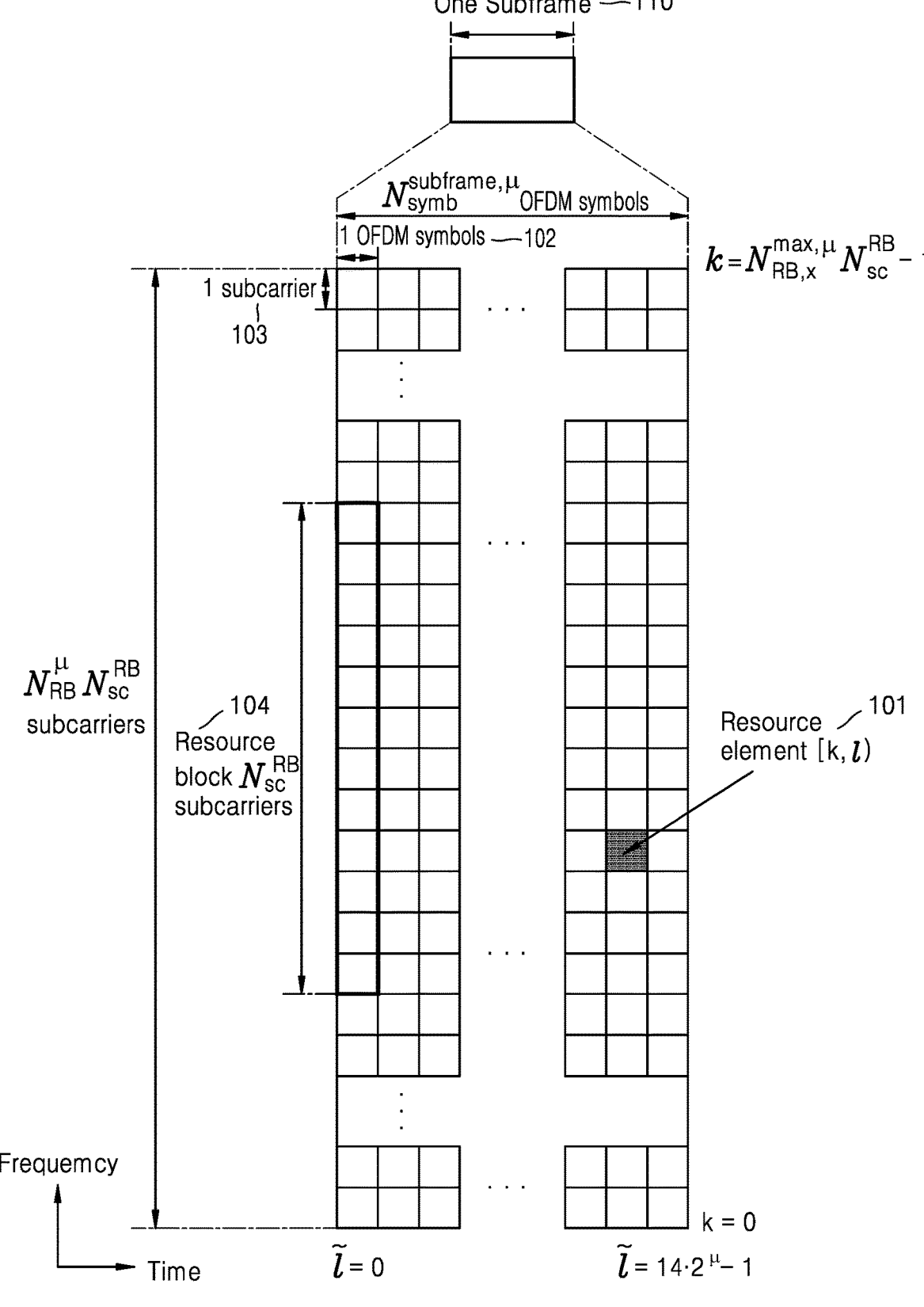
FIG. 1 is a diagram illustrating a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. In the descriptions of the disclosure, well-known functions or configurations are not described in detail when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the present specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station is an entity that allocates resources to a terminal, and may be at least one of a next generation Node B (gNB), an evolved Node B (eNB), a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. In the disclosure, a downlink (DL) refers to a wireless transmission path of a signal to be transmitted from a base station (BS) to a UE, and an uplink (UL) refers to a wireless transmission path of a signal to be transmitted from a UE to a BS. Although the following descriptions may provide about long term evolution (LTE) or LTE-Advanced (LTE-A) systems as an example, embodiments of the disclosure are also applicable to other communication systems having similar technical backgrounds or channel structure. For example, embodiments of the disclosure may be applicable to a system including 5th generation (5G) mobile communication technology New Radio (NR) developed after LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that, in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit," as used in the present embodiment of the disclosure refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, a " . . . unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and " . . . units" may be combined into fewer components and " . . . units" or further separated into additional components and " . . . units." Further, the components and " . . . units" may be implemented to operate one or more central processing units (CPUs) in a device or a secure multimedia card. Also, a " . . . unit" may include one or more processors in embodiments of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the 3rd generation partnership project (3GPP), high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link of data or a control signal transmitted from a UE (or an MS) to a BS (e.g., eNB), and the DL refers to a radio link of data or a control signal transmitted from a BS to a UE. The multiple access schemes identify data or control information of different users in a manner that time-frequency resources for carrying the data or control information of the users are allocated and managed not to overlap each other, that is, to achieve orthogonality therebetween.

As a post-LTE communication system, i.e., the 5G communication system is requested to freely reflect various requirements from users and service providers, and thus, has to support services that simultaneously satisfy the various requirements. The services being considered for the 5G communication system include enhanced mobile broadband (eMBB), massive machine-type communication (mMTC), ultra-reliability low-latency communication (URLLC) services, or the like.

The eMBB aims to provide a further-improved data rate than a data rate supported by the legacy LTE, LTE-A, or LTE-Pro. For example, in the 5G communication system, the eMBB should be able to provide a peak data rate of 20 Gbps in a DL and a peak data rate of 10 Gbps in an UL at one BS. Also, the 5G communication system has to simultaneously provide the improved peak data rate and an increased user-perceived data rate of a UE. In order to satisfy such requirements, there is a need for an improvement in transmission/reception technology including an improved multiple-input multiple-output (MIMO) transmission technology. Also, a data rate requested in the 5G communication system may be satisfied by using a frequency bandwidth wider than 20 MHz in the 3 GHz to 6 GHz or 6 GHz or more frequency band, instead of the LTE transmitting a signal by using maximum 20 MHz in the 2 GHz band.

Concurrently, the massive machine type communication (mMTC) is being considered to support application services such as Internet of things (IoT) in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km²) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the ultra-reliable low latency communications (URLLC) refers to cellular-based wireless communication services used for mission-critical purposes. For example, services for remote control of robots or machinery, industrial automation, unmanned aerial vehicles, remote health care, emergency alerts, and the like may be considered. Therefore, the URLLC should provide communications providing very low latency and very high reliability. For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services of the 5G, i.e., the enhanced mobile broadband (eMBB), the URLLC, and the mMTC may be multiplexed and transmitted in one system. Here, in order to satisfy different requirements of the services, the services may use different transceiving schemes and different transceiving parameters. Obviously, the 5G is not limited to the afore-described three services.

NR Time-Frequency Resource

Hereinafter, a frame structure of a 5G communication system will now be described in detail with reference to drawings.

FIG. 1 is a diagram illustrating a basic structure of a time-frequency domain that is a radio resource region in which data or a control channel is transmitted in the 5G communication system according to an embodiment of the disclosure.

Referring to FIG. 1, a subframe 110 is depicted where the horizontal axis represents a time domain and the vertical axis represents a frequency domain. A basic unit of a resource in the time-frequency domain is a resource element (RE) 101 and may be defined as 1 orthogonal frequency division multiplexing (OFDM) symbol 102 in the time domain and 1 subcarrier 103 in the frequency domain. In the frequency domain, $N_{SC}^{RB}$ (e.g., 12) consecutive REs may constitute one resource block (RB) 104.

Figure 2:
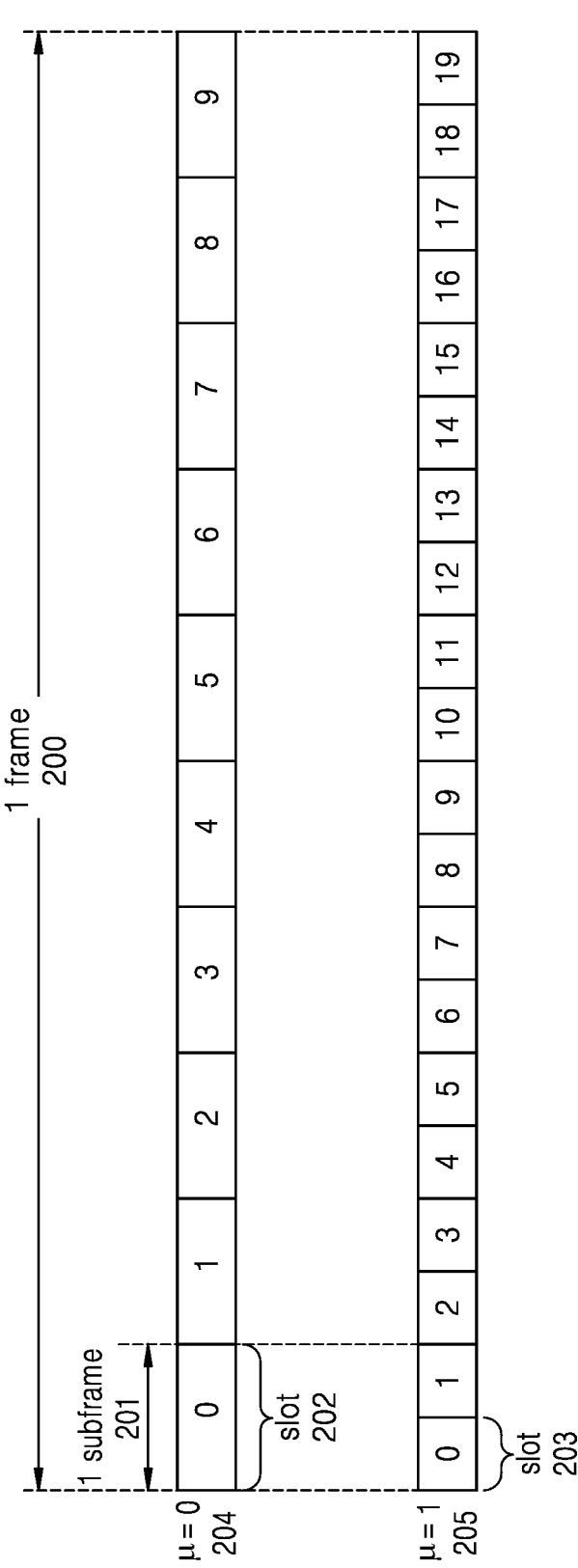
FIG. 2 is a diagram illustrating structures of a frame, a subframe, and a slot in a wireless communication system according to an embodiment of the disclosure.

FIG. 2 is a diagram illustrating structures of a frame, a subframe, and a slot in a wireless communication system according to an embodiment of the disclosure.

FIG. 2 illustrates an example of structures of a frame 200, a subframe 201, and a slot 202. One frame 200 may be defined as 10 ms. One subframe 201 may be defined as 1 ms, and thus, one frame 200 may consist of 10 subframes 201. One slot 202 or 203 may be defined as 14 OFDM symbols. That is, the number of symbols per 1 slot ($N_{symb}^{slot}$) may be 14. One subframe 201 may consist of one or more slots 202 or 203, and the number of slots 202 or 203 per one subframe 201 may vary according to a configuration value μ 204 or 205 indicating a configuration of a subcarrier spacing. The example of FIG. 2 shows a case 204 in which μ=0 and a case 205 in which μ=1, as a configuration value of a subcarrier spacing. When μ=0 (204), one subframe 201 may consist of one slot 202, and when μ=1 (205), one subframe 201 may consist of two slots 203. That is, the number of slots per one subframe ($N_{slot}^{subframe,\mu}$) may vary according to a configuration value μ with respect to a subcarrier spacing, and thus, the number of slots per one frame ($N_{slot}^{frame,\mu}$) may vary accordingly. $N_{slot}^{subframe,\mu}$ and $N_{slot}^{frame,\mu}$ according to each subcarrier spacing configuration value μ may be defined as in Table 1 below.

TABLE 1

| μ | $N_{symb}^{slot}$ | $N_{slot}^{frame,\ \mu}$ | $N_{slot}^{subframe,\ \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part (BWP)

Hereinafter, configuration of bandwidth parts (BWPs) in the 5G communication system will now be described with reference to the drawings.

Figure 3:
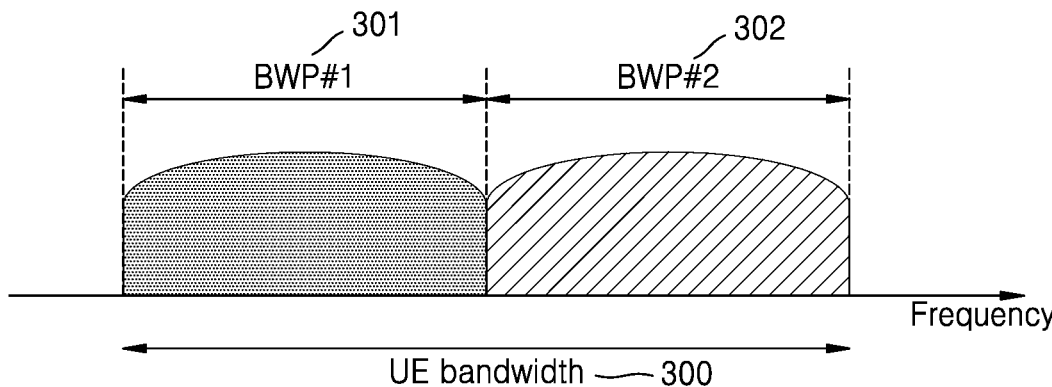
FIG. 3 is a diagram illustrating an example of configuration of bandwidth parts (BWPs) in a wireless communication system according to an embodiment of the disclosure.

FIG. 3 is a diagram illustrating an example of configuration of BWPs in a wireless communication system according to an embodiment of the disclosure.

Referring to FIG. 3, UE bandwidth 300 is configured into two BWPs, i.e., BWP #1 301 and BWP #2 302. A BS may configure a UE with one or more BWPs, and may configure, for each BWP, a plurality of pieces of information as in Table 2 below.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |

The disclosure is not limited to the example, and thus, various parameters associated with the BWP may be configured for the UE, in addition to the configuration information. The plurality of pieces of information may be transmitted from the BS to the UE by higher layer signaling, e.g., radio resource control (RRC) signaling. At least one BWP among the configured one or more BWPs may be activated. Whether to activate a configured BWP may be notified from the BS to the UE semi-statically by RRC signaling or dynamically in downlink control information (DCI).

According to some embodiments of the disclosure, the UE may be configured by the BS with an initial BWP for initial access in a Master Information Block (MIB) before the UE is RRC connected. In more detail, the UE may receive configuration information for a control resource set (CORESET) and search space in which a physical downlink control channel (PDCCH) may be transmitted for receiving system information (e.g., remaining system information (RMSI) or system information block (SIB) 1 (SIB1)), based on the MIB, requested for initial access in an initial access process. Each of the control resource set and the search space which hare configured in the MIB may be regarded with identity (ID) 0. The BS may notify, in the MIB, the UE of configuration information such as frequency allocation information, time allocation information, numerology, etc., for control resource set #0. Also, the BS may notify, in the MIB, the UE of configuration information such as a monitoring periodicity and occasion for the control resource set #0, i.e., configuration information for search space #0. The UE may regard a frequency region configured as the control resource set #0 obtained from the MIB, as the initial BWP for initial access. Here, the ID of the initial BWP may be regarded as 0.

Configuration of the BWP supported by the 5G communication system may be used for various purposes.

According to some embodiments of the disclosure, when a bandwidth supported by the UE is smaller than a system bandwidth, the BS may support, via configuration of the BWP, data transmission and reception by the UE. For example, the BS may configure the UE with a frequency location of the BWP (configuration information 2), and the UE may transmit or receive data in a particular frequency location in the system bandwidth.

Also, according to some embodiments of the disclosure, in order to support different numerologies, the BS may configure a plurality of BWPs for the UE. For example, in order to support data transmission and reception using both 15 KHz subcarrier spacing and 30 KHz subcarrier spacing for a certain UE, the BS may configure two BWPs with 15 KHz and 30 KHz subcarrier spacings, respectively. The different BWPs may be frequency division multiplexed, and in a case where a UE attempts to transmit and receive data with particular subcarrier spacing, a BWP configured with the subcarrier spacing may be activated.

Also, according to some embodiments of the disclosure, in order to reduce power consumption of the UE, the BS may configure BWPs with different bandwidth sizes for the UE. For example, when the UE supports very large bandwidth, e.g., 100 MHz bandwidth, and always transmits or receives data in the bandwidth, very high power consumption may occur. Particularly, in a situation where there is no traffic, monitoring unnecessary DL control channel in the large 100 MHz bandwidth may be very inefficient in terms of power consumption. In order to reduce the power consumption of the UE, the BS may configure a BWP with relatively small bandwidth, e.g., a 20 MHz BWP, for the UE. In the situation that there is no traffic, the UE may perform monitoring in the 20 MHz BWP, and when data occurs, the UE may transmit or receive the data on the 100 MHz BWP based on an indication from the BS.

In a method of configuring a BWP, UEs before being radio resource control (RRC) connected may receive, based on the MIB, configuration information for the initial BWP in an initial access process. In more specific, the UE may be configured, based on the MIB of a physical broadcast channel (PBCH), with a control resource set for a DL control channel on which downlink control information (DCI) for scheduling a system information block (SIB) may be transmitted. A bandwidth of the control resource set configured in the MIB may be regarded as the initial BWP, and the UE may receive, on the initial BWP, a physical downlink shared channel (PDSCH) on which the SIB is transmitted. The initial BWP may also be used for other system information (OSI), paging, or random access, in addition to reception of the SIB.

Switching of BWP

When one or more BWPs are configured for the UE, the BS may indicate, to the UE, switching or transition of BWP by using a BWP indicator field in DCI. For example, in FIG. 3, when a currently-activated BWP is BWP #1 301, the BS may indicate BWP #2 302 with a bandwidth indicator in DCI to the UE, and the UE may perform BWP switching to the BWP #2 302 indicated with the BWP indicator in the received DCI.

As described above, the DCI-based BWP switching may be indicated by DCI that schedules a PDSCH or a physical uplink shared channel (PUSCH), and thus, when the UE receives a BWP switching request, the UE may need to transmit or receive, on the switched BWP without difficulty, the PDSCH or the PUSCH scheduled by the DCI. For this end, a requirement for a delay time $T_{BWP}$ required for BWP switching is defined in a standard (e.g. the 3GPP standard), and, for example, may be defined as shown in Table 3 below.

TABLE 3

| μ | NR Slot length (ms) | BWP switch delay $T_{BWP}$ (slots) | |
| | | Type 1[Note 1] | Type 2[Note 1] |
| --- | --- | --- | --- |
| 0 | 1 | 1 | 3 |
| 1 | 0.5 | 2 | 5 |
| 2 | 0.25 | 3 | 9 |
| 3 | 0.125 | 6 | 18 |

Note 1:

Depends on UE capability.

Note 2:

If the BWP switch involves changing of SCS, the BWP switch delay is determined by the smaller SCS between the SCS before BWP switch and the SCS after BWP switch.

The requirement for BWP switching delay time may support type 1 or type 2 depending on a capability of the UE. The UE may report a supportable BWP delay time type to the BS.

According to the requirement for the BWP switching delay time, when the UE receives DCI including the BWP switching indicator in slot n, the UE may complete switching to a new BWP indicated by the BWP switching indicator no later than slot $n+T_{BWP}$. By doing so, the UE may transmit or receive, on the new BWP, a data channel scheduled by the DCI. When the BS attempts to schedule the data channel on the new BWP, the BS may determine to allocate a time domain resource for the data channel by considering the BWP switching delay time $(T_{BWP})$ of the UE. That is, when the BS schedules a data channel on a new BWP, as for a method of determining time domain resource allocation for the data channel, the BS may schedule the data channel after the BWP switching delay time. Accordingly, the UE may not expect the DCI, which indicates BWP switching, to indicate a slot offset value (K0 or K2) smaller than the BWP switching delay time $T_{BWP}$.

If the UE receives DCI indicating BWP switching (e.g., DCI format 1_1 or 0_1), the UE may not perform any transmission or reception during a time interval from a third symbol of the slot in which a PDCCH including the DCI is received to a starting point of a slot indicated by a slot offset value (K0 or K2) indicated in a time domain resource allocation indicator field in the DCI. For example, when the UE has received DCI indicating BWP switching in slot n and a slot offset value indicated by the DCI is K, the UE may not perform nay transmission or reception from a third symbol of the slot n to a symbol before slot n+k (i.e., a last symbol of slot n+K−1).

SS/PBCH Block

Hereinafter, a synchronization signal (SS)/PBCH block in the 5G communication system will now be described.

An SS/PBCH block may refer to a physical layer channel block including primary SS (PSS), secondary SS (SSS), and PBCH. In detail, functions of PSS, SSS, and PBCH are as below.

PSS: a reference signal for downlink (DL) time/frequency synchronization, which may provide partial information of a cell identifier (ID).

SSS: a reference signal for DL time/frequency synchronization, which may provide the rest of the cell ID information not provided by the PSS. In addition, the SSS may serve as another reference signal for demodulation of the PBCH.

PBCH: The PBCH may provide essential system information requested for transmission or reception of data channel and control channel for UE. The essential system information may include search-space-associated control information indicating radio resource mapping information of the control channel, scheduling control information for a separate data channel to transmit system information, and the like.

SS/PBCH block: The SS/PBCH block may be a combination of PSS, SSS, and PBCH. One or more SS/PBCH blocks may be transmitted in 5 ms, and each of the SS/PBCH blocks may be identified by an index.

The UE may detect the PSS and the SSS in the initial access process, and may decode the PBCH. The UE may obtain an MIB from the PBCH and may be configured with control resource set (CORESET) #0 (e.g., control resource set whose control resource set index is 0) through the MIB. The UE may assume that a demodulation reference signal (DMRS) transmitted in the selected SS/PBCH block and control resource set #0 are quasi-co-located (QCL), and may perform monitoring on the CORESET #0. The UE may receive system information in the DL control information transmitted in the control resource set #0. The UE may obtain random-access-channel (RACH) related configuration information required for initial access from the received system information. The UE may transmit, to the BS, a physical RACH (PRACH) by considering the selected SS/PBCH index, and upon reception of the PRACH, the BS may obtain information about the SS/PBCH block index selected by the UE. The BS may identify that the UE has selected a certain block among the SS/PBCH blocks and monitors the control resource set #0 associated with the selected SS/PBCH.

DRX

Figure 6:
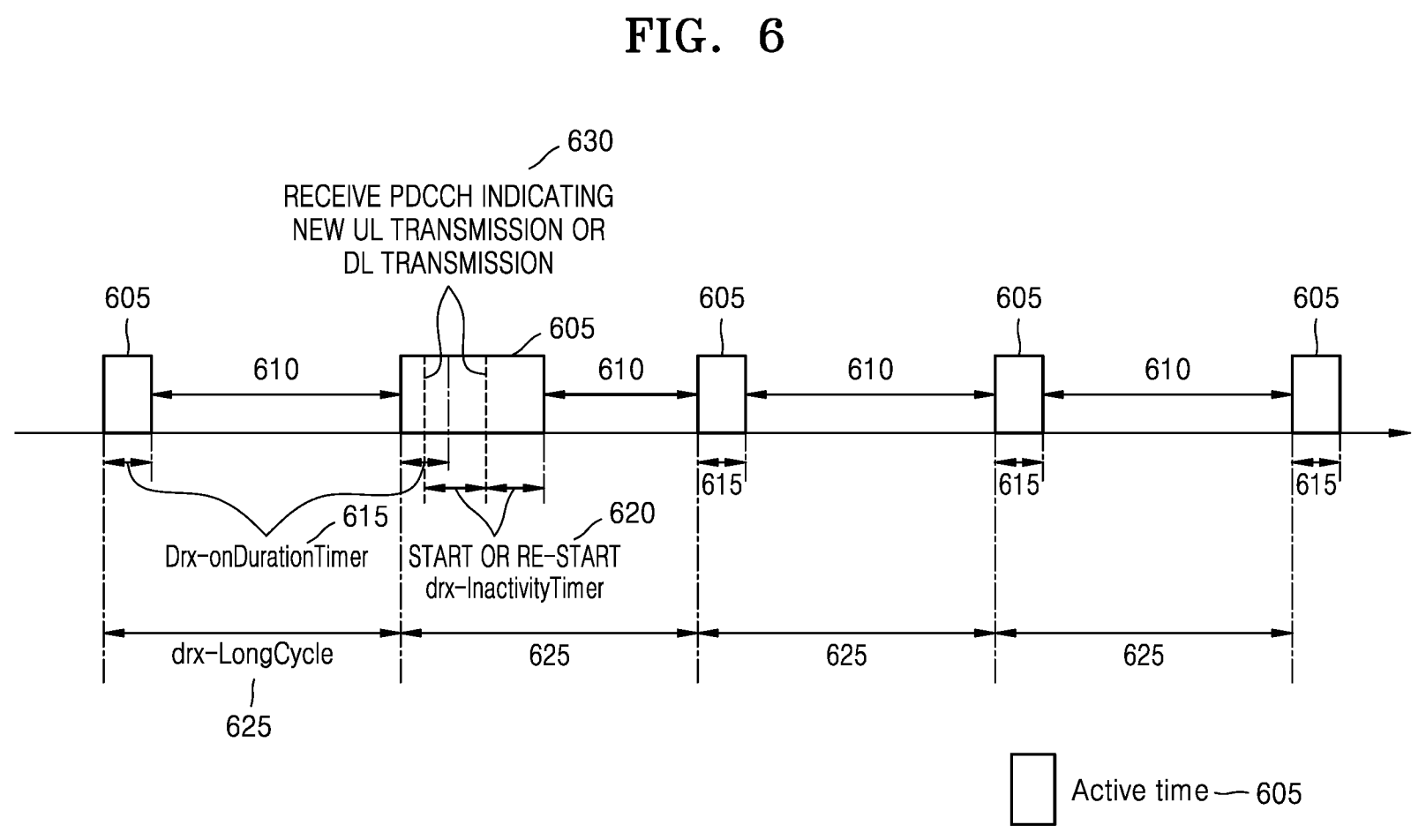

FIG. 6 is a diagram for describing Discontinuous Reception (DRX) according to an embodiment of the disclosure.

DRX refers to an operation of the UE, in which the UE that uses a service discontinuously receives data while in an RRC connected state in which a radio link is configured between the UE and the BS. When the DRX is applied, the UE may turn on a receiver at a particular time to monitor a control channel. When no data is received for a certain period of time, the UE may turn off the receiver, thereby reducing power consumption of the UE. The DRX operation may be controlled by a media access control (MAC) layer entity, based on various parameters and timers.

Referring to FIG. 6, active time 605 may be defined as a period of time in which the UE wakes up in every DRX cycle and monitors a PDCCH. The active time 605 may be defined as below.

drx-onDurationTimer or drx-InactivityTimer or drx-RetransmissionTimerDL or drx-RetransmissionTimerUL or ra-ContentionResolutionTimer is running; or a Scheduling Request is sent on physical uplink control channel (PUCCH) and is pending; or a PDCCH indicating a new transmission addressed to the C-radio network temporary identifier (RNTI) of the MAC entity has not been received after successful reception of a Random Access Response for the Random Access Preamble not selected by the MAC entity among the contention-based Random Access Preamble drx-onDurationTimer, drx-InactivityTimer, drx-RetransmissionTimerDL, drx-RetransmissionTimerUL, ra-ContentionResolutionTimer, and the like are timers whose values are configured by the BS, and have a function to configure the UE to monitor a PDCCH when a certain condition is satisfied.

drx-onDurationTimer 615 is a parameter to configure a minimum time in which the UE stays awake. drx-InactivityTimer 620 is a parameter to configure an extra period of time in which the UE additionally stays awake when a PDCCH indicating new UL or DL transmission is received (630). drx-RetransmissionTimerDL is a parameter to configure a maximum period of time in which the UE stays awake to receive DL retransmission in a DL hybrid automatic repeat request (HARQ) procedure. drx-RetransmissionTimerUL is a parameter to configure a maximum period of time in which the UE stays awake to receive UL retransmission grant in a UL HARQ procedure. The drx-onDurationTimer, drx-InactivityTimer, drx-RetransmissionTimerDL and drx-RetransmissionTimerUL may be configured with time, the number of subframes, the number of slots, or the like. ra-ContentionResolutionTimer is a parameter to monitor the PDCCH in a random access procedure.

InActive Time 610 is a time configured not to monitor the PDCCH or not to receive the PDCCH during a DRX operation, and may correspond to a rest of the entire time performing the DRX operation excluding the Active Time 605. When the UE does not monitor the PDCCH during the Active Time 605, the UE may enter a sleep or inactive state to reduce power consumption.

The DRX cycle refers to a cycle in which the UE wakes up and monitors a PDCCH. That is, the DRX cycle refers to a time gap from after the UE monitors the PDCCH to a time to monitor a next PDCCH, or an occurrence cycle of on duration. The DRX cycle may have two types which are short DRX cycle and long DRX cycle. The short DRX cycle may be optionally applied.

A long DRX cycle 625 may be defined as a DRX cycle having a longer cycle among two DRX cycles configured for the UE. The UE may start drx-onDuration Timer 615 again at a point in time after a lapse of the long DRX cycle 625 from a starting point (e.g., a start symbol) of drx-onDurationTimer 615 during the long DRX operation. When the UE operates in the long DRX cycle 625, the UE may start the drx-onDurationTimer 615 in a slot after drx-SlotOffset from a subframe that satisfies Equation 1 below. Here, the drx-SlotOffset may refer to a delay before the drx-onDurationTimer 615 starts. The drx-SlotOffset may be configured with time, the number of slots, or the like.

$$[(SFN \times 10) + \text{subframe number}] \bmod (drx\text{-Long-}Cycle) = d\text{-StartOffset} \qquad \text{Equation 1}$$

Here, drx-LongCycleStartOffset may be used to define the long DRX cycle 625. The drx-LongCycleStartOffset may be configured with time, the number of subframes, the number of slots, or the like.

PDCCH: In Associated with DCI

Hereinafter, DCI in the 5G system will now be described in detail.

In the 5G system, scheduling information for uplink (UL) data (or PUSCH) or DL data (or PDSCH) is transmitted in the DCI from the BS to the UE. The UE may monitor a fallback DCI format and a non-fallback DCI format for PUSCH or PDSCH. The fallback DCI format may include a fixed field predefined between the BS and the UE, and the non-fallback DCI format may include a configurable field.

DCI may be transmitted on a PDCCH after channel coding and modulation processes. Cyclic redundancy check (CRC) may be added to a DCI message payload, and the CRC may be scrambled by a radio network temporary identifier (RNTI) that corresponds to an ID of the UE. Depending on a purpose of the DCI message, e.g., UE-specific data transmission, power control command, random access response, or the like, different RNTIs may be used. That is, the RNTI may not be explicitly transmitted but may be transmitted in a CRC calculation process. Upon reception of a DCI message transmitted on the PDCCH, the UE may check CRC by using an allocated RNTI, and may identify that the DCI message is transmitted to the UE, based on a result of the CRC checking.

For example, DCI that schedules a PDSCH for system information (SI) may be scrambled by SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules a PUSCH, and here, the CRC may be scrambled by a C-RNTI. The DCI format 0_0 with the CRC scrambled by the C-RNTI may include a plurality of pieces of information shown in Table 4 below.

TABLE 4

Identifier for DCI formats - [1] bit
Frequency domain resource assignment -
$[\lceil \log_2(N_{RB}^{UL,\, BWP}(N_{RB}^{UL,\, BWP} + 1)/2) \rceil]$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
UL/supplementary UL (SUL) indicator - 0 or 1 bit DCI format 0_1 may be used for the non-fallback DCI that schedules a PUSCH, and here, the CRC may be scrambled by a C-RNTI. The DCI format 0_1 with the CRC scrambled by the C-RNTI may include a plurality of pieces of information shown in Table 5 below.

TABLE 5

- Carrier indicator– 0 or 3 bits
- UL/SUL indicator – 0 or 1 bit
- Identifier for DCI formats – [1] bits
- Bandwidth part indicator– 0, 1 or 2 bits
- Frequency domain resource assignment
For resource allocation type 0, $\lceil N_{RB}^{UL,\, BWP} / P \rceil$ bits
For resource allocation type 1, $\lceil \log_2(N_{RB}^{UL,\, BWP} (N_{RB}^{UL,\, BWP} + 1) / 2) \rceil$ bits
- Time domain resource assignment –1, 2, 3, or 4 bits
- Virtual resource block (VRB) to physical resource block (PRB) (VRB-to-PRB) mapping– 0 or 1 bit, only for resource allocation type 1.
0 bit if only resource allocation type 0 is configured;
1 bit otherwise.
- Frequency hopping flag – 0 or 1 bit, only for resource allocation type 1.
0 bit if only resource allocation type 0 is configured;
1 bit otherwise.
- Modulation and coding scheme (MCS) – 5 bits
- New data indicator – 1 bit
- Redundancy version – 2 bits
- HARQ process number – 4 bits

TABLE 5-continued

- 1st downlink assignment index– 1 or 2 bits
1 bit for semi-static HARQ acknowledgment (HARQ-ACK) codebook;
2 bits for dynamic HARQ-ACK codebook with single HARQ-ACK codebook.
- 2nd downlink assignment index– 0 or 2 bits
2 bits for dynamic HARQ-ACK codebook with two HARQ-ACK sub-codebooks; 0 bit otherwise.
- TPC command for scheduled PUSCH – 2 bits
- Sounding reference signal (SRS) resource indicator–

$$\left\lceil \log_2 \left( \sum_{k=1}^{L_{max}} \binom{N_{SRS}}{k} \right) \right\rceil \text{ or } \lceil \log_2 (N_{SRS}) \rceil \text{ bits}$$

$$\left\lceil \log_2 \left( \sum_{k=1}^{L_{max}} \binom{N_{SRS}}{k} \right) \right\rceil \text{ bits for non-codebook based } PUSCH \text{ transmission;}$$

$\lceil \log_2 (N_{SRS}) \rceil$ bits for codebook based PUSCH transmission.
- Precoding information and number of layers–up to 6 bits
- Antenna ports– up to 5 bits
- SRS request– 2 bits
- Channel state information (CSI) request– 0, 1, 2, 3, 4, 5, or 6 bits
- Coding block group (CBG) transmission information– 0, 2, 4, 6, or 8 bits
- Phase tracking reference signal (PTRS) – demodulation reference signal (DMRS) (PTRS-DMRS) association– 0 or 2 bits.
- beta_offset indicator– 0 or 2 bits
- DMRS sequence initialization– 0 or 1 bit DCI format 1_0 may be used for the fallback DCI that schedules a PDSCH, and here, the CRC may be scrambled by a C-RNTI. The DCI format 1_0 with the CRC scrambled by the C-RNTI may include a plurality of pieces of information shown in Table 6 below.

TABLE 6

| | |
|---|---|
| - | Identifier for DCI formats - [1] bit |
| - | Frequency domain resource assignment - $[\lceil \log_2( N_{RB}^{DL, \; BWP}(N_{RB}^{DL, \; BWP} + 1)/2) \rceil]$ bits |
| - | Time domain resource assignment - X bits |
| - | VRB-to-PRB mapping - 1 bit. |
| - | Modulation and coding scheme - 5 bits |
| - | New data indicator - 1 bit |
| - | Redundancy version - 2 bits |
| - | HARQ process number - 4 bits |
| - | Downlink assignment index - 2 bits |
| - | TPC command for scheduled PUCCH - [2] bits |
| - | PUCCH resource indicator - 3 bits |
| - | PDSCH-to-HARQ feedback timing indicator - [3] bits |

DCI format 1_1 may be used for the non-fallback DCI that schedules a PDSCH, and here, the CRC may be scrambled by a C-RNTI. The DCI format 1_1 with the CRC scrambled by the C-RNTI may include a plurality of pieces of information shown in Table 7 below.

TABLE 7

- Carrier indicator - 0 or 3 bits
- Identifier for DCI formats - [1] bits
- Bandwidth part indicator - 0, 1 or 2 bits
- Frequency domain resource assignment
For resource allocation type 0, $\lceil N_{RB}^{DL, \; BWP}/P \rceil$ bits
For resource allocation type 1, $\lceil \log_2( N_{RB}^{DL, \; BWP}(N_{RB}^{DL, \; BWP} + 1)/2) \rceil$ bits
- Time domain resource assignment -1, 2, 3, or 4 bits
- VRB-to-PRB mapping - 0 or 1 bit, only for resource allocation type 1.
0 bit if only resource allocation type 0 is configured;
1 bit otherwise.
- Physical resource block (PRB) bundling size indicator - 0 or 1 bit
- Rate matching indicator - 0, 1, or 2 bits
- Zero power (ZP) channel state information reference signal (CSI-RS) trigger- 0, 1, or 2 bits

TABLE 7-continued

For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information (CBGTI) - 0, 2, 4, 6, or 8 bits
- CBG flushing out information (CBGFI) - 0 or 1 bit
- DMRS sequence initialization - 1 bit

PDCCH: CORESET, REG, CCE, Search Space

A DL control channel in the 5G communication system will now be described in detail with reference to related drawings.

Figure 4:
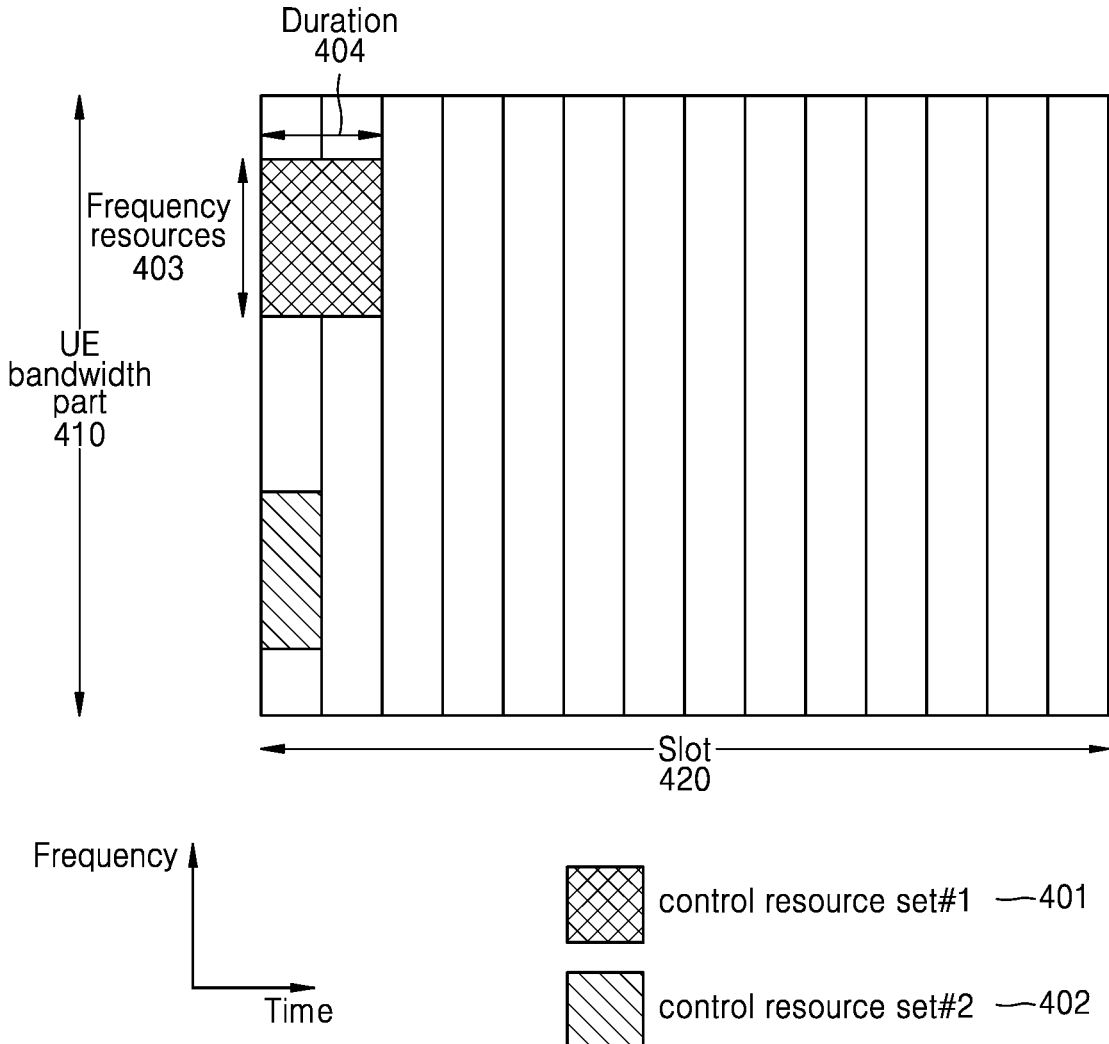
FIG. 4 is a diagram illustrating an example of configuring a control resource set of a downlink (DL) control channel in a wireless communication system according to an embodiment of the disclosure.

FIG. 4 is a diagram illustrating an example of control resource sets (or CORESETs) in which a DL control channel is transmitted in the 5G wireless communication system according to an embodiment of the disclosure.

FIG. 4 illustrates the example in which UE BWP 410 is configured on the frequency axis, and two control resource sets (control resource set #1 401 and control resource set #2 402) are configured in a slot 420 on the time axis. The control resource sets 401 and 402 may be configured on a particular frequency resource 403 in the full UE BWP 410 on the frequency axis. The control resource sets 401 and 402 may be configured as one or more OFDM symbols on the time axis, and duration of the control resource sets 401 and 402 on the time axis may be defined as control resource set duration 404. Referring to the example of FIG. 4, resource set duration of the control resource set #1 401 may be configured as two symbols, and resource set duration of the control resource set #2 402 may be configured as one symbol.

The control resource set in the 5G communication system described above may be configured by the BS for the UE by higher layer signaling (e.g., system information (SI), MIB, or RRC signaling). Configuring the UE with a control resource set may be understood as providing the UE with information such as a control resource set ID, a frequency location of the control resource set, length of symbols of the control resource set, or the like. For example, the configuration information may include a plurality of pieces of information shown in Table 8 below.

TABLE 8

| | |
|---|---|
| ControlResourceSet ::= | SEQUENCE { |
| -- Corresponds to L1 parameter 'CORESET-ID' | |
| controlResourceSetId | - [, |
| frequencyDomainResources | BIT STRING (SIZE |
| (45)), | |
| duration | INTEGER |
| (1..maxCoReSetDuration), | |
| cce-REG-MappingType | |
| CHOICE { | |
| interleaved | |
| SEQUENCE { | |
| reg-BundleSize | |
| ENUMERATED {n2, n3, n6}, | |
| precoderGranularity | |

TABLE 8-continued

```
ENUMERATED {sameAsREG-bundle, allContiguousRBs},
     interleaverSize
ENUMERATED {n2, n3, n6}
     shiftIndex
INTEGER(0..maxNrofPhysicalResourceBlocks-1)
          OPTIONAL
},
  nonInterleaved                         NULL
  },
  tci-StatesPDCCH
  SEQUENCE(SIZE(1..maxNrofTCI-StatesPDCCH)) OF TCI-StateId
          OPTIONAL,
  tci-PresentInDCI                 ENUMERATED
{enabled}
          OPTIONAL,  -- Need S
}
```

In Table 8, tci-StatesPDCCH (i.e., transmission configuration indication (TCI) state) configuration information may include information about channel state information reference signal (CSI-RS) indexes or one or more SS/PBCH block indexes having a QCL relation with a DMRS transmitted in the corresponding control resource set.

Figure 5A:
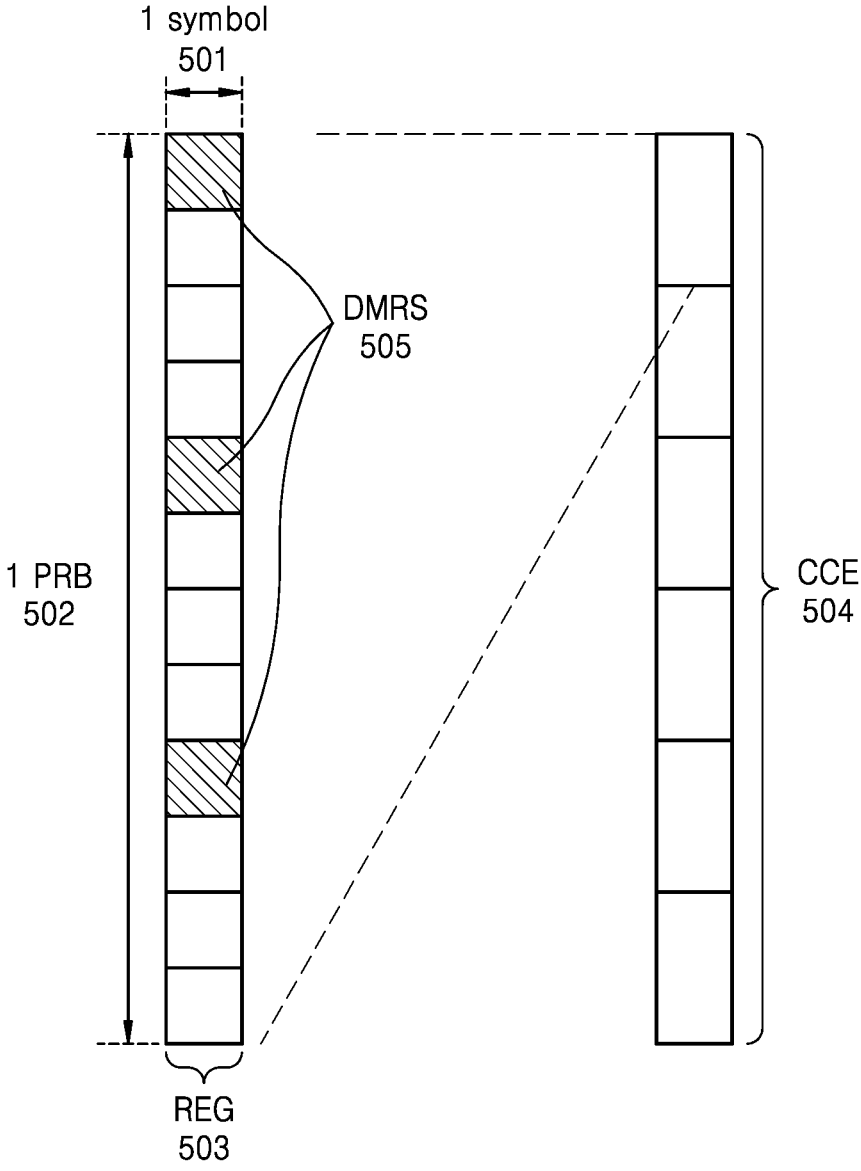
FIG. 5A is a diagram illustrating a structure of a DL control channel in a wireless communication system according to an embodiment of the disclosure.

FIG. 5A is a diagram illustrating an example of a basic unit of time and frequency resources that configure a DL control channel to be used in the 5G communication system according to an embodiment of the disclosure.

Referring to FIG. 5A, a basic unit of time and frequency resources that configure a control channel is referred to as a resource element group (REG) 503. The REG 503 may be defined by one OFDM symbol 501 on the time axis and one physical resource block (PRB) 502, i.e., 12 subcarriers on the frequency axis. The BS may configure a DL control channel allocation unit by connecting one or more REGs 503.

As illustrated in FIG. 5A, a basic unit with which the DL control channel is allocated may be called a control channel element (CCE) 504 in the 5G communication system, and the one CCE 504 may include a plurality of REGs 503. When describing, as an example, the REG 503 shown in FIG. 5A, the REG 503 may include 12 REs, and when one CCE 504 includes 6 REGs 503, the one CCE 504 may include 72 REs. When the DL control resource set is configured, it may include a plurality of CCEs 504, and a particular DL control channel may be transmitted by being mapped to one or more CCEs 504 based on an aggregation level (AL) in the control resource set. The CCEs 504 in the control resource set may be identified by numbers, and the numbers may be allocated to the CCEs 504 in a logical mapping scheme.

The basic unit of the DL control channel shown in FIG. 5A, i.e., the REG 503, may include both REs to which DCI is mapped and a region to which DMRS 505 that is a reference signal for decoding the DCI is mapped. As shown in FIG. 5A, three DMRSs 505 may be transmitted in one REG 503. The number of CCEs required to transmit the PDCCH may be 1, 2, 4, 8, or 16 depending on the AL, and different numbers of CCEs may be used to implement link adaptation of the DL control channel. For example, when AL=L, one DL control channel may be transmitted in L CCEs. The UE needs to detect a signal without knowing information about the DL control channel, and search space representing a set of CCEs may be defined for the blind decoding. The search space may be defined as a set of DL control channel candidates that include CCEs on which the UE needs to attempt decoding at a given AL. Because there are various ALs each making a bundle with 1, 2, 4, 8, or 16 CCEs, the UE may have a plurality of search spaces. A search space set may be defined as a set of search spaces at all the configured ALs.

The search spaces may be classified into common search spaces and UE-specific search spaces. A certain group of UEs or all the UEs may monitor a common search space of the PDCCH so as to receive dynamic scheduling of the system information or receive cell-common control information such as a paging message. For example, the UE may monitor the common search space of the PDCCH so as to receive PDSCH scheduling allocation information for transmitting an SIB including cell operator information or the like. Because a certain group of UEs or all the UEs need to receive the PDCCH, the common search space may be defined as a set of pre-defined CCEs. UE-specific PDSCH or PUSCH scheduling allocation information may be received by monitoring the UE-specific search space of the PDCCH. The UE-specific search space may be UE-specifically defined as a function of various system parameters and an ID of the UE.

In the 5G communication system, parameters of the search space of the PDCCH may be configured by the BS for the UE by higher layer signaling (e.g., SIB, MIB, or RRC signaling). For example, the BS may configure the UE with the number of PDCCH candidates at each AL, monitoring periodicity for the search space, monitoring occasion on symbols in the slot for the search space, a type of the search space (common search space or UE-specific search space), a combination of a DCI format to be monitored in the search space and an RNTI, a control resource set index to monitor the search space, or the like. For example, the parameters of the search space may include a plurality of pieces of information shown in Table 9 below.

TABLE 9

```
SearchSpace ::=                                   SEQUENCE {
    -- Identity of the search space. SearchSpaceId = 0 identifies the SearchSpace
configured via PBCH (MIB) or ServingCellConfigCommon.
    searchSpaceId
    SearchSpaceId,
    controlResourceSetId
    ControlResourceSetId,
    monitoringSlotPeriodicityAndOffset               CHOICE {
      sl1
    NULL,
      sl2
    INTEGER (0..1),
      sl4
    INTEGER (0..3),
      sl5
    INTEGER (0..4),
      sl8
```

TABLE 9-continued

```
INTEGER (0..7),
    sl10
INTEGER (0..9),
    sl16
INTEGER (0..15),
    sl20
INTEGER (0..19)
}
                                                             OPTIONAL,
    duration        INTEGER (2..2559)
    monitoringSymbolsWithinSlot                   BIT STRING
(SIZE (14))
    OPTIONAL,
    nrofCandidates                                SEQUENCE {
        aggregationLevel1
    ENUMERATED {n0, n1, n2, n3, n4, n5, n6, n8},
        aggregationLevel2
    ENUMERATED {n0, n1, n2, n3, n4, n5, n6, n8},
        aggregationLevel4
    ENUMERATED {n0, n1, n2, n3, n4, n5, n6, n8},
        aggregationLevel8
    ENUMERATED {n0, n1, n2, n3, n4, n5, n6, n8},
        aggregationLevel16
    ENUMERATED {n0, n1, n2, n3, n4, n5, n6, n8}
    },
    searchSpaceType                               CHOICE {
        -- Configures this search space as common search space (CSS) and
DCI formats to monitor.
        common
    SEQUENCE {
}
    ue-Specific
    SEQUENCE {
        -- Indicates whether the UE monitors in this USS for DCI
formats 0-0 and 1-0 or for formats 0-1 and 1-1.
        formats
    ENUMERATED {formats0-0-And-1-0, formats0-1-And-1-1},
        ...
    }
}
```

Based on the configuration information, the BS may configure the UE with one or more search space sets. According to some embodiments of the disclosure, the BS may configure search space set 1 and search space set 2 for the UE. The BS may configure the UE to monitor DCI format A scrambled by an X-RNTI in the search space set 1 in the common search space and monitor DCI format B scrambled by a Y-RNTI in the search space set 2 in the UE-specific search space.

Based on the configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, combinations of DCI formats and RNTIs below may be monitored. Obviously, the combinations are not limited to an example below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, combinations of DCI formats and RNTIs below may be monitored. Obviously, the combinations are not limited to an example below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs may conform to definitions or purposes below.

C-RNTI (Cell RNTI): for UE-specific PDSCH scheduling

TC-RNTI (Temporary Cell RNTI): for UE-specific PDSCH scheduling

CS-RNTI (Configured Scheduling RNTI): for semi-statically configured UE-specific PDSCH scheduling RA-RNTI (Random Access RNTI): for PDSCH scheduling in a random access process P-RNTI (Paging RNTI): for scheduling a PDSCH on which paging is transmitted SI-RNTI (System Information RNTI): for scheduling a PDSCH on which system information is transmitted INT-RNTI (Interruption RNTI): for indicating whether to puncture the PDSCH TPC-PUSCH-RNTI (Transmit Power Control for PUSCH RNTI): for indicating power control command for a PUSCH TPC-PUCCH-RNTI (Transmit Power Control for PUCCH RNTI): for indicating power control command for a PUCCH TPC-SRS-RNTI (Transmit Power Control for SRS RNTI): for indicating power control command for an SRS The afore-described DCI formats may conform to definitions in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, a search space at aggregation level L with control resource set p and search space set s may be represented as in Equation 2 below $$L \cdot \left\{ \left( \left[ Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right] \right\} + i \quad \text{Equation 2}$$

L: aggregation level (AL)

$n_{CI}$: carrier index $N_{CCE,p}$: a total number of CCEs being present in control resource set p $n_{s,f}^{\mu}$: slot index $M_{s,max}^{(L)}$: the number of PDCCH candidate groups at aggregation level L $m_{s,n_{CI}}=0, \ldots, M_{s,max}^{(L)}-1$: PDCCH candidate group index at aggregation level L i=0, . . . , L−1

$Y_{p,n_{s,f}}=(A_p \cdot Y_{p,n_{s,f}-1}) \bmod D$, $Y_{p,-1}=n_{RNTI} \neq 0$ $A_p$=39827 for pmod3=0, $A_p$=39829 for pmod3=1, $A_p$=39839 for pmod3=2, D=65537

$n_{RNTI}$: UE identifier $Y_{p,n_{s,f}}^{\mu}$ value may correspond to 0 for common search space.

$Y_{p,n_{s,f}}^{\mu}$ value may correspond to a value that changes by a UE Identity (C-RNTI or ID configured by the BS for the UE) and time index for the UE-specific search space.

In the 5G communication system, it is possible to configure a plurality of search space sets with different parameters (e.g., the parameters in Table 9), and thus, a group of search space sets the UE monitors may be different every time. For example, when the search space set #1 is configured with X-slot periodicity and the search space set #2 is configured with Y-slot periodicity, where X and Y are different, the UE may monitor both the search space set #1 and the search space set #2 in a particular slot, and may monitor one of the search space set #1 and the search space set #2 in another particular slot.

PDCCH: Span

The UE may report, at each subcarrier spacing, UE capability about a case of having a plurality of PDCCH monitoring occasions in a slot, and here, a concept of span may be used. A span refers to consecutive symbols on which the UE may monitor a PDCCH in a slot, and each PDCCH monitoring occasion is in one span. The span may be represented by (X, Y), where X refers to a minimum number of symbols between first symbols of two successive spans and Y refers to the number of consecutive symbols on which to monitor the PDCCH in one span. Here, the UE may monitor the PDCCH in a section in Y symbols from the first symbol of the span within the span.

Figure 5B:
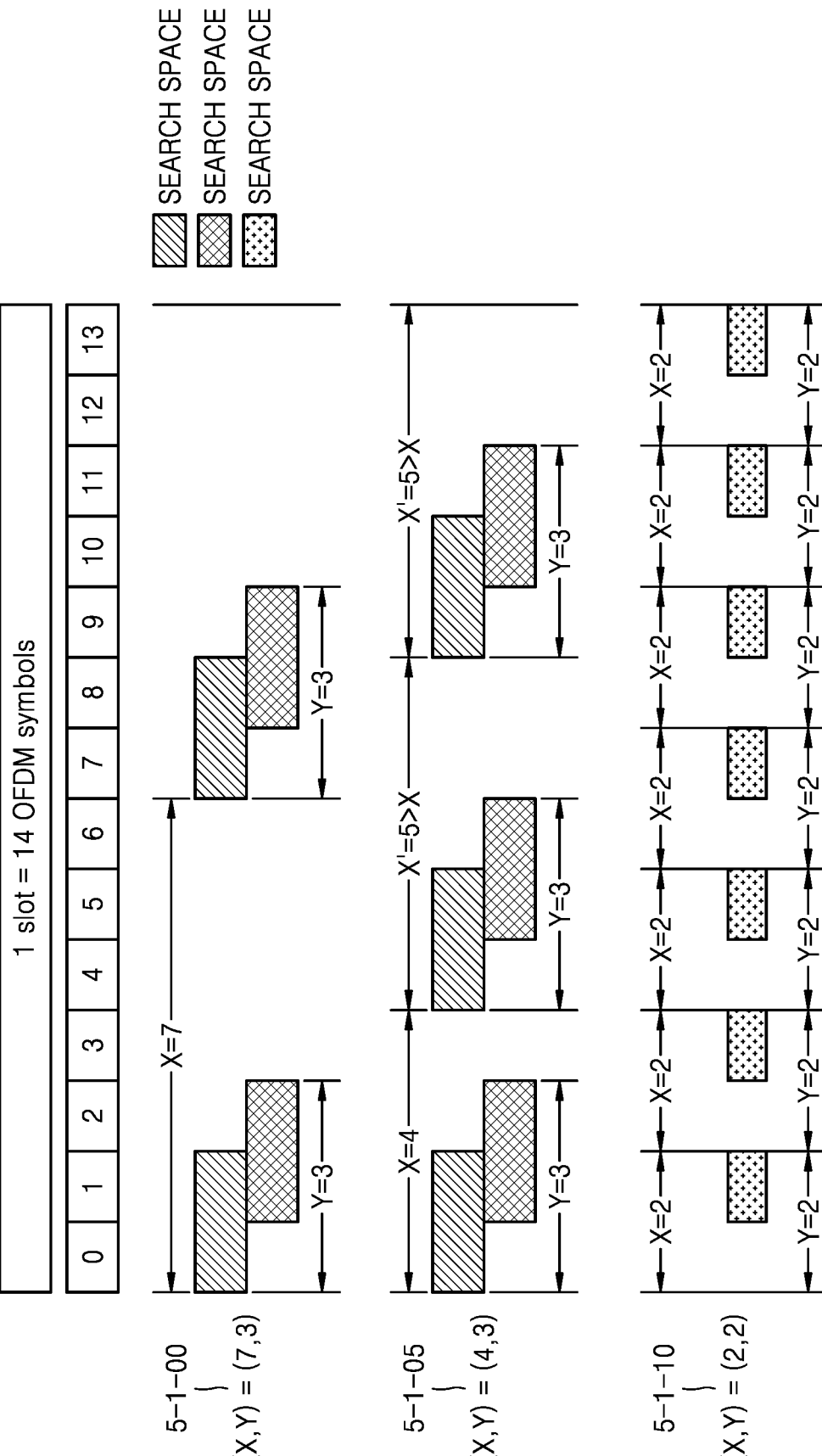
FIG. 5B is a diagram illustrating a case in which a user equipment (UE) can have a plurality of a physical downlink control channel (PDCCH) monitoring occasions in a slot in a wireless communication system, in terms of spans, according to an embodiment of the disclosure.

FIG. 5B is a diagram illustrating a case in which a UE can have a plurality of PDCCH monitoring occasions in a slot in a wireless communication system, in terms of spans according to an embodiment of the disclosure.

In various embodiments of the disclosure, there may be spans (X,Y)=(7,3), (4,3), (2,2), and these three cases are represented by 5-1-00, 5-1-05 and 5-1-10 in FIG. 5B. For example, 5-1-00 may denote a case in which there are two spans that may be represented by (7,3) in a slot. In this case, a gap X between first symbols of the two spans is represented by X=7, and there may be a PDCCH monitoring occasion in a total of Y symbols (i.e., 3 symbols) from the first symbol of each span. Search spaces 1 and 2 may be present on consecutive symbols represented by Y=3. In another example, 5-1-05 denotes a case in which there are a total of three spans represented by (4, 3) in a slot, and a gap between the second and third spans has 5 symbols (X'=5) greater than X (i.e., 4 symbols) which is a minimum number of symbols.

PDCCH: UE Capability Reporting

A slot position where the afore-described common search space and UE-specific search space are located may be indicated by monitoringSymbolsWithinSlot parameter of Table 11-1 below, and a symbol position in the slot may be indicated by a bitmap through the monitoringSymbolsWithinSlot parameter of Table 9. A symbol position in a slot where the UE is able to monitor a search space may be reported to the BS through UE capabilities below.

UE capability 1 (hereinafter, represented as FG 3-1). The UE capability refers to, when there is one monitoring occasion (MO) for type 1 and type 3 common search spaces or UE-specific search spaces in a slot as in Table 11-1 below, a capability to monitor the MO when the MO is located on the first three symbols in the slot. The UE capability is mandatory capability supported by every UE that supports NR, and whether to support the UE capability may not be explicitly reported to the BS.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0 CORESET resource allocation of 6RB bit-map and duration of 1-3 OFDM symbols for (FR)1 For type 1 CSS without dedicated RRC configuration and for type 0, 0A, and 2 CSSs, CORESET resource allocation of 6RB bit-map and duration 1-3 OFDM symbols for FR2 For type 1 CSS with dedicated RRC configuration and for type 3 CSS, UE specific SS, CORESET resource allocation of 6RB bit-map and duration 1-2 OFDM symbols for FR2 REG-bundle sizes of 2/3 RBs or 6 RBs | n/a |

TABLE 11-1-continued

| Index Feature group | Components | Field name in TS 38.331 [2] |
|---|---|---|
| | Interleaved and non-interleaved CCE-to-REG mapping Precoder-granularity of REG-bundle size PDCCH DMRS scrambling determination TCI state(s) for a CORESET configuration 2) CSS and UE-SS configurations for unicast PDCCH transmission per BWP per cell PDCCH aggregation levels 1, 2, 4, 8, 16 UP to 3 search space sets in a slot for a scheduled SCell per BWP This search space limit is before applying all dropping rules. For type 1 CSS with dedicated RRC configuration, type 3 CSS, and UE-SS, the monitoring occasion is within the first 3 OFDM symbols of a slot For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot 3) Monitoring DCI formats 0_0, 1_0, 0_1, 1_1 4) Number of PDCCH blind decodes per slot with a given SCS follows Case 1-1 table 5) Processing one unicast DCI scheduling DL and one unicast DCI scheduling UL per slot per scheduled CC for FDD 6) Processing one unicast DCI scheduling DL and 2 unicast DCI scheduling UL per slot per scheduled CC for TDD | |

UE capability 2 (hereinafter, represented as FG 3-2). The UE capability refers to, when there is one monitoring occasion (MO) for common search spaces or UE-specific search spaces in a slot as in Table 11-2 below, a capability of monitoring regardless of where the start symbol position of the MO is. The UE capability is optionally supported by the UE, and whether to support the UE capability may be explicitly reported to the BS.

TABLE 11-2

| Index Feature group | Components | Field name in TS 38.331 [2] |
|---|---|---|
| 3-2 PDCCH monitoring on any span of up to 3 consecutive OFDM symbols of a slot | For a given UE, all search space configurations are within the same span of 3 consecutive OFDM symbols in the slot. | pdcchMonitoringSingleOccasion |

UE capability 3 (hereinafter, represented as FG 3-5, 3-5a or 3-5b). The UE capability refers to, when there are a plurality of monitoring occasions (MOs) for common search spaces or UE-specific search spaces in a slot as in Table 11-3 below, an MO pattern the UE can monitor. The pattern consists of a gap between start symbols of different MOs, X, and a maximum symbol length Y for one MO. Combinations of (X, Y) supported by the UE may be one or more of {(2,2), (4,3), (7,3)}. The UE capability is optionally supported by the UE, and whether to support the UE capability and the combination (X,Y) may be explicitly reported to the BS.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2. | For type 1 CSS with dedicated RRC configuration, type 3 CSS, and UE-SS, monitoring occasion can be any OFDM symbol(s) of a slot for Case 2. | pdcch-MonitoringAnyOccasions {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap. | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and a UL unicast DCI in different monitoring occasions where at least one of them is not the monitoring occasions of FG-3-1, for a same UE as: | |

TABLE 11-3-continued

| Index | Feature group | Components | Field name in TS 38.331 [2] |
|---|---|---|---|
| | | 2 OFDM symbols for 15 kHz;<br>4 OFDM symbols for 30 kHz;<br>7 OFDM symbols for 60 kHz with NCP; or<br>11 OFDM symbols for 120 kHz<br>Up to one unicast DL DCI and up to one unicast UL DCI in a monitoring occasion except for the monitoring occasions of FG 3-1.<br>In addition for TDD, the minimum separation between the first two UL unicast DCIs within the first 3 OFDM symbols of a slot can be zero OFDM symbols. | |
| 3-5b | All PDCCH monitoring occasions can be any OFDM symbol(s) of a slot for Case 2 with a span gap. | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled component carrier (CC) across this set of monitoring occasions for FDD.<br>Processing one unicast DCI scheduling DL and two unicast DCI scheduling UL per scheduled CC across this set of monitoring occasions for TDD.<br>Processing two unicast DCI scheduling DL and one unicast DCI scheduling UL per scheduled CC across this set of monitoring occasions for TDD.<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | |

The UE may report whether to support UE capability 2 and/or the UE capability 3 and associated parameters to the BS. The BS may perform time domain resource allocation for the common search space and the UE-specific search space, based on the reported UE capability. When allocating the resource, the BS may not arrange the MO in a position where the UE cannot perform monitoring.

PDCCH: BD/CCE Limit

When a plurality of search space sets are configured for the UE, conditions below may be considered for a method of determining a search space set to be monitored by the UE.

When the UE is configured with r15monitoringcapability as a value of higher layer signaling monitoringCapability-Config-r16, the UE may define maximum values of the number of PDCCH candidate groups to be monitored and the number of CCEs that configure the whole search spaces (here, the whole search spaces refer to a whole CCE set corresponding to a union region of a plurality of search space sets) for each slot, and when the UE is configured with r16monitoringcapability as a value of monitoringCapabilityConfig-r16, the UE may define maximum values of the number of PDCCH candidate groups to be monitored and the number of CCEs that configure the whole search spaces (here, the whole search spaces refer to a whole CCE set corresponding to a union region of a plurality of search space sets) for each span.

Condition 1: Restriction on a Maximum Number of PDCCH Candidate Groups

A maximum number $M^\mu$ of PDCCH candidate groups the UE can monitor may conform to Table 12-1 below when defined based on a slot and conform to Table 12-2 below when defined based on a span on a cell configured with $15 \cdot 2^\mu$ kHz subcarrier spacing, according to the configuration value of higher layer signaling as described above.

TABLE 12-1

| $\mu$ | Maximum number of PDCCH candidates per slot and per serving cell $M^\mu$ |
|---|---|
| 0 | 44 |
| 1 | 36 |

TABLE 12-1-continued

| μ | Maximum number of PDCCH candidates per slot and per serving cell $M^\mu$ |
|---|---|
| 2 | 22 |
| 3 | 20 |

TABLE 12-2

| | Maximum number $M^\mu$ of monitored PDCCH candidates per span for combination (X, Y) and per serving cell | | |
|---|---|---|---|
| μ | (2, 2) | (4, 3) | (7, 3) |
| 0 | 14 | 28 | 44 |
| 1 | 12 | 24 | 36 |

Condition 2: Restriction on a Maximum Number of CCEs

A maximum number $C^\mu$ of CCEs that configure the whole search spaces (here, the whole search spaces refer to a whole CCE set corresponding to a union region of a plurality of search space sets) may conform to Table 12-3 below when defined based on a slot and conform to Table 12-4 below when defined based on a span on a cell configured with $15 \cdot 2^\mu$ kHz subcarrier spacing, according to the configuration value of higher layer signaling as described above.

TABLE 12-3

| μ | Maximum number of non-overlapped CCEs per slot and per serving cell $C^\mu$ |
|---|---|
| 0 | 56 |
| 1 | 56 |
| 2 | 48 |
| 3 | 32 |

TABLE 12-4

| | Maximum number $C^\mu$ of non-overlapped CCEs per span for combination (X, Y) and per serving cell | | |
|---|---|---|---|
| μ | (2, 2) | (4, 3) | (7, 3) |
| 0 | 18 | 36 | 56 |
| 1 | 18 | 36 | 56 |

For convenience of descriptions, a situation that satisfies both conditions 1 and 2 at a particular time is defined as "condition A." Accordingly, failing to satisfy the condition A may mean that at least one of the condition 1 or the condition 2 is not satisfied.

PDCCH: Overbooking

A case where the condition A is not satisfied at a particular time according to configuration of the search space sets by the BS may occur. When the condition A is not satisfied at the particular time, the UE may select and monitor only some of the search space sets configured to satisfy the condition A at the particular time, and d the BS may transmit a PDCCH in the selected search space set.

In order to select some search spaces among all of the configured search space sets, a method below may be performed.

In a case where the condition A for the PDCCH is not satisfied at a particular time (or in a particular slot), the UE may priorly select a search space set whose search space type is configured as the common search space over a search space set that is configured as the UE-specific search space, from among the search space sets that exist at the particular time.

When all the search space sets configured as the common search space are selected (i.e., when the condition A is satisfied even after all the search space sets configured as the common search space are selected), the UE (or the BS) may select search space sets configured as the UE-specific space. Here, when there are a plurality of search space sets configured as the UE-specific search space, a search space set having a lower search space index may have higher priority. The UE (or the BS) may select UE-specific search space sets within a range in which they satisfy the condition A, in consideration of the priorities.

QCL, TCI State

One or more different antenna ports (which may be substituted with one or more channels, signals, or combinations thereof, but for convenience of descriptions in the disclosure, collectively called different antenna ports) may be associated with each other according to QCL configurations described in Table 13 below in a wireless communication system. The TCI state is to announce a QCL relation between a PDCCH (or PDCCH DMRS) and other RS or channel, and when a reference antenna port A (reference RS #A) and other target antenna port B (target RS #B) are QCLed with each other, it may mean that the UE is allowed to apply some or all of large-scale channel parameters estimated from the antenna port A to measurement of channels from the antenna port B. QCL may need to associate different parameters depending on a situation such as 1) time tracking affected by average delay and delay spread, 2) frequency tracking affected by Doppler shift and Doppler spread, 3) radio resource management (RRM) affected by an average gain, 4) beam management affected by a spatial parameter, or the like. Accordingly, NR may support four types of QCL relations as in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial receiver (RX) parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, or the like.

The QCL relation may be configured for the UE via an RRC parameter TCI-state and QCL-Info as described in Table 14 below. Referring to Table 14, the BS may configure the UE with one or more TCI states to notify the UE maximally up to two QCL relations (qcl-Type 1 and qcl-Type2) for an RS that refers to an ID of the TCI state, i.e., a target RS. Here, QCL information (QCL-Info) included in each of the TCI states includes a BWP index and a serving cell index of a reference RS indicated by the QCL information, a type and ID of the reference RS, and a QCL type as in Table 13 above.

TABLE 14

```
TCI-State ::=                          SEQUENCE {
    tci-StateId                            TCI-StateId,
    qcl-Type1                              QCL-Info,
    qcl-Type2      OPTIONAL, -- Need R     QCL-Info
    ...
}
QCL-Info ::=                           SEQUENCE {
    cell                                   ServCellIndex
                   OPTIONAL, -- Need R
    bwp-Id                                 BWP-Id
                   OPTIONAL, -- Cond CSI-RS-Indicated
    referenceSignal                        CHOICE {
        csi-rs                                 NZP-CSI-RS-
ResourceId,
        ssb                                    SSB-
Index
    },
    qcl-Type                               ENUMERATED
{typeA, typeB, typeC, typeD},
    ...
}
```

Figure 7:
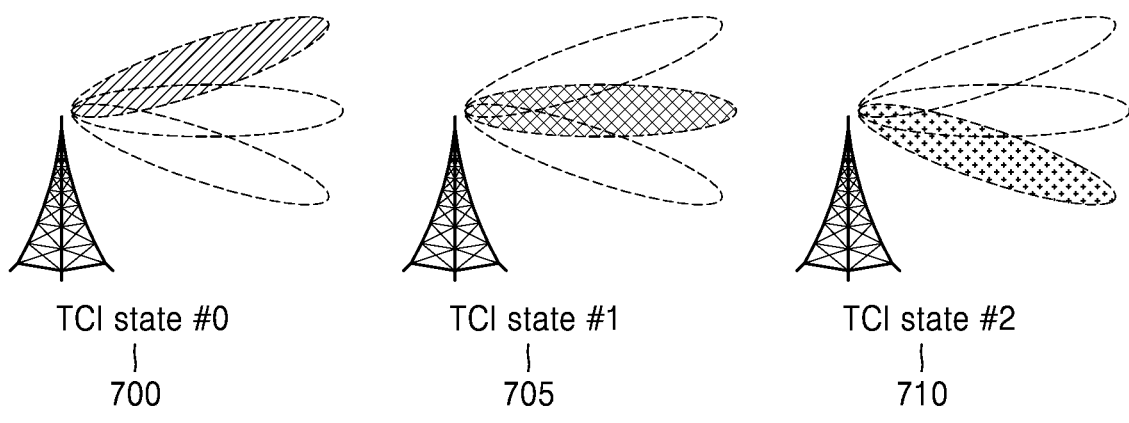
FIG. 7 is a diagram illustrating examples of base station (BS) beam allocation according to transmission configuration indication (TCI) state configurations according to an embodiment of the disclosure.

FIG. 7 is a diagram illustrating examples of BS beam allocation according to TCI state configurations according to an embodiment of the disclosure.

Referring to FIG. 7, the BS may deliver information about N different beams to the UE through N different TCI states. For example, in a case of N=3 as shown in FIG. 7, the BS may associate qcl-Type2 parameters included in three TCI states 700, 705 and 710 with CSI-RS s or SSBs corresponding to the different beams and may configure the qci-Type2 parameters as QCL type D. By doing so, the BS may announce that antenna ports referring to the different TCI states 700, 705 and 710 are associated with different spatial Rx parameters, i.e., different beams.

Tables 15-1 to 15-5 below represent valid TCI state configurations according to target antenna port types.

Table 15-1 represents a valid TCI state configuration when the target antenna port is a CSI-RS for tracking (TRS). The TRS refers to non-zero power (NZP) CSI-RS in which a repetition parameter is not configured but trs-Info is configured as true among CSI-RSs. In Table 15-1, configuration no. 3 may be used for an aperiodic TRS.

TABLE 15-1

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1 | QCL-TypeD |

Table 15-2 represents valid TCI state configuration when the target antenna port is a CSI-RS for CSI. The CSI-RS for CSI refers to an NZP CSI-RS in which a parameter indicating repetition (e.g., a repetition parameter) is not configured and trs-Info is not configured to true among CSI-RSs.

TABLE 15-2

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same | QCL-TypeD |

TABLE 15-2-continued

| Valid TCI state Configuration | DL RS 1 | qcl-Type1 | DL RS 2 (if configured) | qcl-Type2 (if configured) |
|---|---|---|---|---|
| | | | as DL RS 1 | |
| 4 | TRS | QCL-TypeB | | |

Table 15-3 represents valid TCI state configuration when the target antenna port is a CSI-RS for beam management (BM, CSI-RS for L1 reference signal received power (RSRP) reporting). The CSI-RS for BM refers to NZP CSI-RS in which a repetition parameter is configured and which has a value of 'On' or 'Off' and in which trs-Info is not configured to true among CSI-RSs.

TABLE 15-3

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1 | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 represents valid TCI state configuration when the target antenna port is a PDCCH DMRS.

TABLE 15-4

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1 | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 represents valid TCI state configuration when the target antenna port is a PDSCH DMRS.

TABLE 15-5

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A QCL configuration method according to Tables 15-1 to 15-5 above according to an embodiment of the disclosure is to configure and operate a target antenna port and a reference antenna port in each stage as below: "SSB" "TRS" "CSI-RS for CSI, CSI-RS for BM, PDCCH DMRS, or PDSCH DMRS." By doing so, it is possible to help a reception operation by the UE by associating statistical characteristics that may be measured from the SSB and TRS with the respective antenna ports.

PDCCH: Associated with TCI State

In more detail, TCI state combinations applicable to a PDCCH DMRS antenna port are as described in Table 16 below. In Table 16, the fourth row indicates a combination assumed by the UE before RRC configuration, and RRC configuration thereafter is not possible.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
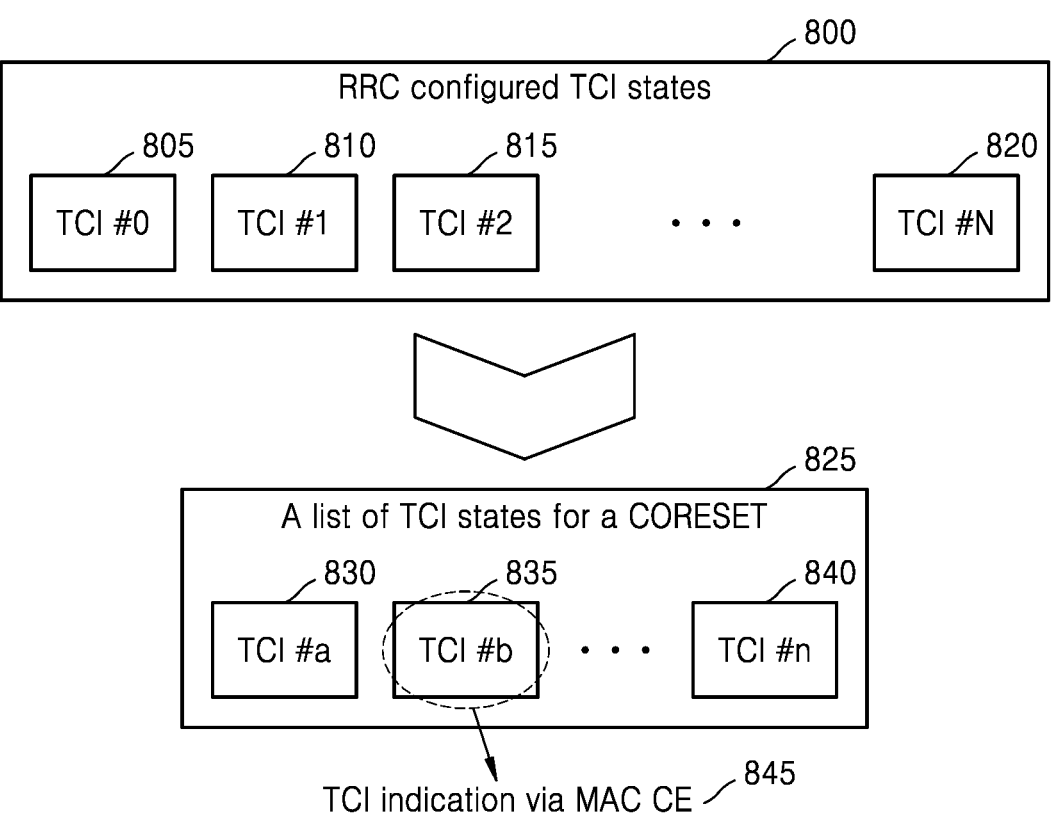
FIG. 8 is a diagram illustrating an example of a TCI state allocation method for a PDCCH in a wireless communication system according to an embodiment of the disclosure.

FIG. 8 is a diagram illustrating an example of a TCI state allocation method for a PDCCH in a wireless communication system according to an embodiment of the disclosure.

NR may support a hierarchical signaling method as shown in FIG. 8 for dynamic allocation of PCCH beams. Referring to FIG. 8, the BS may configure N TCI states 805, 810, 815, and 820 for the UE by RRC signaling 800, and may configure some of them as TCI states for a CORESET in 825. Afterward, the BS may indicate one of the TCI states 830, 835 and 840 for the CORESET to the UE by MAC CE signaling in 845. Afterward, the UE may receive a PDCCH based on beam information included in the TCI state indicated by the MAC CE signaling.

Figure 9:
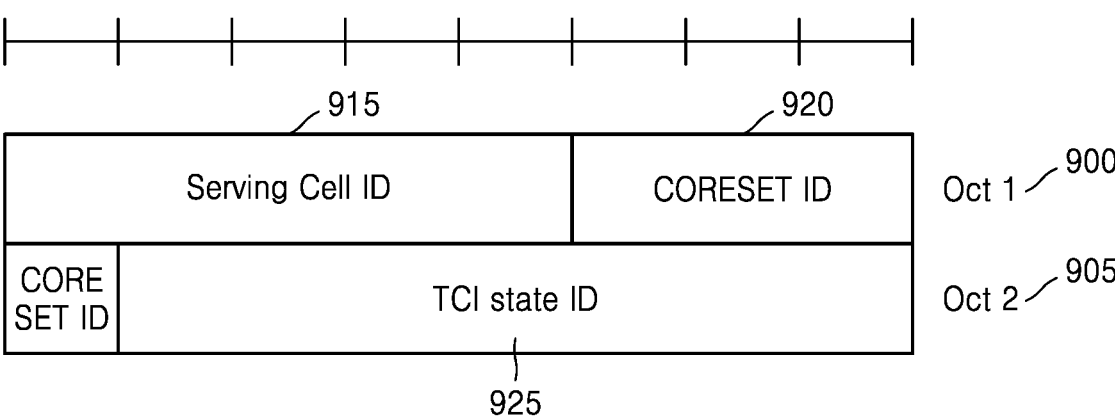
FIG. 9 is a diagram illustrating a TCI indication media access control (MAC) control element (CE) (MAC CE) signaling structure for a PDCCH demodulation reference signal (DMRS) in a wireless communication system according to an embodiment of the disclosure.

FIG. 9 is a diagram illustrating a TCI indication MAC CE signaling structure for the PDCCH DMRS according to an embodiment of the disclosure.

Referring to FIG. 9, TCI indication MAC CE signaling for the PDCCH DMRS may consist of 2 bytes (16 bits) (e.g., a first 8-bit octet 900 and a second 8-bit octet 905) and may include a serving cell ID 915 of 5 bits, a CORESET ID 920 of 4 bits, and a TCI state ID 925 of 7 bits.

Figure 10:
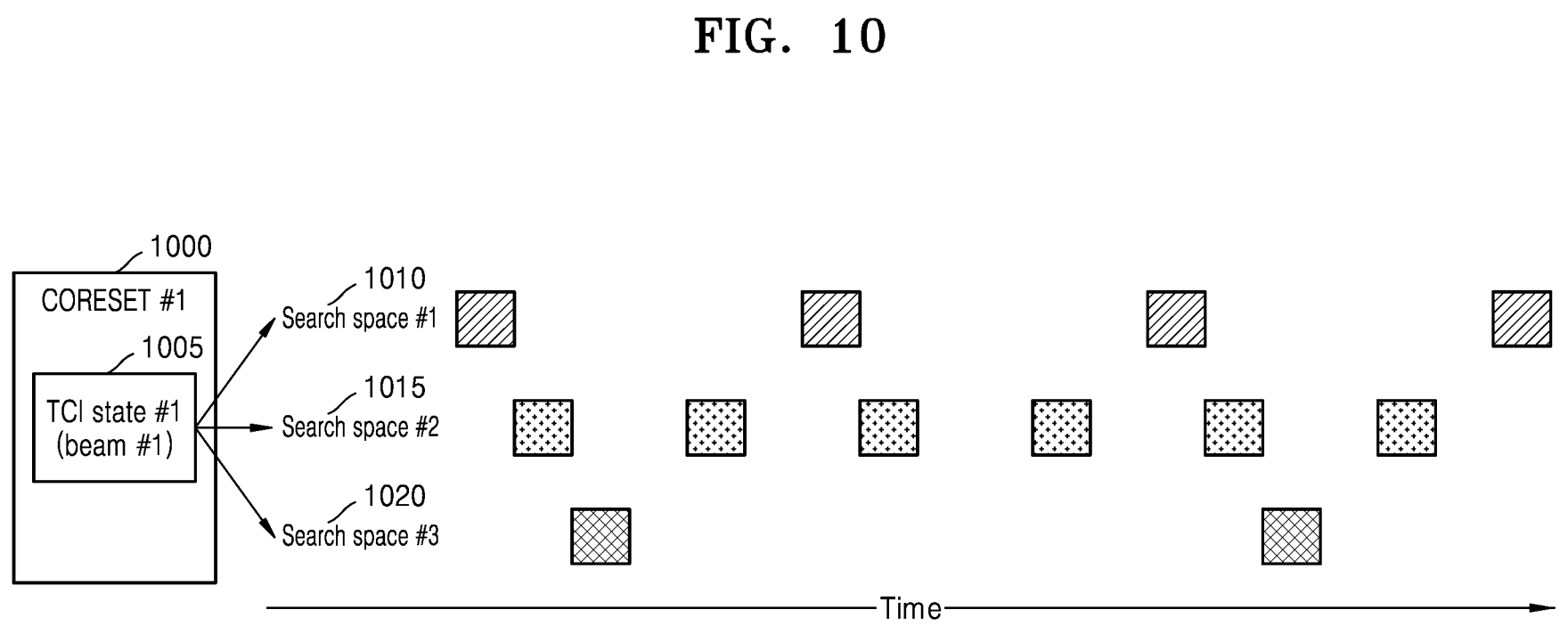

FIG. 10 is a diagram illustrating an example of beam configuration of a CORESET and search space as described above according to an embodiment of the disclosure.

Referring to FIG. 10, the BS may indicate a TCI state 1005 in a TCI state list included in CORESET configuration 1000 by MAC CE signaling. Afterward, the UE may consider that same QCL information (beam #1 1005) is applied to all of one or more search spaces 1010, 1015 and 1020 associated with the CORESET until another TCI state is indicated for the CORESET by another MAC CE signaling. The afore-described PDCCH beam allocation method has a problem in indicating beam switching earlier than the MAC CE signaling delay and has a problem in applying the same beam uniformly for each CORESET regardless of search space characteristics, such that it is difficult for flexible PDCCH beam operation. Hereinafter, embodiments of the disclosure provide a more flexible PDCCH beam configuration and operation method. Although several distinct examples will now be described for convenience of describing the embodiments of the disclosure, the examples are not mutually exclusive but may be applied in a suitable combination thereof depending on the situation.

The BS may configure the UE with one or more TCI states for a particular CORESET, and may activate one of the configured TCI states by an MAC CE activation command. For example, TCI states {TCI state #0, TCI state #1 and TCI state #2} are configured for CORESET #1, and the BS may transmit, to the UE, an activation command to assume TCI state #0 for the TCI state for CORESET #1 via MAC CE. The UE may correctly receive a DMRS of the CORRESET based on QCL information in the activated TCI state based on the activation command for the TCI state received via the MAC CE.

When the UE fails to receive the MAC CE activation command for a TCI state for a CORESET indexed with 0 (i.e., the CORESET #0), the UE may assume that a DMRS transmitted in CORESET #0 is QCLed with an SS/PBCH block identified in an initial access procedure or in a non-contention based random access procedure that is not triggered by a PDCCH command.

With respect to a CORESET (CORESET #X) configured with a different index value (X) instead of index 0, when the UE is not configured with a TCI state for the CORESET #X or is configured with one or more TCI states but fails to receive the MAC CE activation command for activating one of the configured one or more TCI states. In this case, the UE may assume that a DMRS transmitted in CORESET #X is QCLed with an SS/PBCH block identified in an initial access procedure.

PDCCH: Associated with QCL Prioritization Rule

Hereinafter, an operation of determining QCL priority for a PDCCH will now be described in detail.

When the UE operates with carrier aggregation in a single cell or a band and a plurality of CORESETs existing in an activated BWP in the single or multiple cells have same or different QCL-typeD characteristics and overlap on a time domain in a particular PDCCH monitoring occasion, the UE may select a particular CORESET according to the QCL priority determination operation and may monitor CORE-SETs having the same QCL-TypeD characteristics as the selected CORESET. That is, when the plurality of CORE-SETs overlap on the time domain, the UE may receive only one QCL-TypeD characteristic. In this case, a reference for determining QCL priority may be as below.

Reference 1: A CORESET associated with the common search space of the lowest index in a cell corresponding to the lowest index among cells including the common search space.

Reference 2: A CORESET associated with the UE-specific search space of the lowest index in a cell corresponding to the lowest index among cells including the UE-specific search space.

As described above, when one of the references is not fulfilled, the other one of the references is applied. For example, in a case where CORESETs overlap on a time domain in a particular PDCCH monitoring occasion, if all the CORESETs are not associated with the common search space but associated with the UE-specific search space, i.e., when the reference 1 is not fulfilled, the UE may skip application of the reference 1 and may apply the reference 2.

When the UE selects a CORESET according to the afore-described references, the UE may additionally consider two conditions below for QCL information configured for the CORESET. First, CORESET 1 may have CSI-RS 1 as a reference signal having QCL-TypeD association and a reference signal having QCL-TypeD association with the CSI-RS 1 may be SSB1, and CORESET 2 may have a reference signal SSB 1 having QCL-TypeD association. In this case, the UE may consider that the two CORESETs 1 and 2 have different QCL-TypeD characteristics. Second, CORESET 1 may have CSI-RS 1 configured for cell 1 as a reference signal having QCL-TypeD association, and a reference signal having QCL-TypeD association with the CSI-RS 1 may be SSB 1, and CORESET 2 may have a reference signal CSI-RS 2 configured for cell 2 as a reference signal having QCL-TypeD association and a reference signal having the QCL-TypeD association with CSI-RS 2 may be a same SSB 1. In this case, the UE may consider that the two CORESETs 1 and 2 have same QCL-TypeD characteristics.

Figure 12:
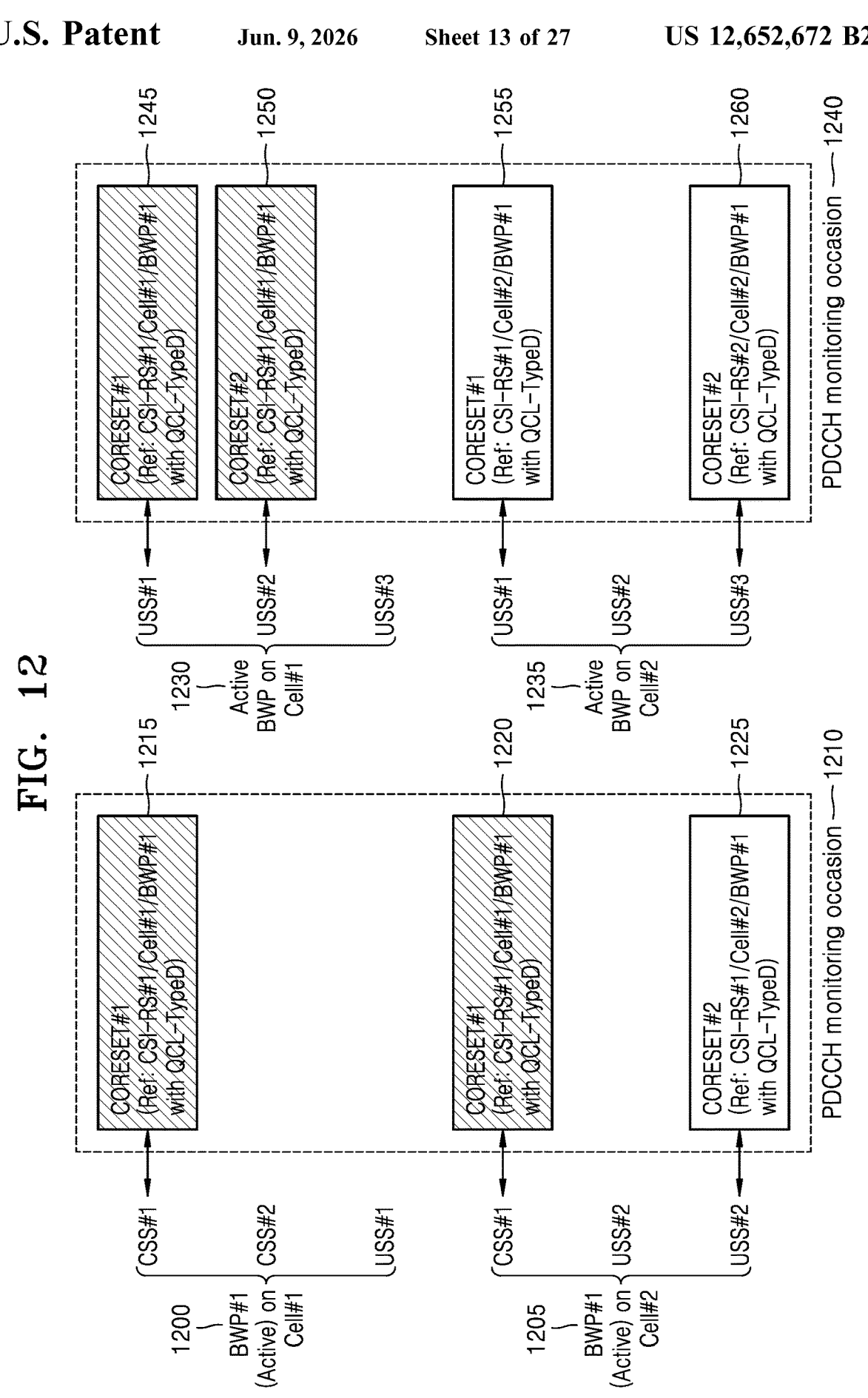
FIG. 12 is a diagram for describing a method by which a UE selects a receivable control resource set by considering priorities in receiving a DL control channel in a wireless communication system according to an embodiment of the disclosure.

FIG. 12 is a diagram for describing a method by which the UE selects a receivable CORESET by considering priorities in receiving a DL control channel in a wireless communication system according to an embodiment of the disclosure.

For example, the UE may be configured to receive a plurality of CORESETs overlapping on a time domain in a particular PDCCH monitoring occasion 1210, and the plurality of CORESETs may be associated with the UE-specific search space or the common search space on a plurality of cells. In a particular PDCCH monitoring occasion, there may be CORESET #1 1215 associated with common search space #1 in BWP #1 1200 of cell #1, and there may be CORESET #1 1220 associated with common search space #1 and CORESET #2 1225 associated with UE-specific search space #2 in BWP #1 1205 of cell #2. The CORESET #1 1215 and the CORESET #1 1220 may have QCL-TypeD association with CSI-RS resource #1 configured in the BWP #1 of the cell #1, and the CORESET #2 1225 may have QCL-TypeD association with CSI-RS resource #1 configured in the BWP #1 of the cell #2. Accordingly, when the reference 1 is applied to the PDCCH monitoring occasion 1210, all other CORESETs having a reference signal of the same QCL-TypeD as the CORESET #1 1215 may be received. Accordingly, the UE may receive the CORESETs 1215 and 1220 in the PDCCH monitoring occasion 1210. In another example, the UE may be configured to receive a plurality of CORESETs overlapping on a time domain in a particular PDCCH monitoring occasion 1240, and the plurality of CORESETs may be associated with the common search space on a plurality of cells or the UE-specific search space. In the PDCCH monitoring occasion, there may be CORESET #1 1245 associated with UE-specific search space #1 and CORESET #2 1250 associated with UE-specific search space #2 in BWP #1 1230 of the cell #1, and there may be CORESET #1 1255 associated with UE-specific search space #1 and CORESET #2 1260 associated with UE-specific search space #3 in BWP #1 1235 of the cell #2. The CORESET #1 1245 and the CORESET #2 1250 may have QCL-TypeD association with the CSI-RS resource #1 configured in the BWP #1 of the cell #1, and the CORESET #1 1255 may have QCL-TypeD association with the CSI-RS resource #1 configured in the BWP #1 of the cell #2, and the CORESET #2 1260 may have QCL-TypeD association with the CSI-RS resource #2 configured in the BWP #1 of the cell #2. Because there is no common search space when the reference 1 is applied to the PDCCH monitoring occasion 1240, the next reference 2 may be applied. When the reference 2 is applied to the PDCCH monitoring occasion 1240, all other CORESETs having a reference signal of a same QCL-TypeD as the CORESET #1 1245 may be received. Accordingly, the UE may receive the CORESETs 1245 and 1250 in the PDCCH monitoring occasion 1240.

Associated with Rate Matching/Puncturing

Hereinafter, a rate matching operation and a puncturing operation will now be described in detail.

When time and frequency resource A on which a random symbol sequence A is intended to be transmitted overlaps with random time and frequency resource B, a rate matching operation or a puncturing operation may be considered for operations of transmission and reception of channel A (or the symbol sequence A), in consideration of resource C of a region on which the resource A and the resource B are overlapped. Detailed operations will now be provided.

Rate Matching Operation

The BS may transmit the symbol sequence A by mapping channel A (or the symbol sequence A) to the whole resource A on which the symbol sequence A is intended to be transmitted to the UE, except for a region of the resource A which corresponds to the resource C overlapping with the resource B. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the BS may transmit the symbol sequence A by sequentially mapping the symbol sequence A to resources {resource #1, resource #2, and resource #4} of the resource A excluding {resource #3} corresponding to the resource C. As a result, the BS may transmit the symbol sequence {symbol #1, symbol #2, and symbol #3} by respectively mapping them to {resource #1, resource #2, and resource #4}.

The UE may determine the resource A and the resource B from scheduling information for the symbol sequence A from the BS, and thus, may determine the resource C corresponding to an overlapping region between the resource A and the resource B. The UE may receive the symbol sequence A assuming that the symbol sequence A is transmitted by being mapped to the whole resource A excluding the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the UE may receive the symbol sequence A assuming that the symbol sequence A is sequentially mapped to resources {resource #1, resource #2, and resource #4} of the resource A excluding {resource #3} corresponding to the resource C. As a result, the UE may assume that the symbol sequence {symbol #1, symbol #2, and symbol #3} is transmitted by being respectively mapped to {resource #1, resource #2, and resource #4}, and may perform a series of next operations.

Puncturing Operation

When there is the resource C corresponding to an overlapping region between the whole resource A on which the symbol sequence A is intended to be transmitted to the UE and the resource B, the BS may map the symbol sequence A to the whole resource A but may perform transmission in the resource regions of the resource A excluding the resource C without performing transmission on the resource region corresponding to the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the BS may map the symbol sequence A {symbol #1, symbol #2, symbol #3, and symbol #4} to the resource A {resource #1, resource #2, resource #3 and resource #4}, and may transmit a symbol sequence {symbol #1, symbol #2, and symbol #4} corresponding to resource regions {resource #1, resource #2, and resource #4} of the resource A excluding {resource #3} corresponding to the resource C without transmitting {symbol #3} mapped to {resource #3} corresponding to the resource C. As a result, the BS may transmit the symbol sequence {symbol #1, symbol #2, and symbol #4} by respectively mapping them to {resource #1, resource #2, and resource #4}.

The UE may determine the resource A and the resource B from scheduling information for the symbol sequence A from the BS, and thus, may determine the resource C corresponding to an overlapping region between the resource A and the resource B. The UE may receive the symbol sequence A assuming that the symbol sequence A is mapped to the whole resource A but transmitted only on the regions of the resource A excluding the resource C. For example, when the symbol sequence A includes {symbol #1, symbol #2, symbol #3, and symbol #4}, the resource A includes {resource #1, resource #2, resource #3 and, resource #4} and the resource B includes {resource #3 and resource #5}, the UE may perform reception assuming that the symbol sequence A {symbol #1, symbol #2, symbol #3, and symbol #4} are mapped to the resource A {resource #1, resource #2, resource #3 and resource #4}, but {symbol #1, symbol #2, and symbol #4} of the symbol sequence A mapped to {resource #1, resource #2, and resource #4} are transmitted without {symbol #3} mapped to {resource #3} corresponding to the resource C. As a result, the UE may assume that the symbol sequence {symbol #1, symbol #2, and symbol #4} is transmitted by being respectively mapped to {resource #1, resource #2, and resource #4}, and may perform a series of next operations.

Hereinafter, a method of configuring a rate matching resource for the purpose of rate matching in a 5G communication system will now be described. Rate matching refers to adjusting the magnitude of a signal by considering a quantity of resource on which the signal can be transmitted. For example, rate matching of a data channel may refer to adjusting the size of data by not mapping and transmitting the data channel on a particular time and frequency resource portion.

Figure 11:
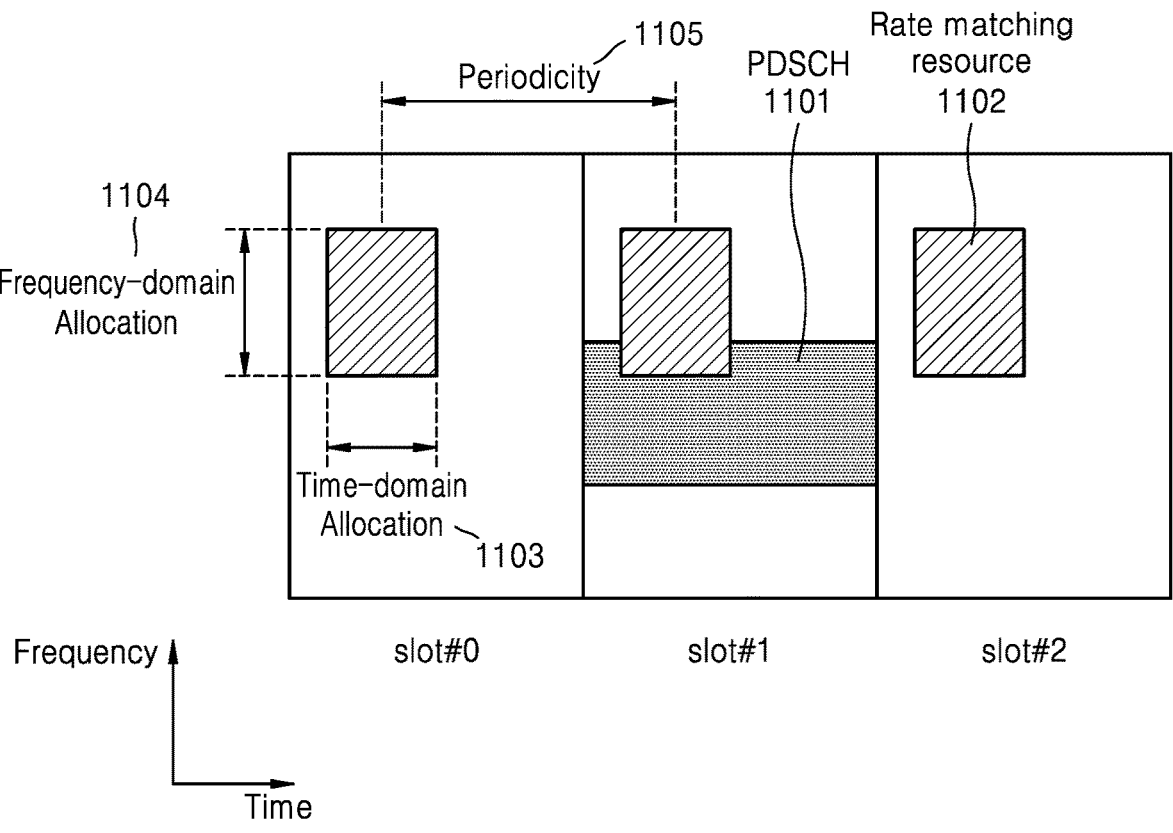
FIG. 11 is a diagram for describing a method by which a BS and a UE transmit or receive data by considering a DL data channel and a rate matching resource in a wireless communication system according to an embodiment of the disclosure.

FIG. 11 is a diagram for describing a method by which the BS and the UE transmit or receive data by considering a DL data channel and a rate matching resource according to an embodiment of the disclosure.

FIG. 11 illustrates a DL data channel (PDSCH) 1101 and a rate matching resource 1102. The BS may configure the UE with one or more rate matching resources 1102 by higher layer signaling (e.g., RRC signaling). Configuration information for the rate matching resource 1102 may include time-domain resource allocation information 1103, frequency-domain resource allocation information 1104, and periodicity information 1105. Hereinafter, a bitmap corresponding to the frequency-domain resource allocation information 1104 is referred to as a "first bitmap," a bitmap corresponding to the time-domain resource allocation information 1103 is referred to as a "second bitmap," and a bitmap corresponding to the periodicity information 1105 is referred to as a "third bitmap." When all or some of time and frequency resources of the scheduled data channel 1101 overlap with the configured rate matching resource 1102, the BS may transmit the data channel 1101 by performing rate matching on the data channel 1101 in a portion of the rate matching resource 1102, and the UE may assume that the data channel 1101 has been rate matched in the portion of the rate matching resource 1102 and then may receive and decode the data channel 1101.

Through additional configuration, the BS may dynamically notify whether to perform rate matching on the data channel in the portion of the configured rate matching resource to the UE via DCI (corresponding to the "rate matching indicator" in the DCI format described above). In more detail, the BS may select and group some of the configured rate matching resources into a rate matching resource group, and may indicate whether to perform rate matching on the data channel for each rate matching resource group to the UE by DCI in a bitmap scheme. For example, when there are four rate matching resources configured, e.g., RMR #1, RMR #2, RMR #3, and RMR #4, the BS may configure rate matching groups RMG #1={RMR #1, RMR #2} and RMG #2={RMR #3, RMR #4}. The BS may indicate, by using 2 bits in a DCI field, whether to perform rate matching in each of RMG #1 and RMG #2 to the UE in a bitmap. For example, it may be indicated as "1" when the rate matching needs to be performed, and as "0" when the rate matching does not need to be performed.

The 5G communication system supports "RB symbol level" and "RE level" granularities for a method of configuring the rate matching resource for the UE. In more detail, a configuration method below may be performed.

RB Symbol Level

The UE may be configured with maximally up to four RateMatchPatterns for each BWP by higher layer signaling, and each RateMatchPattern may include information below.

For a reserved resource on a BWP, a resource configured with time and frequency resource region of the reserved resource in a combination of a symbol level bitmap and an RB level bitmap on the frequency axis may be included. The reserved resource may span one or two slots. A time domain pattern (periodicityAndPattern) in which a time and frequency region consisting of an RB-level and symbol-level bitmap pair is repeated may be additionally configured.

A time and frequency domain resource region configured with a CORESET on a BWP and a resource region corresponding to a time domain pattern configured with a search space configuration in which the time and frequency domain resource region is repeated may be included.

RE Level

The UE may be configured with conditions below by higher layer signaling.

configuration information (lte-CRS-ToMatchAround) for an RE corresponding to an LTE cell-specific reference signal or common reference signal (CRS) pattern which may include the number of LTE CRS ports (nrofCRS-Ports), an LTE-CRS-vshift(s) value (v-shift), center subcarrier location information (carrierFreqDL) of an LTE carrier from a reference frequency point (e.g., reference point A), bandwidth size information of an LTE carrier (carrierBandwidthDL), subframe configuration information (mbsfn-SubframConfigList) corresponding to a multicast-broadcast single-frequency network (MBSFN). The UE may determine a location of a CRS in an NR slot corresponding to an LTE subframe based on a plurality of pieces of information described above.

Configuration information about a resource set corresponding to one or multiple zero power (ZP) CSI-RSs in a BWP.

Associated with LTE CRS Rate Match

Hereinafter, a rate matching process for the LTE CRS will now be described in detail. For coexistence of LTE and New Radio access technology (NR) (or LTE-NR coexistence), NR may provide a function to configure an NR UE with a CRS pattern of LTE. In more detail, the CRS pattern may be provided by RRC signaling including at least one parameter in a ServingCellConfig information element (IE) or a ServingCellConfigCommon IE. As an example of the parameter, there may be lte-CRS-ToMatchAround, lte-CRS-PatternList1-r16, lte-CRS-PatternList2-r16, crs-RateMatch-Per-CORESETPoolIndex-r16, and the like.

Rel-15 NR may provide a function to configure one CRS pattern for each serving cell via the parameter lte-CRS-ToMatchAround. In Rel-16 NR, the function is extended to be able to configure a plurality of CRS patterns for each serving cell. In more detail, one CRS pattern for one LTE carrier may be configured for a single transmission and reception point (TRP) configured UE, and two CRS patterns for one LTE carrier may be configured for a multi-TRP configured UE. For example, maximally up to three CRS patterns for each serving cell may be configured for the single TRP configured UE via the parameter lte-CRS-PatternList1-r16. In another example, the multi-TRP configured UE may be configured with a CRS for each TRP. For example, a CRS pattern for TRP1 may be configured via the parameter lte-CRS-PatternList1-r16, and a CRS pattern for TRP2 may be configured via the parameter lte-CRS-Pattern- List2-r16. In a case where two TRPs are configured, whether to apply both CRS patterns of the TRP1 and the TRP2 or a CRS pattern of one TRP to a particular PDSCH may be determined via the parameter crs-RateMatch-PerCORESET-PoolIndex-r16. When the parameter crs-RateMatch-Per-CORESETPoolIndex-r16 is configured to be enabled, a CRS pattern of one TRP is applied, and otherwise, both CRS patterns of the two TRPs are all applied.

Table 17 below represents a ServingCellConfig IE including the CRS pattern, and Table 18 below represents a RateMatchPatternLTE-CRS IE including at least one parameter for a CRS pattern.

TABLE 17

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE (1..maxNrofBWPs)) OF BWP-Id |
| OPTIONAL, -- Need N | |
| downlinkBWP-ToAddModList | SEQUENCE (SIZE (1..maxNrofBWPs)) OF BWP-Downlink |
| OPTIONAL, -- Need N | |
| firstActiveDownlinkBWP-Id | BWP-Id |
| OPTIONAL, -- Cond SyncAndCellAdd | |
| bwp-InactivityTimer | ENUMERATED {ms2, ms3, ms4, ms5, ms6, ms8, ms10, ms20, ms30, |
| | ms40,ms50, ms60, ms80,ms100, ms200,ms300, ms500, |
| | ms750, ms1280, ms1920, ms2560, spare10, spare9, spare8, |
| | spare7, spare6, spare5, spare4, spare3, spare2, spare1 } |
| OPTIONAL, --Need R | |
| defaultDownlinkBWP-Id | BWP-Id |
| OPTIONAL, -- Need S | |
| uplinkConfig | UplinkConfig |
| OPTIONAL, -- Need M | |
| supplementaryUplink | UplinkConfig |
| OPTIONAL, -- Need M | |
| pdcch-ServingCellConfig | SetupRelease { PDCCH-ServingCellConfig } |
| OPTIONAL, -- Need M | |
| pdsch-ServingCellConfig | SetupRelease { PDSCH-ServingCellConfig } |
| OPTIONAL, -- Need M | |
| csi-MeasConfig | SetupRelease { CSI-MeasConfig } |
| OPTIONAL, -- Need M | |
| sCellDeactivationTimer | ENUMERATED {ms20, ms40, ms80, ms160, ms200, ms240, |
| | ms320, ms400, ms480, ms520, ms640, ms720, |
| | ms840, ms1280, spare2,spare1} OPTIONAL, -- Cond |
| ServingCellWithoutPUCCH | |
| crossCarrierSchedulingConfig | CrossCarrierSchedulingConfig |
| OPTIONAL, -- Need M | |
| tag-Id | TAG-Id, |
| dummy | ENUMERATED {enabled} |
| OPTIONAL, -- Need R | |
| pathlossReferenceLinking | ENUMERATED {spCell, sCell} |
| OPTIONAL, -- Cond SCellOnly | |
| servingCellMO | MeasObjectId |
| OPTIONAL, -- Cond MeasObject | |
| ..., | |
| [[ | |
| lte-CRS-ToMatchAround | SetupRelease { RateMatchPatternLTE-CRS } |
| OPTIONAL, -- Need M | |
| rateMatchPatternToAddModList | SEQUENCE (SIZE (1..maxNrofRateMatchPatterns)) OF RateMatchPattern |
| OPTIONAL, -- Need N | |
| rateMatchPatternToReleaseList | SEQUENCE (SIZE (1..maxNrofRateMatchPatterns)) OF RateMatchPatternId |
| OPTIONAL, -- Need N | |
| downlinkChannelBW-PerSCS-List | SEQUENCE (SIZE (1..maxSCSs)) OF SCS-SpecificCarrier |
| OPTIONAL -- Need S | |
| ]], | |
| [[ | |
| supplementaryUplinkRelease | ENUMERATED {true} |
| OPTIONAL, -- Need N | |
| tdd-UL-DL-ConfigurationDedicated-IAB-MT-r16 | TDD-UL-DL-ConfigDedicated-IAB-MT-r16 |
| OPTIONAL, -- Cond TDD__IAB | |
| dormantBWP-Config-r16 | SetupRelease { DormantBWP-Config-r16 } |
| OPTIONAL, -- Need M | |
| ca-SlotOffset-r16 | CHOICE { |
| refSCS15kHz | INTEGER (–2..2), |
| refSCS30KHz | INTEGER (–5..5), |

TABLE 17-continued

```
      refSCS60KHz                        INTEGER (-10..10),
      refSCS120KHz                       INTEGER (-20..20)
   }                                                       OPTIONAL,
-- Cond AsyncCA
   channelAccessConfig-r16              SetupRelease { ChannelAccessConfig-r16 }
OPTIONAL,  -- Need M
   intraCellGuardBandsDL-List-r16             SEQUENCE (SIZE (1..maxSCSs)) OF IntraCellGuardBandsPerSCS-r16
OPTIONAL,  -- Need S
   intraCellGuardBandsUL-List-r16             SEQUENCE (SIZE (1..maxSCSs)) OF IntraCellGuardBandsPerSCS-r16
OPTIONAL,  -- Need S
   csi-RS-ValidationWith-DCI-r16        ENUMERATED {enabled}
OPTIONAL,  -- Need R
   lte-CRS-PatternList1-r16             SetupRelease { LTE-CRS-PatternList-r16 }
OPTIONAL,  -- Need M
   lte-CRS-PatternList2-r16             SetupRelease { LTE-CRS-PatternList-r16 }
OPTIONAL,  -- Need M
   crs-RateMatch-PerCORESETPoolIndex-r16   ENUMERATED {enabled}
OPTIONAL,  -- Need R
   enableTwoDefaultTCI-States-r16       ENUMERATED {enabled}
OPTIONAL,  -- Need R
   enableDefaultTCI-StatePerCoresetPoolIndex-r16 ENUMERATED {enabled}
OPTIONAL,  -- Need R
   enableBeamSwitchTiming-r16           ENUMERATED {true}
OPTIONAL,  -- Need R
   cbg-TxDiffTBsProcessingType1-r16     ENUMERATED {enabled}
OPTIONAL,  -- Need R
   cbg-TxDiffTBsProcessingType2-r16     ENUMERATED {enabled}
OPTIONAL   -- Need R
   ]]
}
```

TABLE 18

```
      - RateMatchPatternLTE-CRS
The IE RateMatchPatternLTE-CRS is used to configure a pattern to rate match around LTE CRS. See
TS 38.214 [19], clause 5.1.4.2.
                          RateMatchPatternLTE-CRS information element
-- ASN1START
-- TAG-RATEMATCHPATTERNLTE-CRS-START
RateMatchPatternLTE-CRS ::=       SEQUENCE {
   carrierFreqDL                    INTEGER (0..16383),
   carrierBandwidthDL                 ENUMERATED {n6, n15, n25, n50, n75, n100, spare2,
spare1},
   mbsfn-SubframeConfigList           EUTRA-MBSFN-SubframeConfigList
OPTIONAL,   -- Need M
   nrofCRS-Ports                    ENUMERATED {n1, n2, n4},
   v-Shift                          ENUMERATED {n0, n1, n2, n3, n4, n5}
}
LTE-CRS-PatternList-r16 ::=          SEQUENCE (SIZE (1..maxLTE-CRS-Patterns-r16)) OF
RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

PDSCH: Associated with Frequency Resource Allocation

Figure 13:
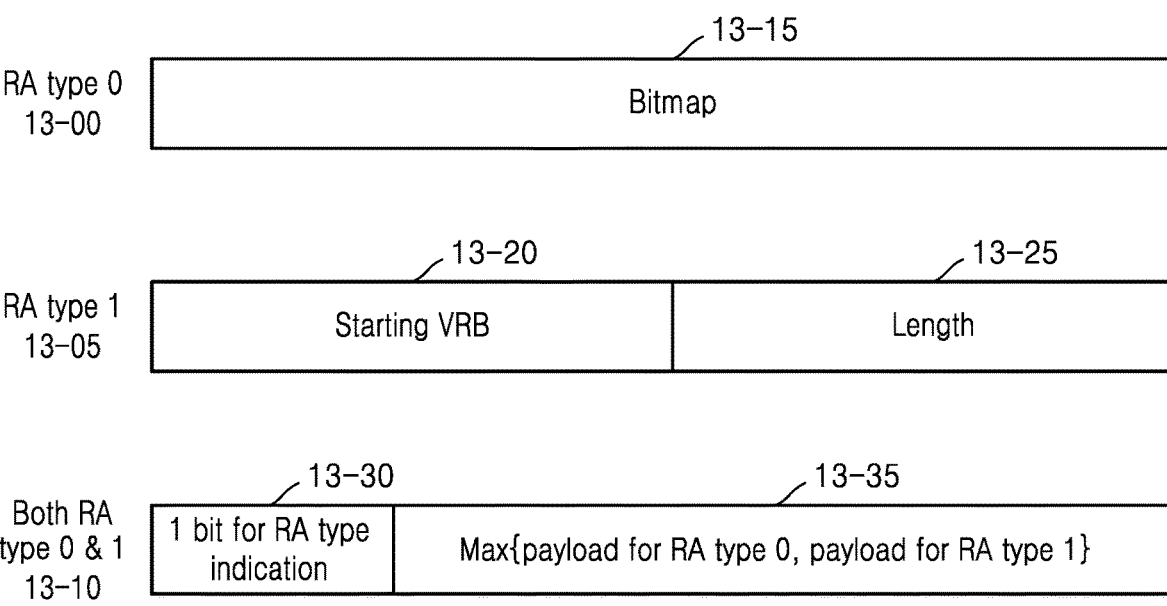
FIG. 13 is a diagram illustrating an example of physical downlink shared channel (PDSCH) frequency-axis resource allocation in a wireless communication system according to an embodiment of the disclosure.

FIG. 13 is a diagram illustrating an example of PDSCH frequency-axis resource allocation in a wireless communication system according to an embodiment of the disclosure.

FIG. 13 is a diagram illustrating three frequency-axis resource allocation methods, which are type 0 13-00, type 1 13-05, and dynamic switching 13-10, which are configurable by a higher layer signaling in an NR wireless communication system.

Referring to FIG. 13, when the UE is configured, by higher layer signaling, to use only resource type 0 (13-00), some DCI to allocate a PDSCH to the UE has a bitmap consisting of NRBG bits. Conditions for the above will be described at a later time. Here, the NRGB refers to the number of resource block groups (RBGs) determined as in Table 19 below according to a size of a BWP allocated by the BWP indicator and an upper layer parameter rbg-Size, and data is transmitted on an RBG represented by 1 based in the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured, by higher layer signaling, to use only resource type 1 (13-05), some DCI to allocate a PDSCH to the UE includes frequency-axis resource allocation information consisting of $\lceil \log_2(N_{RB}^{DL,BWP}(N_{RB}^{DL,BWP}+1)/2 \rceil$ bits. Conditions for the above will be described at a later time. Accordingly, the BS may configure a starting VRB 13-20 and length of frequency-axis resources 13-25 successively allocated from the starting VRB 13-20.

If the UE is configured, by higher layer signaling, to use both the resource type 0 and the resource type 1 (13-10), some DCI to allocate a PDSCH to the UE includes frequency-axis resource allocation information consisting of bits 13-35 corresponding to a larger value among a payload 13-15 for configuring the resource type 0 and a payloads 13-20 and 13-25 for configuring the resource type 1. Conditions for the above will be described at a later time. In this case, 1 bit 13-30 may be added to the most significant bit (MSB) of the frequency-axis allocation information in the DCI for RA type indication, and when the bit has a value of '0', it indicates that the resource type 0 is to be used, and when the bit has a value of '1', it indicates that the resource type 1 is to be used.

PDSCH/PUSCH: Associated with Time Resource Allocation

Hereinafter, a time domain resource allocation method for a data channel in the next generation mobile communication system (5G or NR system) will now be described.

The BS may configure the UE with Table of time domain resource allocation information for a DL data channel (PDSCH) and a UL data channel (PUSCH) by higher layer signaling (e.g., RRC signaling). For the PDSCH, Table including maximally up to 16 (maxNrofDL-Allocations=16) entries may be configured, and for the PUSCH, Table including maximally up to 16 (maxNrofUL-Allocations=16) entries may be configured. In an embodiment of the disclosure, the time domain resource allocation information may include PDCCH-to-PDSCH slot timing (corresponding to a time interval in slots between a reception time of PDCCH and a transmission time of PDSCH scheduled by the received PDCCH, and indicated as K0), PDCCH-to-PUSCH slot timing (corresponding to a time interval in slots between a reception time of PDCCH and a transmission time of PUSCH scheduled by the received PDCCH, and indicated as K2), information about location and length of a start symbol scheduled on the PDSCH or the PUSCH in the slot, a mapping type of PDSCH or PUSCH, or the like. For example, information as in Table 20 or Table 21 below may be transmitted from the BS to the UE.

TABLE 20

| PDSCH-TimeDomainResourceAllocationList information element |
|---|
| PDSCH-TimeDomainResourceAllocationList ::=SEQUENCE (SIZE(1..maxNrofDL-Allocations)) OF PDSCH-TimeDomainResourceAllocation PDSCH-TimeDomainResourceAllocation ::= SEQUENCE { k0                                                                           INTEGER(0..32) OPTIONAL, - - Need S (PDCCH-to-PDSCH timing, slot unit) mappingType                                    ENUMERATED {typeA, typeB}, (PDSCH mapping type) startSymbolAndLength                          INTEGER (0..127) } |

TABLE 21

| PUSCH-TimeDomainResourceAllocation information element |
|---|
| PUDSCH-TimeDomainResourceAllocationList ::= SEQUENCE (SIZE(1..maxNrofUL-Allocations)) OF PUSCH-TimeDomainResourceAllocation PUSCH-TimeDomainResourceAllocation ::= SEQUENCE { k2                                                                           INTEGER(0..32) OPTIONAL, -- Need S (PDCCH-to-PDSCH timing, slot unit) mappingType                                    ENUMERATED {typeA, typeB}, (PUSCH mapping type) startSymbolAndLength                          INTEGER (0..127) (start symbol and length and PUSCH) } |

The BS may notify the UE of at least one of the entries in Table about the time domain resource allocation information by L1 signaling. (e.g., the one entry may be indicated in a 'time domain resource allocation' field in the DCI). The UE may obtain the time domain resource allocation information for the PDSCH or the PUSCH, based on the DCI received from the BS.

Figure 14:
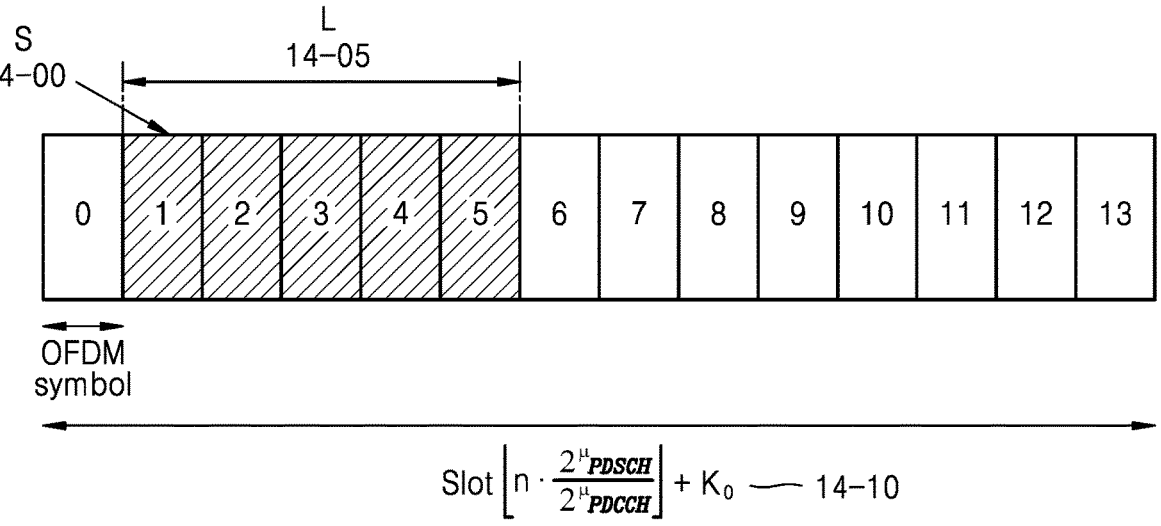
FIG. 14 is a diagram illustrating an example of PDSCH time-axis resource allocation in a wireless communication system according to an embodiment of the disclosure.

FIG. 14 is a diagram illustrating an example of PDSCH time-axis resource allocation in a wireless communication system according to an embodiment of the disclosure.

Referring to FIG. 14, the BS may indicate a position of a PDSCH resource in the time axis based on subcarrier spacings (SCSs) ($\mu_{PDSCH}$, $\mu_{PDCCH}$) of a data channel and a control channel and a scheduling offset $K_0$, which are configured by using a higher layer signaling, and a start position 14-00 and length 14-05 of OFDM symbols in a slot 14-10 dynamically indicated in DCI.

Figure 15:
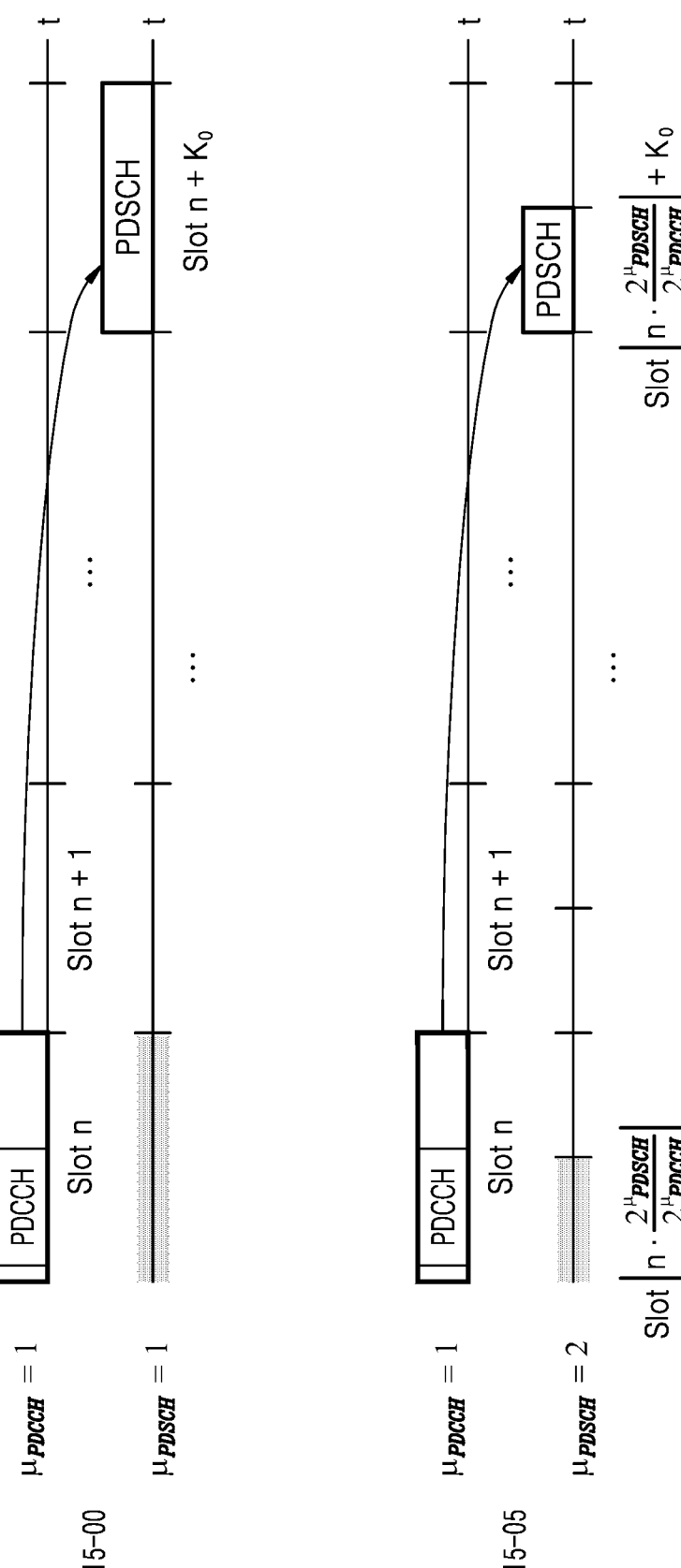
FIG. 15 is a diagram illustrating an example of time-axis resource allocation based on subcarrier spacings of a data channel and a control channel in a wireless communication system according to an embodiment of the disclosure.

FIG. 15 is a diagram illustrating an example of time-axis resource allocation based on SCSs of a data channel and a control channel in a wireless communication system according to an embodiment of the disclosure.

Referring to FIG. 15, when SCSs of the data channel and the control channel are equal, i.e., $\mu_{PDSCH}=\mu_{PDCCH}$ (15-00), slot numbers for data and control are equal, such that the BS and the UE may generate a scheduling offset according to the preset slot offset $K_0$. On the other hand, when SCSs of the data channel and the control channel are different, i.e., $\mu_{PDSCH}\neq\mu_{PDCCH}$ (15-05), slot numbers for data and control are different, such that the BS and the UE may generate a scheduling offset according to the preset slot offset $K_0$ based on the SCS of the PDCCH.

PDSCH: Processing Time

Hereinafter, a PDSCH processing procedure time will now be described. When the BS schedules to transmit a PDSCH to the UE by using DCI format 1_0, 1_1 or 1_2, the UE may need a PDSCH processing time to receive the PDSCH by applying a transmission method (a modulation/demodulation and coding scheme (MCS) indicator index (MCS), information relating to a demodulation reference signal, time and frequency resource allocation information, and the like) indicated by DCI. In consideration of information above, NR defines a PDSCH processing time. The PDSCH processing time of the UE may be calculated using Equation 3 below.

$$T_{proc,1}=(N_1+d_{1,1}+d_2)(2048+144)\kappa2^{-\mu}T_c+T_{ext} \quad \text{Equation 3}$$

Variables in $T_{proc,1}$ expressed in Equation 3 may have the following meanings.

$N_1$: the number of symbols determined according to UE processing capability 1 or 2 and numerology $\mu$. When the UE capability 1 is reported in a UE capability report, it may have a value based on Table 22, and when the UE capability 2 is reported in the UE capability report and when it is configured, by higher layer signaling, that the UE capability 2 is available, it may have a value based on Table 23. The numerology $\mu$ may correspond to a smallest value among $\mu_{PDCCH}$, $\mu_{PDSCH}$, and $\mu_{UL}$ to maximize $T_{proc,1}$, and $\mu_{PDCCH}$, $\mu_{PDSCH}$, and $\mu_{UL}$ may respectively refer to numerology of the PDCCH that schedules the PDSCH, numerology of the scheduled PDSCH, and numerology of a UL channel on which HARQ-ACK is to be transmitted.

TABLE 22

| | PDSCH decoding time $N_1$ [symbols] | |
| --- | --- | --- |
| $\mu$ | In case, for both of PDSCH mapping type A and B, dmrs-AdditionalPosition in DMRS-DownlinkConfig is pos0 | In case, for both of PDSCH mapping type A and B, dmrs-AdditionalPosition in DMRS-DownlinkConfig is not pos0 or the higher layer parameter is not configured |
| 0 | 8 | $N_{1,0}$ |
| 1 | 10 | 13 |
| 2 | 17 | 20 |
| 3 | 20 | 24 |

TABLE 23

| $\mu$ | PDSCH decoding time $N_1$ [symbols] In case, for both of PDSCH mapping type A and B, dmrs-AdditionalPosition in DMRS-DownlinkConfig is pos0 |
| --- | --- |
| 0 | 3 |
| 1 | 4.5 |
| 2 | 9 for frequency range 1 |

K: 64

$T_{ext}$: when the UE uses a shared spectrum channel access scheme, the UE may calculate $T_{ext}$ and may apply $T_{ext}$ to the PDSCH processing time. Otherwise, $T_{ext}$ is assumed to be 0.

If $1_1$ indicating a PDSCH DMRS location value is 12, N1,0 of Table 22 above may have a value of 14 and otherwise, may have a value of 13.

With respect to PDSCH mapping type A, a last symbol of the PDSCH is i-th symbol in a slot in which the PDSCH is transmitted, and $d_{1,1}$ is 7-i when i<7, and otherwise, $d_{1,1}$ is 0.

$d_2$: When a PUCCH having a high priority index and a PUCCH or PUSCH having a low priority index overlap on the time domain, $d_2$ of the PUCCH having the high priority index may be configured as a value reported from the UE. Otherwise, $d_2$ is 0.

When PDSCH mapping type B is used for UE processing capability 1, a value of $d_{1,1}$ may be determined according to L that is the number of symbols of the scheduled PDSCH and d that is the number of symbols overlapping between the PDCCH to schedule the PDSCH and the scheduled PDSCH.

When L≥7, $d_{1,1}$=0.

When L≥4 and L≤6, $d_{1,1}$=7−L.

When L=3, $d_{1,1}$=min (d, 1).

When L=2, $d_{1,1}$=3+d.

When PDSCH mapping type B is used for UE processing capability 2, a value of du may be determined according to L that is the number of symbols of the scheduled PDSCH and d that is the number of symbols overlapping between the PDCCH to schedule the PDSCH and the scheduled PDSCH.

When L≥7, $d_{1,1}$=0.

When L≥4 and L≤6, $d_{1,1}$=7−L.

When L=2, if the scheduling PDCCH exists in a CORESET consisting of three symbols, and the CORESET and the scheduled PDSCH have a same start symbol, $d_{1,1}$=3. Otherwise, $d_{1,1}$=d.

For the UE that supports capability 2 in a given serving cell, a PDSCH processing time according to the UE processing capability 2 may be applied when the UE is configured with 'enabled' for processingType2Enabled that is higher layer signaling for the cell.

When a position of the first UL transmission symbol of a PUCCH including HARQ-ACK information (for the position, K1 defined as a transmission point in time of the HARQ-ACK, a PUCCH resource used for HARQ-ACK transmission, and a timing advance effect may be considered) is not started earlier than the first UL transmission symbol that comes in a time of $T_{proc,1}$ after the last symbol of the PDSCH, the UE has to transmit a valid HARQ-ACK message. In other words, the UE needs to transmit a PUCCH including HARQ-ACK only when the PDSCH processing time is sufficient. Otherwise, the UE is not able to provide valid HARQ-ACK information corresponding to the scheduled PDSCH to the BS. $T-_{proc,1}$ above may be used for both normal CP and extended CP. For a PDSCH having two PDSCH transmission positions in one slot, $d_{1,1}$ is calculated based on the first PDSCH transmission position in the slot.

PDSCH: Reception Preparation Time for Cross-Carrier Scheduling

Hereinafter, a PDSCH reception preparation time of the UE which is N-$_{pdsch}$ defined for a time gap between the PDCCH and the PDSCH for a case of cross-carrier scheduling where the numerology $\mu_{PDCCH}$ for transmitting the scheduling PDCCH and the numerology $\mu_{PDSCH}$ for transmitting the PDSCH scheduled by the PDCCH are different will now be described.

If $\mu_{PDCCH}<\mu_{PDSCH}$, the scheduled PDSCH cannot be transmitted before a first symbol of a slot that comes after N$_{pdsch}$ symbols from a last symbol of the PDCCH that schedules the PDSCH. A transmission symbol of the PDSCH may include a DM-RS.

If $\mu_{PDCCH}>\mu_{PDSCH}$, the scheduled PDSCH may be transmitted after N$_{pdsch}$ symbols from the last symbol of the PDCCH that schedules the PDSCH. A transmission symbol of the PDSCH may include a DM-RS.

TABLE 24

| N$_{pdsch}$ according to scheduled PDCCH SCS | |
| --- | --- |
| $\mu_{PDCCH}$ | N$_{pdsch}$ [symbols] |
| 0 | 4 |
| 1 | 5 |
| 2 | 10 |
| 3 | 14 |

PDSCH: TCI State Activation MAC-CE

Hereinafter, a beam configuration method for a PDSCH will now be described.

FIG. 16 illustrates a procedure for beam configuration and activation for a PDSCH according to an embodiment of the disclosure.

Referring to FIG. 16, in operation 16-00, a list of TCI states for a PDSCH may be indicated by a higher layer list such as RRC. The list of TCI states may be indicated by tci-StatesToAddModList and/or tci-StatesToReleaseList in a PDSCH-Config IE for each BWP. In operation 16-20, some TCI states among the TCI states of the list may be activated by an MAC CE. A maximum number of TCI states to be activated may be determined based on a capability reported by the UE. An example of MAC-CE structures for PDSCH TCI state activation/deactivation is illustrated in 16-50.

Meanings and configurable values of each field in the MAC CE are as below.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively; BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells; $T_i$: If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with $T_i$ field set to 1 shall be mapped to the codepoint value 0, second TCI State with Ti field set to 1 shall be mapped to the codepoint value 1 and so on. The maximum number of activated TCI states is 8; CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

Associated with SRS

Hereinafter, a UL channel estimation method using sounding reference signal (SRS) transmission of the UE will now be described. The BS may configure the UE with at least one SRS configuration for each UL BWP so as to transmit configuration information for SRS transmission, and may configure the UE with at least one SRS resource set for each SRS configuration. For example, the BS and the UE may exchange higher layer signaling information to deliver information about the SRS resource set.

srs-ResourceSetId: SRS resource set index srs-ResourceIdList: a set of SRS resource indexes referred to from the SRS resource set resourceType: time-axis transmission configuration of an SRS resource referred to from the SRS resource set, which may be configured to one of 'periodic', 'semi-persistent', and 'aperiodic'. If resourceType is configured to 'periodic' or 'semi-persistent', associated CSI-RS information may be provided according to the usage of the SRS resource set. If resourceType is configured to 'aperiodic', an aperiodic SRS resource trigger list and slot offset information may be provided, and associated CSI-RS information may be provided according to the usage of the SRS resource set.

usage: configuration of the usage of an SRS resource referred to from the SRS resource set, which may be configured to one of 'beamManagement', 'codebook', 'nonCodebook', and 'antennaSwitching'.

alpha, p0, pathlossReferenceRS, srs-PowerControlAd-justmentStates: provides parameter configuration for transmission power control for an SRS resource referred to from the SRS resource set.

The UE may determine that an SRS resource included in a set of SRS resource indexes referred to from the SRS resource set follows information configured for the SRS resource set.

Also, the BS and the UE may transmit or receive higher layer signaling information for delivering individual configuration information for an SRS resource. For example, the individual configuration information for the SRS resource may include time-frequency axis mapping information in a slot of the SRS resource, and the time-frequency axis mapping information may include information about intra-slot or inter-slot frequency hopping of the SRS resource. Furthermore, the individual configuration information for the SRS resource may include time-axis transmission configuration for the SRS resource, which may be configured to one of 'periodic', 'semi-persistent', and 'aperiodic'. This may be limited to having the same time-axis transmission configuration as the SRS resource set including the SRS resource. When the time-axis transmission configuration for the SRS resource is configured to 'periodic' or 'semi-persistent', additional SRS resource transmission periodicity and slot offset (e.g., periodicityAndOffset) may be included in the time-axis transmission configuration.

The BS may activate or deactivate, or trigger SRS transmission to the UE by higher layer signaling including RRC signaling or MAC CE signaling, or L1 signaling (e.g., DCI). For example, the BS may activate or deactivate periodic SRS transmission to the UE by higher layer signaling. The BS may indicate activation of an SRS resource set for which resourceType is configured to 'periodic' by higher layer signaling, and the UE may transmit an SRS resource referred to from the activated SRS resource set. Time-frequency axis resource mapping of the SRS resource to be transmitted in a slot follows resource mapping information configured for the SRS resource, and slot mapping including transmission periodicity and slot offset follows periodicityAndOffset configured for the SRS resource. Furthermore, a spatial domain transmission filter applied to the SRS resource to be transmitted may refer to spatial relation info configured for the SRS resource, or may refer to associated CSI-RS information configured for the SRS resource set including the SRS resource. The UE may transmit the SRS resource in a UL BWP activated for the periodic SRS resource activated by higher layer signaling.

For example, the BS may activate or deactivate semi-persistent SRS transmission to the UE by higher layer signaling. The BS may indicate activation of an SRS resource set by MAC CE signaling, and the UE may transmit an SRS resource referred to from the activated SRS resource set. The SRS resource set activated by MAC CE signaling may be limited to an SRS resource set for which the resourceType is configured to 'semi-persistent'. Intra-slot time-frequency axis resource mapping of the SRS resource to be transmitted follows resource mapping information configured for the SRS resource, and slot mapping including transmission periodicity and slot offset follows periodicity-AndOffset configured for the SRS resource. Also, a spatial domain transmission filter applied to the SRS resource to be transmitted may refer to spatial relation info configured for the SRS resource or may refer to associated CSI-RS information configured for the SRS resource set including the SRS resource. If spatial relation info is configured for the SRS resource, the spatial domain transmission filter may not follow the spatial relation info but may be determined by referring to configuration information about spatial relation info delivered by MAC CE signaling that activates semi-persistent SRS transmission. The UE may transmit the SRS resource in a UL BWP activated for the semi-persistent SRS resource activated by higher layer signaling.

For example, the BS may trigger aperiodic SRS transmission to the UE by DCI. The BS may indicate one of aperiodic SRS resource triggers (aperiodicSRS-Resource-Trigger) via an SRS request field of the DCI. The UE may determine that an SRS resource set including the aperiodic SRS resource trigger indicated by the DCI in an aperiodic SRS resource trigger list among configuration information of the SRS resource set has been triggered. The UE may transmit an SRS resource referred to from the triggered SRS resource set. Intra-slot time-frequency axis resource mapping of the SRS resource to be transmitted follows resource mapping information configured for the SRS resource. Also, slot mapping of the SRS resource to be transmitted may be determined by a slot offset between a PDCCH including the DCI and the SRS resource, and may be referred to a value (or values) included in a slot offset set configured for the SRS resource set. In more detail, for the slot offset between the PDCCH including the DCI and the SRS resource, a value indicated by a time domain resource assignment field of the DCI among offset value(s) included in the slot offset set configured for the SRS resource set may be applied. Furthermore, a spatial domain transmission filter applied to the SRS resource to be transmitted may refer to spatial relation info configured for the SRS resource or may refer to associated CSI-RS information configured for the SRS resource set including the SRS resource. The UE may transmit the SRS resource in a UL BWP activated for the aperiodic SRS resource triggered by the DCI.

When the BS triggers aperiodic SRS transmission to the UE by DCI, a minimum time interval between a PDCCH including the DCI that triggers the aperiodic SRS transmission and an SRS to be transmitted may be required for the UE to transmit the SRS by applying configuration information for the SRS resource. The time interval for SRS transmission by the UE may be defined as the number of symbols between a last symbol of the PDCCH including the DCI that triggers the aperiodic SRS transmission and a first symbol to which an SRS resource to be initially transmitted among SRS resource(s) is mapped. The minimum time interval may be determined by referring to a PUSCH preparation procedure time required for the UE to prepare PUSCH transmission. Also, the minimum time interval may have a different value according to the usage of the SRS resource set including the SRS resource to be transmitted. For example, the minimum time interval may be determined to be N2 symbols defined by referring to a PUSCH preparation procedure time of the UE and considering a UE processing capability based on the UE capability. Also, when the usage of the SRS resource set is configured to 'codebook' or 'antennaSwitching' by considering the usage of the SRS resource set including the SRS resource to be transmitted, the minimum time interval may be determined to be N2 symbols, and when the usage of the SRS resource set is configured to 'nonCodebook' or 'beamManagement', the minimum time interval may be determined to be N2+14 symbols. When the time interval for aperiodic SRS transmission is equal to or greater than the minimum time interval, the UE may transmit an aperiodic SRS, and when the time interval for aperiodic SRS transmission is smaller than the minimum time interval, the UE may ignore the DCI that triggers the aperiodic SRS.

TABLE 25

```
SRS-Resource ::=                SEQUENCE {
  srs-ResourceId                  SRS-ResourceId,
  nrofSRS-Ports                   ENUMERATED {port1, ports2, ports4},
  ptrs-PortIndex                      ENUMERATED {n0, n1 }
OPTIONAL,   -- Need R
  transmissionComb                CHOICE {
    n2                              SEQUENCE {
       combOffset-n2                  INTEGER (0..1),
       cyclicShift-n2                 INTEGER (0..7)
    },
    n4                              SEQUENCE {
       combOffset-n4                  INTEGER (0..3),
       cyclicShift-n4                 INTEGER (0..11)
    }
  },
  resourceMapping                 SEQUENCE {
    startPosition                   INTEGER (0..5),
    nrofSymbols                     ENUMERATED {n1, n2, n4},
    repetitionFactor                ENUMERATED {n1, n2, n4}
  },
  freqDomainPosition              INTEGER (0..67),
  freqDomainShift                 INTEGER (0..268),
  freqHopping                     SEQUENCE {
    c-SRS                           INTEGER (0..63),
    b-SRS                           INTEGER (0..3),
    b-hop                           INTEGER (0..3)
  },
  groupOrSequenceHopping          ENUMERATED { neither, groupHopping,
sequenceHopping },
  resourceType                    CHOICE {
    aperiodic                       SEQUENCE {
       ...
    },
    semi-persistent                 SEQUENCE {
       periodicityAndOffset-sp          SRS-PeriodicityAndOffset,
       ...
    },
    periodic                        SEQUENCE {
       periodicityAndOffset-p         SRS-PeriodicityAndOffset,
       ...
    }
  },
  sequenceId                      INTEGER (0..1023),
  spatialRelationInfo                 SRS-SpatialRelationInfo
OPTIONAL,   -- Need R
  ...
}
```

Configuration information of spatialRelationInfo in Table 25 above is to refer to one reference signal and apply beam information of the reference signal to a beam to be used for the SRS transmission. For example, the configuration of spatialRelationInfo may include information as in Table 26 below.

TABLE 26

```
SRS-SpatialRelationInfo ::=   SEQUENCE {
  servingCellId               ServCellIndex    OPTIONAL,   -- Need
S
  referenceSignal             CHOICE {
    ssb-Index                   SSB-Index,
    csi-RS-Index                NZP-CSI-RS-ResourceId,
    srs                         SEQUENCE {
       resourceId                 SRS-ResourceId,
       uplinkBWP                  BWP-Id
    }
  }
}
```

Referring to the spatialRelationInfo configuration, in order to use beam information of a particular reference signal, an SS/PBCH block index, a CSI-RS index or an SRS index may be configured as an index of a reference signal to be referred to. Higher layer signaling referenceSignal is configuration information indicating which beam information of a reference signal is to be referred to for the SRS transmission, and ssb-index refers to an index of an SS/PBCH, csi-RS-index refers to an index of a CSI-RS, and srs refers to an index of an SRS. When a value of the higher layer signaling referenceSignal is configured to 'ssb-Index', the UE may apply a reception beam, which has been used to receive an SS/PBCH block corresponding to the ssb-index, to a transmission beam for corresponding SRS transmission. When a value of the higher layer signaling referenceSignal is configured to 'csi-RS-Index', the UE may apply a reception beam, which has been used to receive a CSI-RS corresponding to the csi-RS-index, to a transmission beam for corresponding SRS transmission. When a value of the higher layer signaling referenceSignal is configured to 'srs', the UE may apply a transmission beam, which has been used to transmit an SRS corresponding to the srs, to a transmission beam for corresponding SRS transmission.

PUSCH: Associated with Transmission Scheme

Hereinafter, a PUSCH transmission scheduling scheme will now be described. PUSCH transmission may be dynamically scheduled by UL grant in DCI or may be operated by configured grant Type 1 or Type 2. Dynamic scheduling indication for PUSCH transmission may be indicated by DCI format 0_0 or 0_1.

gIdentityPUSCH, txConfig, codebookSubset, maxRank, scaling of UCI-OnPUSCH provided by higher layer signaling that is pusch-Config of Table 28. When the UE receives transformPrecoder in higher layer signaling that is configuredGrantConfig of Table 27, the UE applies tp-pi2BPSK in pusch-Config of Table 28 to the PUSCH transmission operated by the configured grant.

TABLE 27

```
ConfiguredGrantConfig ::=          SEQUENCE {
    frequencyHopping               ENUMERATED {intraSlot, interSlot}
OPTIONAL,   -- Need S,
    cg-DMRS-Configuration          DMRS-UplinkConfig,
    mcs-Table                      ENUMERATED {qam256, qam64LowSE}
OPTIONAL,   -- Need S
    mcs-TableTransformPrecoder     ENUMERATED {qam256, qam64LowSE}
OPTIONAL,   -- Need S
    uci-OnPUSCH                    SetupRelease { CG-UCI-OnPUSCH }
OPTIONAL,   -- Need M
    resourceAllocation             ENUMERATED { resourceAllocationType0, resourceAllocationType1, dynamicSwitch },
    rbg-Size                       ENUMERATED {config2}
OPTIONAL,   -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}
OPTIONAL,   -- Need S
    nrofHARQ-Processes              INTEGER(1..16),
    repK                            NUMERATED {n1, n2, n4, n8},
    repK-RV                         ENUMERATED {s1-0231, s2-0303, s3-0000}
OPTIONAL,   -- Need R
    periodicity                    ENUMERATED {
                                        sym2, sym7, sym1x14, sym2x14, sym4x14, sym5x14, sym8x14, sym10x14,
sym16x14, sym20x14,
                                        sym32x14, sym40x14, sym64x14, sym80x14, sym128x14, sym160x14,
sym256x14, sym320x14, sym512x14,
                                        sym640x14, sym1024x14, sym1280x14, sym2560x14,
sym5120x14,
                                        sym6, sym1x12, sym2x12, sym4x12, sym5x12, sym8x12, sym10x12,
sym16x12, sym20x12, sym32x12,
                                        sym40x12, sym64x12, sym80x12, sym128x12, sym160x12, sym256x12,
sym320x12, sym512x12, sym640x12,
                                        sym1280x12, sym2560x12
        },
    configuredGrantTimer           INTEGER (1..64)
OPTIONAL,   -- Need R
    rrc-ConfiguredUplinkGrant      SEQUENCE {
        timeDomainOffset           INTEGER (0..5119),
        timeDomainAllocation       INTEGER (0..15),
        frequencyDomainAllocation  BIT STRING (SIZE(18)),
        antennaPort                INTEGER (0..31),
        dmrs-SeqInitialization     INTEGER (0..1)
OPTIONAL,   -- Need R
        precodingAndNumberOfLayers    INTEGER (0..63),
        srs-ResourceIndicator      INTEGER (0..15)
OPTIONAL,   -- Need R
        mcsAndTBS                     INTEGER (0..31),
        frequencyHoppingOffset     INTEGER (1..maxNrofPhysicalResourceBlocks−1),
        pathlossReferenceIndex     INTEGER (0..maxNrofPUSCH-PathlossReferenceRSs−1),
        ...
    }
OPTIONAL,   -- Need R
    ...
}
```

Configured grant Type 1 PUSCH transmission may be semi-statically configured not by receiving UL grant in DCI but by receiving configuredGrantConfig including rrc-ConfiguredUplinkGrant of Table 27 below by higher layer signaling. Configured grant Type 2 PUSCH transmission may be semi-persistently scheduled by UL grant in DCI after receiving configuredGrantConfig that does not include rrc-ConfiguredUplinkGrant of Table 27 by higher layer signaling. When the PUSCH transmission is operated by configured grant, parameters to be applied to the PUSCH transmission are applied by higher layer signaling configuredGrantConfig of Table 27 except for dataScramblin- Hereinafter, a PUSCH transmission method will now be described. A DMRS antenna port for PUSCH transmission is equal to an antenna port for SRS transmission. PUSCH transmission may follow a codebook based transmission method or a non-codebook based transmission method depending on whether a value of txConfig in higher layer signaling that is pusch-Config of Table 28 is 'codebook' or 'nonCodebook'.

As described above, PUSCH transmission may be dynamically scheduled by DCI format 0_0 or 0_1, or may be semi-statically configured by the configured grant. If the UE receives an indication of scheduling of PUSCH transmission by DCI format 0_0, the UE performs beam configuration for PUSCH transmission by using pucch-spatialRelationInfoID corresponding to a UE-specific PUCCH resource corresponding to a smallest ID in an activated UL BWP in the serving cell, and in this regard, the PUSCH transmission is based on a single antenna port. The UE does not expect scheduling for the PUSCH transmission by DCI format 0_0 in a BWP on which a PUCCH resource including pucch-spatialRelationInfo is not configured. When the UE is not configured with txConfig in the pusch-Config of Table 28, the UE does not expect to be scheduled by DCI format 0_1.

resource corresponding to the SRI among SRS resources transmitted before the PDCCH including the SRI. Also, the TPMI and the transmission rank may be given by precoding information and number of layers that is a field in the DCI or may be configured by precodingAndNumberOfLayers that is higher layer signaling. The TPMI is used to indicate a precoder to be applied to PUSCH transmission. If the UE is configured with one SRS resource, the TPMI is used to indicate a precoder to be applied in the configured one SRS resource. If the UE is configured with a plurality of SRS

TABLE 28

```
PUSCH-Config ::=                         SEQUENCE {
    dataScramblingIdentityPUSCH              INTEGER (0..1023)
OPTIONAL,   -- Need S
    txConfig                                 ENUMERATED {codebook, nonCodebook}
OPTIONAL,   -- Need S
    dmrs-UplinkForPUSCH-MappingTypeA           SetupRelease { DMRS-UplinkConfig }
OPTIONAL,   -- Need M
    dmrs-UplinkForPUSCH-MappingTypeB         SetupRelease { DMRS-UplinkConfig }
OPTIONAL,   -- Need M
    pusch-PowerControl                         PUSCH-PowerControl
OPTIONAL,   -- Need M
    frequencyHopping                          ENUMERATED {intraSlot, interSlot}
OPTIONAL,   -- Need S
    frequencyHoppingOffsetLists               SEQUENCE (SIZE (1..4)) OF INTEGER (1.. maxNrofPhysicalResourceBlocks−1)
OPTIONAL, -- Need M
    resourceAllocation                        ENUMERATED { resourceAllocationType0, resourceAllocationType1,
dynamicSwitch},
    pusch-TimeDomainAllocationList            SetupRelease { PUSCH-TimeDomainResourceAllocationList }
OPTIONAL,   -- Need M
    pusch-AggregationFactor                   ENUMERATED { n2, n4, n8 }
OPTIONAL,   -- Need S
    mcs-Table                                ENUMERATED {qam256, qam64LowSE}
OPTIONAL,   -- Need S
    mcs-TableTransformPrecoder                ENUMERATED {qam256, qam64LowSE}
OPTIONAL,   -- Need S
    transformPrecoder                         ENUMERATED {enabled, disabled}
OPTIONAL,   -- Need S
    codebookSubset                            ENUMERATED {fullyAndPartialAndNonCoherent,
partialAndNonCoherent,nonCoherent}
                                                                            OPTIONAL,
-- Cond codebookBased
    maxRank                                   INTEGER (1..4)                OPTIONAL,
-- Cond codebookBased
    rbg-Size                                  ENUMERATED { config2}
OPTIONAL, -- Need S
    uci-OnPUSCH                               SetupRelease { UCI-OnPUSCH}
OPTIONAL, -- Need M
    tp-pi2BPSK                                ENUMERATED {enabled}
OPTIONAL, -- Need S
    ...
}
```

Hereinafter, codebook based PUSCH transmission will now be described. Codebook based PUSCH transmission may be dynamically scheduled by DCI format 0_0 or 0_1, or may be semi-statically operated by the configured grant. When the codebook based PUSCH transmission is dynamically scheduled by DCI format 0_1 or semi-statically configured by the configured grant, the UE determines a precoder for PUSCH transmission based on an SRS resource indicator (SRI), a transmission precoding matrix indicator (TPMI), and a transmission rank (the number of PUSCH transmission layers).

Here, the SRI may be given by an SRS resource indicator that is a field in DCI or may be configured by srs-ResourceIndicator that is higher layer signaling. The UE may be configured with at least one SRS resource for codebook based PUSCH transmission, and may be configured with up to two SRS resources. When the UE receives the SRI by DCI, an SRS resource indicated by the SRI refers to an SRS resources, the TPMI is used to indicate a precoder to be applied in the SRS resource indicated by the SRI.

The precoder to be used in PUSCH transmission is selected from a UL codebook having the same number of antenna ports as a value of nrofSRS-Ports in SRS-Config that is higher layer signaling. In the codebook based PUSCH transmission, the UE determines a codebook subset based on the TPMI and codebookSubset in pusch-Config that is higher layer signaling. The codebookSubset in the pusch-Config that is higher layer signaling may be configured as one of 'fullyAndPartialAndNonCoherent', 'partialAndNonCoherent', and 'nonCoherent', based on the UE capability reported by the UE to the BS. If the UE reports 'partialAndNonCoherent' in the UE capability, the UE does not expect that a value of codebookSubset that is higher layer signaling is configured to be 'fullyAndPartialAndNonCoherent'. If the UE reports 'nonCoherent' in the UE capability, the UE does not expect that a value of codebookSubset that is higher layer signaling is configured to be 'fullyAndPartialAndNon-Coherent' or 'partialAndNonCoherent'. When nrofSRS-Ports in SRS-ResourceSet that is higher layer signaling indicates two SRS antenna ports, the UE does not expect that a value of codebookSubset that is higher layer signaling is configured to be 'partialAndNonCoherent'.

The UE may be configured with one SRS resource set with a value of the usage in SRS-ResourceSet that is higher layer signaling being configured to 'codebook', and one SRS resource in the SRS resource set may be indicated by the SRI. If several SRS resources are configured in the SRS resource set in which a value of the usage in SRS-Resource-Set that is higher layer signaling is configured to 'codebook', the UE expects that nrofSRS-Ports in SRS-Resource that is higher layer signaling is configured to have the same value for all SRS resources.

The UE transmits, to the BS, one or multiple SRS resources included in the SRS resource set with a value of the usage configured to 'codebook' by higher layer signaling, and the BS selects one of the SRS resources transmitted from the UE and indicates the UE to perform PUSCH transmission by using transmission beam information of the SRS resource. Here, for the codebook based PUSCH transmission, the SRI is used as information for selecting an index of the one SRS resource and is included in DCI. In addition, the BS may add, to the DCI, information indicating a TPMI and a rank to be used by the UE for PUSCH transmission. The UE performs, by using the SRS resource indicated by the SRI, PUSCH transmission by applying the precoder indicated by the rank and the TPMI indicated based on the transmission beam of the SRS resource.

Hereinafter, non-codebook based PUSCH transmission will now be described. Non-codebook based PUSCH transmission may be dynamically scheduled by DCI format 0_0 or 0_1, or semi-statically operated by the configured grant. When at least one SRS resource in an SRS resource set in which a value of the usage in SRS-ResourceSet that is higher layer signaling is configured to 'nonCodebook' is configured, the UE may be scheduled for non-codebook based PUSCH transmission by DCI format 0_1.

For the SRS resource set with a value of the usage in SRS-ResourceSet that is higher layer signaling being configured to 'nonCodebook', the UE may be configured with one associated non-zero power CSI-RS (NZP CSI-RS) resource. The UE may perform calculation on a precoder for SRS transmission by measuring the NZP CSI-RS resource associated with the SRS resource set. If a difference between a last reception symbol of an aperiodic NZP CSI-RS resource associated with the SRS resource set and a first symbol of aperiodic SRS transmission from the UE is less than 42 symbols, the UE does not expect that information about the precoder for SRS transmission is to be updated.

When a value of resourceType in SRS-ResourceSet that is higher layer signaling is configured to 'aperiodic', an associated NZP CSI-RS is indicated by the field SRS request in DCI format 0_1 or 1_1. Here, when the associated NZP CSI-RS resource is an aperiodic NZP CSI-RS resource, it indicates existence of an NZP CSI-RS associated for a case where the value of the field SRS request in DCI format 0_1 or 1_1 is not '00'. Here, the DCI shall not indicate cross carrier or cross BWP scheduling. Also, if the value of the SRS request indicates the existence of the NZP CSI-RS, the NZP CSI-RS is located in a slot in which a PDCCH including the SRS request field is transmitted. Here, TCI states configured for a scheduled subcarrier are not configured to QCL-TypeD.

If a periodic or semi-persistent SRS resource set is configured, an associated NZP CSI-RS may be indicated by associatedCSI-RS in SRS-ResourceSet that is higher layer signaling. For non-codebook based transmission, the UE does not expect both the spatialRelationInfo that is higher layer signaling for an SRS resource and associatedCSI-RS in the SRS-ResourceSet that is higher layer signaling to be configured.

When the UE is configured with a plurality of SRS resources, the UE may determine a precoder and a transmission rank to be applied to PUSCH transmission, based on the SRI indicated by the BS. Here, the SRI may be indicated by an SRS resource indicator that is a field in DCI or may be configured by srs-ResourceIndicator that is higher layer signaling. Likewise, in regard to the codebook based PUSCH transmission, when the UE is provided the SRI by DCI, an SRS resource indicated by the SRI refers to an SRS resource corresponding to the SRI among SRS resources transmitted before the PDCCH including the SRI. The UE may use one or more SRS resources in SRS transmission, and a maximum number of SRS resources available for simultaneous transmission on the same symbol in one SRS resource set and a maximum number of SRS resources are determined based on UE capability reported by the UE to the BS. In this case, the SRS resources simultaneously transmitted by the UE occupy a same RB. The UE configures one SRS port for each SRS resource. Only one SRS resource set with a value of the usage in SRS-ResourceSet that is higher layer signaling is configured to 'nonCodebook' may be configured, and maximally up to four SRS resources for non-codebook based PUSCH transmission may be configured.

The BS transmits one NZP-CSI-RS associated with the SRS resource set to the UE, and the UE calculates a precoder to be used in transmission of one or more SRS resources in the SRS resource set, based on a result of measurement performed in reception of the NZP_CSI-RS. The UE applies the calculated precoder to transmit, to the BS, one or more SRS resources in the SRS resource set with the usage configured to 'nonCodebook', and the BS selects one or more SRS resources from among the received one or more SRS resources. Here, for the non-codebook based PUSCH transmission, the SRI may indicate an index that can represent a combination of one or more SRS resources, and may be included in DCI. Here, the number of SRS resources indicated by the SRI transmitted from the BS may be the number of transmission layers of the PUSCH, and the UE transmits the PUSCH by applying, to each layer, the precoder applied to SRS resource transmission.

PUSCH: Preparation Procedure Time

Hereinafter, a PUSCH preparation procedure time will now be described. When the BS schedules the UE to transmit a PUSCH by using DCI format 0_0, 0_1 or 0-2, the UE may need a PUSCH preparation procedure time to transmit the PUSCH by applying a transmission method (an SRS resource transmission precoding method, the number of transmission layers, or a spatial domain transmission filter) indicated by DCI. In consideration of information above, NR defines a PUSCH preparation procedure time. The PUSCH preparation procedure time of the UE may be calculated using Equation 4 below.

$$T_{proc,2}=\max((N_2+d_{2,1}+d_2)(2048+144)\kappa 2^{\mu}T_c+T_{ext}+T_{switch},d_{2,2})$$      Equation 4

Variables in $T_{proc,2}$ expressed in Equation 3 may have the following meanings.

$N_2$: the number of symbols determined according to UE processing capability 1 or 2 and numerology μ. When the UE capability 1 is reported in a UE capability report, it may have a value based on Table 29, and when the UE capability 2 is reported in the UE capability report and when it is configured, by higher layer signaling, that the UE capability 2 is available, it may have a value based on Table 30.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: This may indicate the number of symbols which is determined to be 0 when resource elements of the first OFDM symbol are all configured to consist of DMRSs, or 1 otherwise.

K: 64

μ: This follows a value of $μ_{DL}$ or $μ_{UL}$ which makes $T_{proc,2}$ larger. $μ_{DL}$ refers to numerology of a DL in which a PDCCH including DCI that schedules the PUSCH is transmitted, and $μ_{UL}$ refers to numerology of a UL in which the PUSCH is transmitted.

$T_c$: This may have a value of $1/(\Delta f_{max}·N_f)$, and may be $\Delta f_{max}=480·10^3$ Hz and $N_f=4096$.

$d_{2,2}$: This may follow a BWP switching time when the DCI that schedules the PUSCH indicates BWP switching, or may be '0' otherwise.

$d_2$: When OFDM symbols of a PUCCH, a PUSCH having a high priority index and a PUCCH having a low priority index overlap on the time domain, a $d_2$ value of the PUSCH having the high priority index is used. Otherwise, $d_2$ is 0.

$T_{ext}$: When the UE uses a shared spectrum channel access scheme, the UE may calculate $T_{ext}$ and may apply $T_{ext}$ to the PUSCH preparation procedure time. Otherwise, $T_{ext}$ is assumed to be 0.

$T_{switch}$: When a UL switching interval is triggered, $T_{switch}$ is assumed as a switching interval time. Otherwise, $T_{switch}$ is assumed to be 0.

In consideration of time-axis resource mapping information of the PUSCH scheduled by the DCI and an impact of timing advance between the UL and the DL, the BS and the UE may determine that the PUSCH preparation procedure time is not sufficient when a first symbol of the PUSCH starts before a first UL symbol on which CP starts after $T_{proc,2}$ from a last symbol of the PDCCH including the DCI that schedules the PUSCH. Otherwise, the BS and the UE may determine that the PUSCH preparation procedure time is sufficient. Only when the PUSCH preparation procedure time is sufficient, the UE may transmit the PUSCH, and when the PUSCH preparation procedure time is not sufficient, the UE may ignore the DCI that schedules the PUSCH.

PUSCH: Associated with Repetitive Transmission

Hereinafter, UL data channel repetitive transmissions in the 5G system will now be described in detail. The 5G system may support two types of UL data channel repetitive transmission methods, i.e., PUSCH repetitive transmission type A and PUSCH repetitive transmission type B. The UE may be configured with one of the PUSCH repetitive transmission types A or B by higher layer signaling.

PUSCH Repetitive Transmission Type A

As described above, symbol length and a start symbol position of a UL data channel may be determined in a time domain resource allocation method in one slot, and the BS may notify the UE of the number of repetitive transmissions by higher layer signaling (e.g., RRC signaling) or L1 signaling (e.g., DCI).

The UE may repetitively transmit a UL data channel having a same length and start symbol as those of the UL data channel in consecutive slots, based on the number of repetitive transmissions received from the BS. In this case, when a slot configured by the BS for the UE in a DL or at least one of symbols of a UL data channel configured for the UE is configured for DL, the UE skips UL data channel transmission but counts the number of repetitive transmissions of the UL data channel.

PUSCH Repetitive Transmission Type B

As described above, a start symbol and length of a UL data channel may be determined in a time domain resource allocation method in one slot, and the BS may notify the UE of numberofrepetitions that is the number of repetitive transmissions by higher layer signaling (e.g., RRC signaling) or L1 signaling (e.g., DCI).

Based on the start symbol and length of the UL data channel which are previously configured, nominal repetition of the UL data channel is determined as below. A slot in which n-th nominal repetition starts is given by $$K_s + \left\lfloor \frac{S + n·L}{N_{symb}^{slot}} \right\rfloor$$

and a symbol starting in the slot is given by $mod(S+n·L, N_{symb}^{slot})$. A slot in which the n-th nominal repetition ends is given by $$K_s + \left\lfloor \frac{S + (n+1)·L - 1}{N_{symb}^{slot}} \right\rfloor,$$

and a symbol that ends in the slot is given by $mod(S+(n+1)·L-1, N_{symb}^{slot})$. Here, n=0, ..., numberofrepetitions−1, S indicates a start symbol of the configured UL data channel, and L indicates symbol length of the configured UL data channel $K_s$ indicates a slot in which the PUSCH transmission starts, and $N_{symb}^{slot}$ indicates the number of symbols per slot.

The UE determines an invalid symbol for the PUSCH repetitive transmission type B. A symbol configured for DL by tdd-UL-DL-ConfigurationCommon or tdd-UL-DL-ConfigurationDedicated is determined as an invalid symbol for the PUSCH repetitive transmission type B.

In addition, the invalid symbol may be configured by a higher layer parameter (e.g., InvalidSymbolPattern). The higher layer parameter (e.g., InvalidSymbolPattern) may provide a symbol-level bitmap spanning one slot or two slots such that the invalid symbol may be configured. In the bitmap, '1' represents the invalid symbol. In addition, periodicity and a pattern of the bitmap may be configured by a higher layer parameter (e.g., periodicityAndPattern). If the higher layer parameter (e.g., InvalidSymbolPattern) is configured and parameter InvalidSymbolPatternIndicator-ForDCIFormat0_1 or InvalidSymbolPatternIndicator-ForDCIFormat0_2 indicates '1', the UE applies an invalid symbol pattern, and when the parameter indicates '0', the UE does not apply the invalid symbol pattern. If the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, the UE may consider symbols other than the invalid symbol as valid symbols for each nominal repetition. When one or more valid symbols are included in each nominal repetition, the nominal repetition may include one or more actual repetitions. Here, each of the actual repetitions includes a set of consecutive valid symbols available for the PUSCH repetitive transmission type B in one slot.

Figure 17:
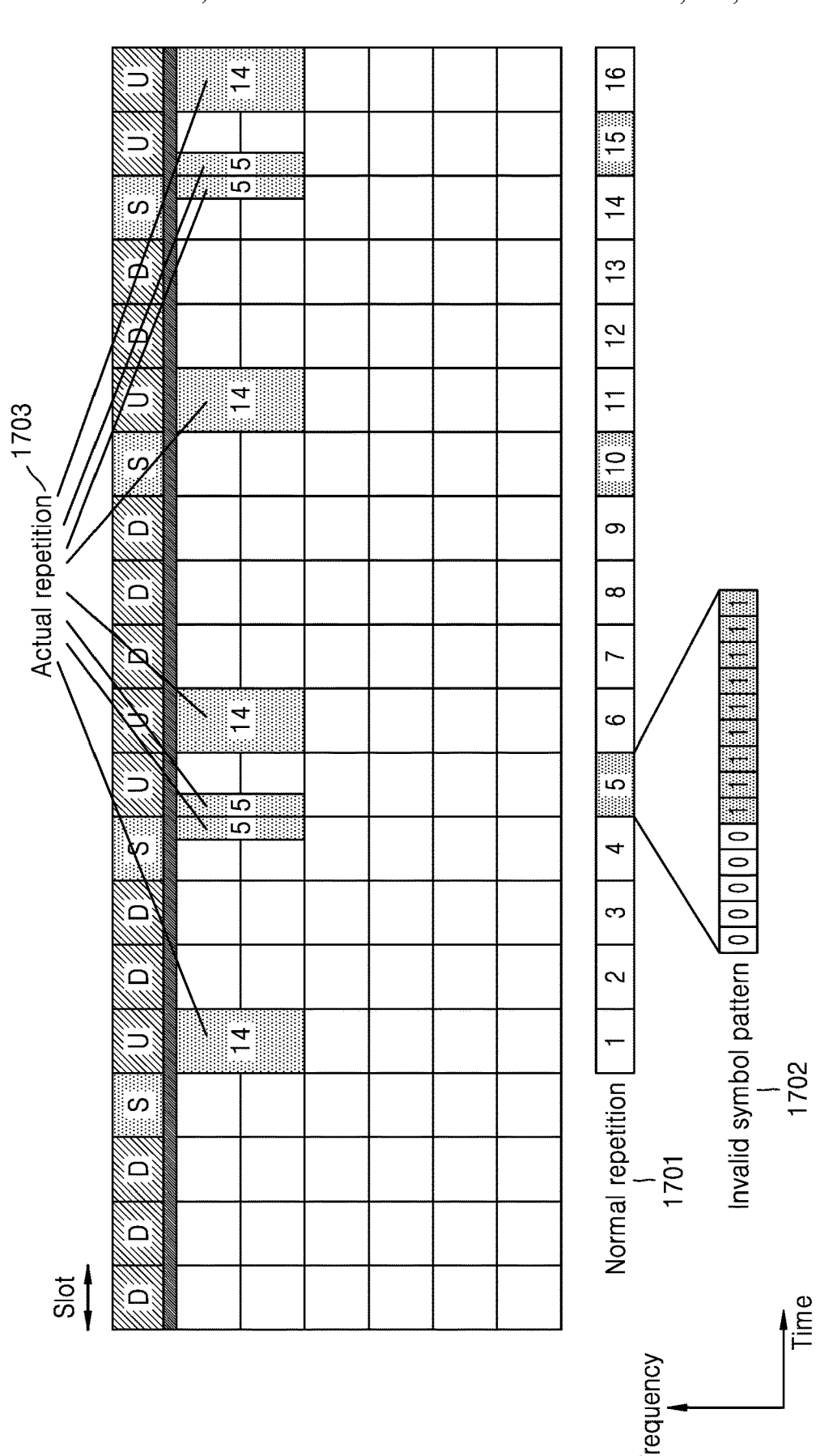
FIG. 17 is a diagram illustrating an example of physical uplink shared channel (PUSCH) repetitive transmission type B in a wireless communication system according to an embodiment of the disclosure.

FIG. 17 is a diagram illustrating an example of PUSCH repetitive transmission type B in a wireless communication system according to an embodiment of the disclosure.

The UE may be configured with a start symbol S of a UL data channel as 0, may be configured with length L of the UL data channel as 14, and may be configured with the number of repetition times as 16. In this case, the UE may expect that transmission of nominal repetition 1701 is performed in 16 consecutive slots, and may determine at least one actual repetition with which actual transmission is to be performed according to invalid symbol configuration or the like to be described below. Afterward, the UE may determine a symbol configured as a DL symbol in each nominal repetition 1701 as an invalid symbol. Also, the UE may determine symbols configured to '1' in an invalid symbol pattern 1702 as invalid symbols. In a case where valid symbols other than the invalid symbols are configured as one or more consecutive symbols in a slot in each nominal repetition, the one or more consecutive symbols may be configured and transmitted as actual repetition 1703.

Also, for PUSCH repetitive transmission, the NR release 16 may define additional methods below for UL-grant based PUSCH transmission and configured-grant based PUSCH transmission that over a slot boundary.

Method 1 (mini-slot level repetition): two or more PUSCH repetitive transmissions in one slot or over boundaries of consecutive slots are scheduled by one UL grant. For Method 1, time domain resource allocation information in DCI indicates a resource for the first repetitive transmission. Also, time domain resource information of the remaining repetitive transmissions may be determined according to the time domain resource information of the first repetitive transmission and the UL or DL direction determined for each symbol of each slot. Each repetitive transmission occupies consecutive symbols.

Method 2 (multi-segment transmission): two or more PUSCH repetitive transmissions in consecutive slots are scheduled by one UL grant. Here, one transmission is designated for each slot, and each transmission may have a different start point or repetition length. Also, in Method 2, time domain resource allocation information in DCI indicates start points and repetition lengths of all the repetitive transmissions. Also, in a case where repetitive transmissions are performed in one slot according to Method 2, when there are several groups of consecutive UL symbols in the slot, each repetitive transmission is performed per each of the UL symbol groups. When there is only one group of consecutive UL symbols in the slot, one PUSCH repetitive transmission is performed according to the method of NR release 15.

Method 3: two or more PUSCH repetitive transmissions in consecutive slots are scheduled by two or more UL grants. Here, one transmission is designated per each slot, and the n-th UL grant may be received before the PUSCH transmission scheduled by the (n−1)-th UL grant is completed.

Method 4: By one UL grant or one configured grant, one or more PUSCH repetitive transmissions in one slot may be supported, or two or more PUSCH repetitive transmissions over boundaries of consecutive slots may be supported. The number of repetitions indicated by the BS to the UE is a nominal value, and an actual number of PUSCH repetitions performed by the UE may be greater than the nominal number of repetitions. Time domain resource allocation information in DCI or configured grant refers to a resource of a first repetitive transmission indicated by the BS. Time domain resource information of the rest of repetitive transmissions may be determined by referring to at least the resource information of the first repetitive transmission and UL or DL direction of symbols. If the time domain resource information of the repetitive transmission indicated by the BS span boundaries of slots or includes a UL/DL transition point, the repetitive transmission may be divided into a plurality of repetitive transmissions. Here, one repetitive transmission may be included in each UL period in one slot.

PUSCH: Frequency Hopping Procedure

Hereinafter, frequency hopping on a UL data channel (e.g., PUSCH) in the 5G system will now be described in detail.

The 5G system may support two methods for each PUSCH repetitive transmission type as the frequency hopping method of a UL data channel First, the PUSCH repetitive transmission type A may support intra-slot frequency hopping and inter-slot frequency hopping, and the PUSCH repetitive transmission type B may support inter-repetition frequency hopping and inter-slot frequency hopping.

The intra-slot frequency hopping method supported in the PUSCH repetitive transmission type A is a method by which the UE performs transmission by changing a resource by a configured frequency offset at two hops in one slot, the resource being allocated in the frequency domain. In the intra-slot frequency hopping, a start RB at each hop may be represented by using Equation 5.

$$RB_{start} = \begin{cases} RB_{start} & i = 0 \\ (RB_{start} + RB_{offset}) \bmod N_{BWP}^{size} & i = 1 \end{cases} \qquad \text{Equation 5}$$

In Equation 5, i=0 and i=1 respectively represent a first hop and a second hop, and $RB_{start}$ represents a start RB in a UL BWP and is calculated from the frequency resource allocation method. $RB_{offset}$ represents a frequency offset between two hops by a higher layer parameter. The number of symbols of the first hop may be represented by $$\lfloor N_{symb}^{PUSCH,s}/2 \rfloor,$$

and the number of symbols of the second hop may be represented by $$N_{symb}^{PUSCH,s} - \lfloor N_{symb}^{PUSCH,s}/2 \rfloor. \; N_{symb}^{PUSCH,s}$$

is a length of PUSCH transmission in one slot and is represented by the number of OFDM symbols.

The inter-slot frequency hopping method supported in the PUSCH repetitive transmission types A and B is a method by which the UE performs transmission by changing a resource by a configured frequency offset in each slot, the resource being allocated in the frequency domain. In the inter-slot frequency hopping, a start RB during slot $$n_s^{\mu}$$

may be represented using Equation 6 below.

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases} \quad \text{Equation 6}$$

In Equation 6, $$n_s^{\mu}$$

is a current slot number in the multi-slot PUSCH transmission, and $RB_{start}$ represents a start RB in a UL BWP and is calculated from the frequency resource allocation method. $RB_{offset}$ represents a frequency offset between two hops by a higher layer parameter.

The inter-repetition frequency hopping method supported in the PUSCH repetitive transmission type B is to perform transmission by shifting a resource by a configured frequency offset, the resource being allocated in the frequency domain for one or more actual repetitions in each nominal repetition. $RB_{start}(n)$ that is an index of the start RB in the frequency domain for one or more actual repetitions in the n-th nominal repetition may follow Equation 7 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 7}$$

In Equation 7, n indicates an index of nominal repetition, and $RB_{offset}$ indicates an RB offset between two hops by a higher layer parameter.

Associated with UE Capability Report

In LTE and NR, the UE may perform a procedure for reporting a capability supported by the UE to a serving BS when the UE is connected to the serving BS. In descriptions below, this procedure is called a UE capability report.

The BS may transmit, to the UE in a connected state, a UE capability enquiry message requesting to report a UE capability report. The message may include a UE capability request for each radio access technology (RAT) type of the BS. The request for each RAT type may include supported frequency band combination information, or the like. Also, for the UE capability enquiry message, UE capability for each of the plurality of RAT types may be requested by an RRC message container transmitted by the BS, or the BS may transmit the UE capability enquiry message including a UE capability request for each RAT type which is repeated multiple times. That is, the UE capability enquiry is repeated multiple times in one message, and the UE may configure a corresponding UE capability information message corresponding thereto and may report it multiple times. In the next generation mobile communication system, a UE capability request for multi-RAT dual connectivity (MR-DC) as well as NR, LTE, evolved universal mobile telecommunications system (UMTS) terrestrial radio access (UTRA) (E-UTRA)-NR (E-UTRA-NR) dual connectivity (EN-DC) may be performed. Also, it is common that the UE capability enquiry message is transmitted in an initial stage after the UE is connected to the BS, but the UE capability enquiry message may be requested in any condition when the BS needs.

When the UE receives a request to report the UE capability from the BS, the UE configures a UE capability according to an RAT type and band information requested from the BS. A method by which the UE configures a UE capability in the NR system is summarized below.

1. If the UE is provided an LTE and/or NR band list in a request for UE capability from the BS, the UE may configure a band combination (BC) for EN-DC and NR stand-alone (SA). That is, the UE configures a candidate BC list for the EN-DC and NR SA, based on bands requested to the BS in FreqBandList. Also, the bands may have priorities in order of being listed in FreqBandList.

2. If the BS requests a UE capability report by setting a flag "eutra-nr-only" or "eutra," the UE completely removes information about NR SA BCs from the configured candidate BC list. This operation may occur only when an LTE BS (eNB) requests a "eutra" capability.

3. Afterward, the UE removes fallback BCs from the configured candidate BC list. Here, the fallback BC refers to a BC that is obtainable by removing a band corresponding to at least one SCell from a random BC, and may be omitted because the BC before the band corresponding to the at least one SCell being removed may already cover the fallback BC. This operation is also applied in MR-DC, i.e., even to LTE bands. BCs that remain after this operation are a final "candidate BC list."

4. The UE selects BCs to be reported, by selecting BCs being appropriate for a requested RAT type from the final "candidate BC list." In this operation, the UE configures supportedBandCombinationList in a defined order. That is, the UE may configure BCs and UE capability to be reported, in order of preset RAT-types. (nr⇒eutra-nr⇒eutra). Also, the UE may configure featureSetCombination for the configured supportedBandCombinationList, and may configure a "candidate feature set combination" list from the candidate BC list from which a list of the fallback BCs (including equal or low-level capability) is removed. The "candidate feature set combinations" include all feature set combinations for NR and EUTRA-NR BCs, and may be obtained from feature set combinations of UE-NR-Capabilities and UE-MRDC-Capabilities containers.

5. Also, if the requested RAT type is eutra-nr and has an impact on the list, featureSetCombinations are all included in both two containers that are the UE-MRDC-Capabilities and UE-NR-Capabilities. However, a feature set of NR is included only in UE-NR-Capabilities.

After the UE capability is configured, the UE transmits, to the BS, a UE capability information message including the UE capability. The BS performs scheduling and transmission/reception management appropriate for the UE, based on the UE capability received from the UE.

Associated with CA/DC

Figure 18:
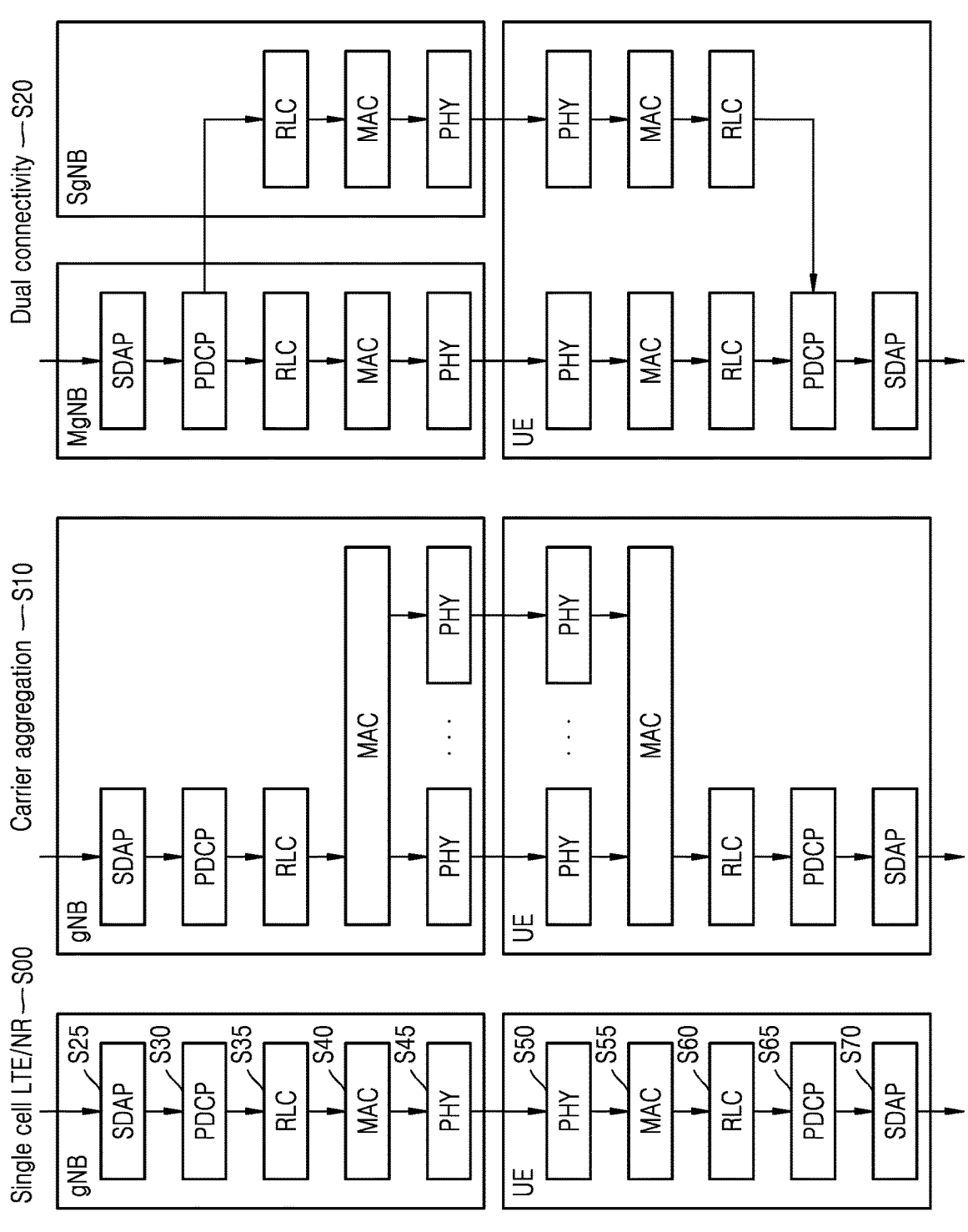
FIG. 18 is a diagram illustrating radio protocol architecture of a BS and a UE in situations of a single cell, carrier aggregation and dual connectivity according to an embodiment of the disclosure.

FIG. 18 is a diagram illustrating radio protocol architecture of a BS and a UE in situations of a single cell, carrier aggregation and dual connectivity according to an embodiment of the disclosure.

Referring to FIG. 18, a radio protocol of a next generation mobile communication system may include, in each of the UE and the NR BS, an NR service data adaptation protocol (NR SDAP) layer S25 or S70, an NR packet data convergence protocol (NR PDCP) layer S30 or S65, an NR radio link control (NR RLC) layer S35 or S60, and an NR medium access control (NR MAC) layer S40 or S55.

Main functions of the NR SDAP layer S25 or S70 may include some of the following functions.

Transfer of user plane data

Mapping between a quality of service (QoS) flow and a data radio bearer (DRB) for both DL and UL Marking QoS flow ID in both DL and UL packets Reflective QoS flow to DRB mapping for the UL SDAP protocol data units (PDUs).

With respect to a SDAP layer entity, information about whether to use a header of the SDAP layer entity or to use functions of the SDAP layer entity may be configured for the UE by using a RRC message per PDCP layer entity, per bearer, or per logical channel. When the SDAP header is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for seamlessly supporting a service.

Main functions of the NR PDCP layer S30 or S65 may include some of the following functions.

Header compression and decompression: robust header compression (ROHC) only

Transfer of user data

In-sequence delivery of upper layer PDUs

Out-of-sequence delivery of upper layer PDUs

PDCP PDU reordering for reception

Duplicate detection of lower layer service data units (SDUs)

Retransmission of PDCP SDUs

Ciphering and deciphering

Timer-based SDU discard in uplink.

In the above descriptions, the reordering function of the NR PDCP entity may indicate a function of reordering PDCP PDUs received from a lower layer, on a PDCP sequence number (SN) basis, and may include a function of delivering the reordered data to an upper layer in order. Alternatively, the reordering function of the NR PDCP entity may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer S35 or S60 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above descriptions, the in-sequence delivery function of the NR RLC entity indicates a function of delivering RLC SDUs received from a lower layer to an upper layer in order. When a plurality of RLC SDUs segmented from one RLC SDU are received, the in-sequence delivery function of the NR RLC entity may include a function of reassembling the RLC SDUs and delivering the reassembled RLC SDU, a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs. The in-sequence delivery function of the NR RLC entity may include a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer expires. Alternatively, the in-sequence delivery function of the NR RLC entity may include a function of delivering all RLC SDUs received so far, to an upper layer in order although a missing RLC SDU exists when a certain timer expires. The NR RLC entity may process the RLC PDUs in order of reception and deliver the RLC PDUs to the NR PDCP entity (regardless of SNs (out-of-sequence delivery)), and when a segment is received, the NR RLC entity may reassemble the segment with other segments stored in a buffer or to be subsequently received, into a whole RLC PDU and may process and deliver the RLC PDU to the NR PDCP entity. The NR RLC layer may not have a concatenation function, and the concatenation function may be performed by the NR MAC layer or be substituted with a multiplexing function of the NR MAC layer.

In the descriptions above, the out-of-sequence delivery function of the NR RLC entity may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer S40 or S55 may be connected to a plurality of NR RLC layer entities configured for one UE, and main functions of the NR MAC layer S40 or S55 may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

Multimedia broadcast multicast service (MBMS) service identification

Transport format selection

Padding

An NR physical (PHY) layer S45 or S50 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

The radio protocol architecture may be variously changed according to carrier (or cell) operation schemes. For example, when the BS transmits data to the UE on a single carrier (or cell), the BS and the UE use protocol architecture having a single structure for each layer, as shown in S00. On the other hand, when the BS transmits data to the UE based on a carrier aggregation (CA) in which a single transmission and reception point (TRP) uses multiple carriers, the BS and the UE use protocol architecture having a single structure up to the RLC layer, in which the PHY layer is multiplexed via the MAC layer, as shown in S10. In another example, when the BS transmits data to the UE based on a dual connectivity (DC) in which multiple TRPs use multiple carriers, the BS and the UE use protocol architecture having a single structure up to the RLC layer, in which the PHY layer is multiplexed via the MAC layer, as shown in S20.

Referring to the above descriptions related to PDCCH and beam configuration, current Rel-15 and Rel-16 NR do not support PDCCH repetitive transmission, such that it is difficult to obtain required reliability in a scenario such as URLLC that requires high reliability. The disclosure provides a PDCCH repetitive transmission method via multiple TRP points, thereby improving PDCCH reception reliability of the UE. Particular methods will now be described in embodiments below.

Hereinafter, embodiments of the disclosure will now be described with reference to accompanying drawings. The disclosure may be applied to frequency division duplexing (FDD) and time division duplexing (TDD) systems. In the following descriptions, high signaling (or higher layer signaling) may indicate a method by which the BS transmits a signal to the UE by using a DL data channel of the physical layer or by which the UE transmits a signal to the BS by using a UL data channel of the physical layer, and may be referred to as RRC signaling, PDCP signaling, or an MAC control element (CE).

Hereinafter, in the disclosure, when the UE determines whether to apply the cooperative communication, the UE may use various methods in which PDCCH(s) that allocates a PDSCH, to which the cooperative communication is applied, has a particular format, PDCCH(s) that allocates a PDSCH, to which the cooperative communication is applied, includes a particular indicator to indicate whether the cooperative communication is applied, PDCCH(s) that allocates a PDSCH, to which the cooperative communication is applied, is scrambled by a particular RNTI, or application of the cooperative communication is assumed in a particular section indicated by an upper layer. For convenience of descriptions, a case in which the UE receives the PDSCH to which the cooperative communication is applied based on conditions similar to those as described above will now be referred to as a non-coherent joint transmission (NC-JT) case.

Hereinafter, in the disclosure, determining priorities between A and B may refer to selecting one of A and B which has a higher priority according to a preset priority rule and performing an operation corresponding thereto or omitting or dropping an operation for the other one having a lower priority.

Hereinafter, in the disclosure, the above examples will now be described in several embodiments, but the examples are not independent and one or more embodiments may be applied simultaneously or in combination.

Associated with NC-JT

According to an embodiment of the disclosure, the non-coherent joint transmission (NC-JT) may be used for the UE to receive a PDSCH from a plurality of TRPs.

Unlike the legacy communication system, the 5G wireless communication system may support not only services requiring high data rate but may also support both services having very short latency and services requiring a high connection density. In a wireless communication network including multiple cells, TRPs, or beams, cooperative communication between the respective cells, TRPs and/or beams may satisfy various service requirements by increasing strength of a signal received by the UE or efficiently performing control on interference between the respective cells, TRPs and/or beams.

JT is a representative transmission technology for the cooperative communication, and is a technology for increasing strength or throughput of a signal, which received by the UE, by transmitting the signal to one UE via many different cells, TRPs or/and beams. Here, properties of respective channels between the cells, TRPs and/or beams and the UE may significantly differ, and in particular, for NC-JT that supports non-coherent precoding between the cells, the TRPs and/or the beams, individual precoding, MCS, resource allocation, TCI indication, and the like may be required according to a channel property for each link between the cells, the TRPs and/or the beams and the UE.

The NC-JT transmission described above may be applied to at least one of a DL data channel (e.g., PDSCH), a DL control channel (e.g., PDCCH), a UL data channel (e.g., PUSCH), or a UL control channel (e.g., PUCCH). In PDSCH transmission, transmission information such as precoding, MCS, resource allocation, TCI, and the like is indicated by DL DCI, and for NC-JT transmission, the transmission information has to be independently indicated for each cell, TRP and/or beam. The independent indication may be a main cause of an increase in payload required for transmission of the DL DCI, and may have a negative impact on reception performance for a PDCCH that transmits the DCI. Therefore, in order to support JT of the PDSCH, it is required to carefully design a tradeoff between an amount of DCI information and control information reception performance.

Figure 19:
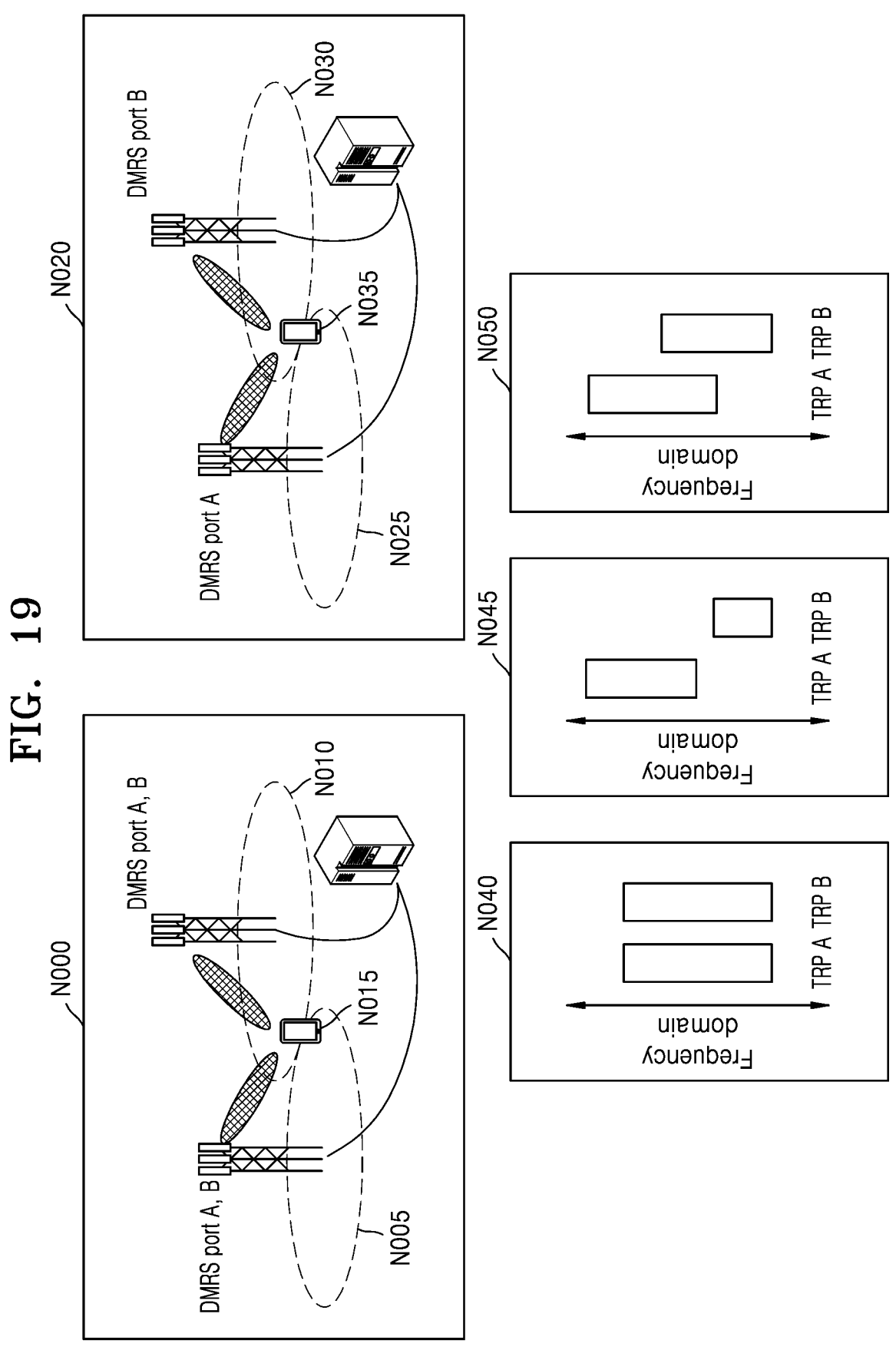
FIG. 19 is a diagram illustrating antenna port configuration and resource allocation for cooperative communication in a wireless communication system according to an embodiment of the disclosure.

FIG. 19 is a diagram illustrating antenna port configuration and resource allocation for transmitting a PDSCH by using cooperative communication in a wireless communication system according to an embodiment of the disclosure.

Referring to FIG. 19, an example of PDSCH transmission in each JT scheme will now be described and examples for allocating radio resources for each TRP are illustrated.

Referring to FIG. 19, an example N000 of coherent joint transmission (C-JT) that supports coherent precoding between respective cells, TRPs and/or beams is shown.

For C-JT, TRP A N005 and TRP B N010 transmit single data (PDSCH) to a UE N015, and joint precoding may be performed in the multiple TRPs. This may mean that a DMRS is transmitted from the same DMRS ports TRP A N005 and TRP B N010 to transmit a same PDSCH. For example, TRP A N005 and TRP B N010 may transmit a DMRS to the UE through DMRS port A and DMRS port B, respectively. In this case, the UE may receive one DCI information so as to receive one PDSCH demodulated based on the DMRS transmitted from the DMRS ports A and B.

Referring to FIG. 19, an example N020 of NC-JT that supports non-coherent precoding between the respective cells, TRPs and/or beams for PDSCH transmission is shown.

In a case of NC-JT, a PDSCH may be transmitted to the UE N035 for each cell, TRP N025 or N030 and/or beam, and individual precoding may be applied to each PDSCH. Each cell, TRP and/or beam transmits a different PDSCH or a different PDSCH layer to the UE, such that throughput may be improved compared to singe cell, TRP and/or beam transmission. Also, each cell, TRP and/or beam repetitively transmits the same PDSCH to the UE, such that reliability may be improved compared to singe cell, TRP and/or beam transmission. For convenience of descriptions, a cell, TRP and/or beam will be collectively called a TRP.

In this case, various radio resource allocations such as a case where frequency and time resources used for PDSCH transmission at the multiple TRPs are the same in N040, a case where frequency and time resources used for PDSCH transmission at the multiple TRPs do not overlap each other in N045, and a case where some of frequency and time resources used at the multiple TRPs overlap each other in N050 may be considered.

In order to simultaneously allocate a plurality of PDSCHs to one UE so as to support NC-JT, various forms, structures and relations of DCI may be considered.

Figure 20:
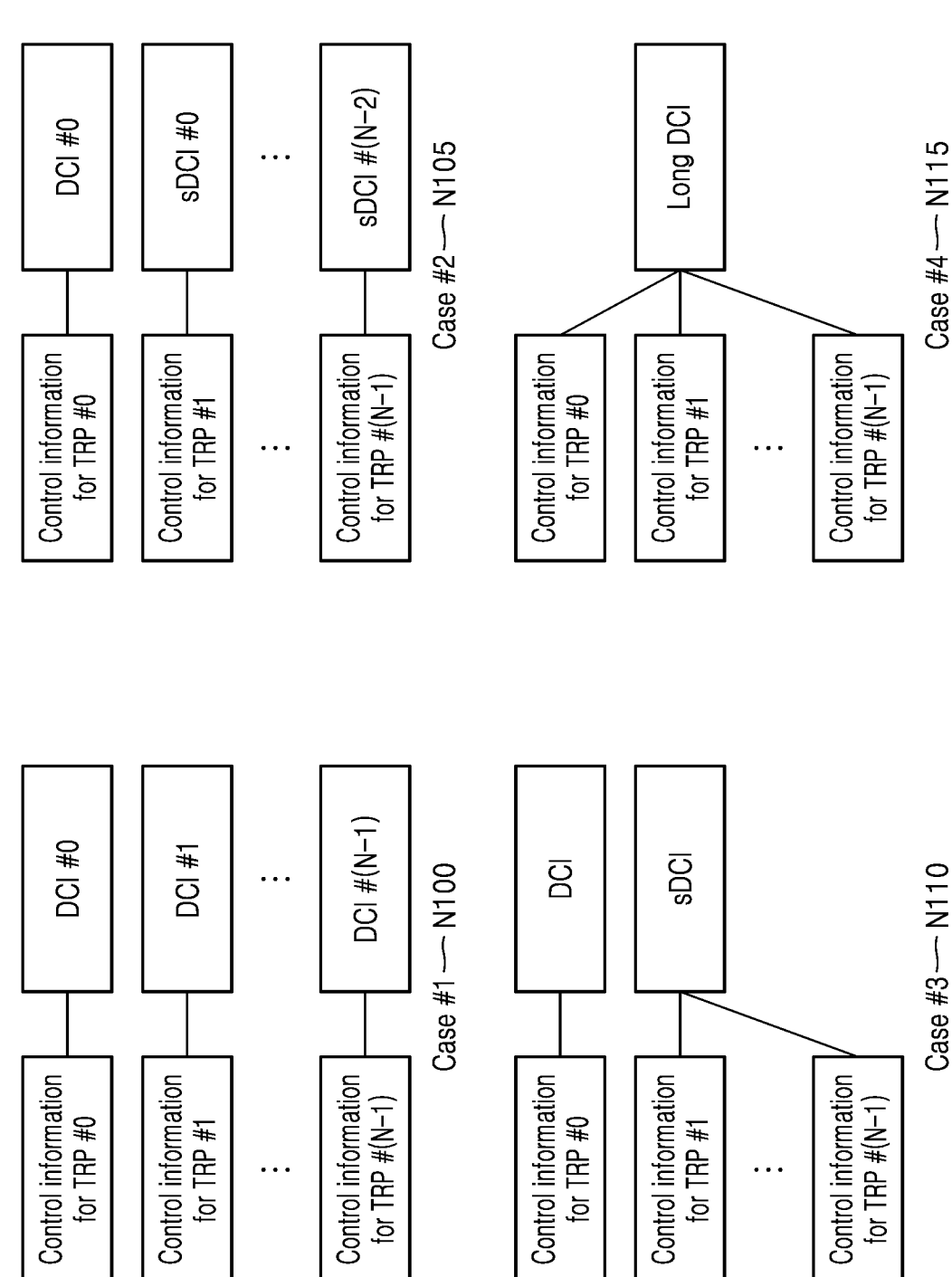
FIG. 20 is a diagram illustrating an example of configuration of downlink control information (DCI) for cooperative communication in a wireless communication system according to an embodiment of the disclosure.

FIG. 20 is a diagram illustrating an example of configuration of DCI for NC-JT where TRPs transmit different PDSCHs or different PDSCH layers to the UE in a wireless communication system according to an embodiment of the disclosure.

Referring to FIG. 20, case #1 N100 shows a case where N−1 different PDSCHs are transmitted from additional N−1 TRPs (TRP #1 to TRP #(N−1)) in addition to a serving TRP (TRP #0) used in single PDSCH transmission, in which control information for the PDSCHs transmitted from the additional N−1 TRPs is transmitted independently from control information for the PDSCH transmitted from the serving TRP. That is, the UE may obtain the control information for the PDSCHs transmitted from different TRPs (TRP #0 to TRP #(N−1)) by a plurality of pieces of separate DCI (DCI #0 to DCI #(N−1)). Formats of the plurality of pieces of separate DCI may be equal to or different from each other, and payloads of the plurality of pieces of separate DCI may also be equal to or different from each other. In case #1 N100 described above, degrees of freedom of each PDSCH control or allocation may be fully ensured, but when each DCI is transmitted from different TRPs, the reception performance may deteriorate due to a coverage difference between the plurality of pieces of separate DCI.

Case #2 N105 shows a case where N−1 different PDSCHs are transmitted from additional N−1 TRPs (TRP #1 to TRP #(N−1) in addition to a serving TRP (TRP #0) used in single PDSCH transmission, in which a plurality of pieces of control information (DCI) for the PDSCHs of the additional N−1 TRPs are transmitted and the plurality of pieces of DCI are dependent on the control information for the PDSCH transmitted from the serving TRP.

For example, DCI #0 that is control information for the PDSCH transmitted from the serving TRP (TRP #0) includes all information elements of DCI format 1_0, DCI format 1_1, and DCI format 1_2, but shortened DCI (hereinafter sDCI) (sDCI #0 to sDCI #(N−2)) that is control information for the PDSCHs transmitted from the cooperative TRPs (TRP #1 to TRP #(N−1)) may include only some of the information elements of DCI format 1_0, DCI format 1_1, and DCI format 1_2. Therefore, as the sDCI for transmission of the control information for the PDSCHs transmitted from the cooperative TRPs has a small payload compared to normal DCI (nDCI) for transmission of control information associated with the PDSCH transmitted from the serving TRP, the sDCI may include reserved bits compared to the nDCI.

In case #2 described above, the degree of freedom of each PDSCH control or allocation may be limited depending on content of the information element included in the sDCI, but, as reception performance for the sDCI is superior than that of the nDCI, a probability of coverage difference for each DCI may be reduced.

Case #3 N110 shows a case where N−1 different PDSCHs are transmitted from additional N−1 TRPs (TRP #1 to TRP #(N−1)) in addition to a serving TRP (TRP #0) used in single PDSCH transmission, in which one control information (DCI) for the PDSCHs of the additional N−1 TRPs is transmitted and the DCI is dependent on the control information for the PDSCH transmitted from the serving TRP.

For example, DCI #0 that is control information for the PDSCH transmitted from the serving TRP (TRP #0) may include all information elements of DCI format 1_0, DCI format 1_1, and DCI format 1_2, and control information for the PDSCHs transmitted from the cooperative TRPs (TRP #1 to TRP #(N−1)) may collect and transmit only some of the information elements of DCI format 1_0, DCI format 1_1, and DCI format 1_2 into 'secondary' DCI (sDCI). For example, the sDCI may include at least one of HARQ-related information such as frequency domain resource allocation, time domain resource allocation, an MCS or the like, for the cooperative TRPs. In addition, information that is not included in the sDCI, such as a BWP indicator or a carrier indicator, may follow the DCI (DCI #0, normal DCI, and nDCI) of the serving TRP.

Case #3 N110 may have a limited degree of freedom of each PDSCH control or allocation depending on content of an information element included in sDCI, but may control sDCI reception performance and have reduced complexity of DCI blind decoding of the UE compared to case #1 N100 or case #2 N105.

Case #4 N115 shows a case where N−1 different PDSCHs are transmitted from additional N−1 TRPs (TRP #1 to TRP #(N−1)) in addition to a serving TRP, TRP #0 used for single PDSCH transmission, in which control information for the PDSCHs transmitted from the additional N−1 TRPs is transmitted in the same DCI (long DCI) as the control information for the PDSCH transmitted from the serving TRP. That is, the UE may obtain the control information for the PDSCHs transmitted from the different TRPs (TRP #0 to TRP #(N−1)) by single DCI. In case #4 N115, DCI blind decoding complexity of the UE may not increase, but a degree of freedom of PDSCH control or allocation may be decreased such as the number of cooperative TRPs being limited due to limitations on the long DCI payload.

In the descriptions and embodiments below of the disclosure, sDCI may refer to various auxiliary DCI such as shortened DCI, secondary DCI, or normal DCI (with DCI formats 1_0 to 1_1 described above) including control information of a PDSCH transmitted from a cooperative TRP, and the descriptions thereof may be similarly applied to the various auxiliary DCI unless otherwise specified.

In the descriptions and embodiments below of the disclosure, the above case #1 N100, case #2 N105, and case #3 N110 in which one or more pieces of DCI (PDCCHs) are used to support NC-JT may be classified as multiple-PDCCH-based NC-JT, and the case #4 N115 in which single DCI (a PDCCH) is used to support NC-JT may be classified as single-PDCCH-based NC-JT. In the multiple-PDCCH based PDSCH transmission, a CORESET in which the DCI of the serving TRP (TRP #0) is scheduled may be distinguished from CORESETs in which the DCI of the cooperative TRPs (TRP #1 to TRP #(N−1)) is scheduled. As a method of distinguishing between CORESETs, there may be a method of distinguishing between CORESETs by an upper layer indicator for each CORESET, a method of distinguishing between CORESETs through beam configuration for each CORESET, or the like. Furthermore, in the single-PDCCH based NC-JT, single DCI does not schedule a plurality of PDSCHs but schedules a single PDSCH having a plurality of layers, and the plurality of layers may be transmitted from multiple TRPs. Here, a connection relation between a layer and a TRP to transmit the layer may be indicated by TCI for the layer.

In embodiments of the disclosure, the term "cooperative TRP" may be substituted with various terms including a "cooperative panel" or a "cooperative beam" when actually applied.

In embodiments of the disclosure, the expression that "NC-JT is applied" is used for convenience of descriptions, but it may be variously interpreted based on the context such as "the UE simultaneously receives one or more PDSCHs on one BWP," "the UE simultaneously receives PDSCHs on one BWP based on two or more TCI indication," "a PDSCH received by the UE is associated with one or more DMRS port group," or the like.

In the disclosure, radio protocol architecture for NC-JT may be variously used according to TRP usage scenarios. For example, when there is no or small backhaul delay between cooperative TRPs, a structure based on MAC layer multiplexing similar to what is shown in S10 of FIG. 18 may be used (CA-like method). On the other hand, when there is a backhaul delay between cooperative TRPs, the delay being significantly large that cannot be ignored (e.g., when 2 ms or more time is required to exchange information such as CSI, scheduling, HARQ-ACK, or the like between the cooperative TRPs), an independent structure for each TRP from the RLC layer which is similar to S20 of FIG. 18 may be used to secure robustness to delay (DC-like method).

A UE that supports C-JT/NC-JT may receive C-JT/NC-JT related parameters or setting values from higher layer configuration, and RRC parameters of the UE may be set based on the parameters or the setting values. For the higher layer configuration, the UE may use a UE capability parameter, e.g., tci-StatePDSCH. Here, the UE capability parameter, e.g., tci-StatePDSCH, may define TCI states for PDSCH transmission, and the number of TCI states may be configured to 4, 8, 16, 32, 64, or 128 in FR1 and 64 or 128 in FR2, and among the configured numbers, up to 8 states being indicatable in 3 bits of a TCI field of DCI may be configured in an MAC CE message. A maximum value of 128 refers to a value indicated by maxNumberConfiguredTCIstates- PerCC in parameter tci-StatePDSCH included in capability signaling of the UE. In this manner, a series of configuration processes from higher layer configuration to MAC CE configuration may be applied to a beamforming indication or beamforming switching command for at least one PDSCH at one TRP.

Multi-DCI Based Multi-TRP

As an embodiment of the disclosure, the multi-DCI based multi-TRP transmission method will now be described. The multi-DCI based multi-TRP transmission method may include configuring a DL control channel for multi-PDCCH based NC-JT transmission.

In transmission of DCI for PDSCH scheduling of each TRP, the multi-PDCCH based NC-JT may have a CORESET or a search space distinguished for each TRP. The CORESET or search space for each TRP may be configured as at least one of cases below.

Higher layer index configuration for each CORESET: CORESET configuration information configured by a higher layer may include an index value, and a TRP that transmits the PDCCH in the configured CORESET may be identified by the index value for the configured CORESET. That is, in a set of CORESETs having a same higher layer index value, it may be assumed that a same TRP transmits a PDCCH or a PDCCH scheduling a PDSCH of the same TRP is transmitted. The index for each CORESET may be called CORESET-PoolIndex, and it may be assumed that a PDCCH is transmitted from the same TRP for CORESETs for which the same CORESETPoolIndex value is configured. For a CORESET for which a CORESETPoolIndex value is not configured, it may be assumed that a default value of CORESETPoolIndex is configured, and the default value may be 0.

In the disclosure, when each of a plurality of CORESETs included in PDCCH-Config that is higher layer signaling has more than one type of CORESETPoolIndex, i.e., when CORESETPoolIndex varies for each CORESET, the UE may assume that the BS may use the multi-DCI based multi-TRP transmission method.

Unlike to this method, in the disclosure, when each of a plurality of CORESETs included in PDCCH-Config that is higher layer signaling has one type of CORESETPoolIndex, i.e., when all the CORESETs have the same CORESETPoolIndex of 0 or 1, the UE may assume that the BS performs transmission by using single TRP, instead of using the multi-DCI based multi-TRP transmission method.

Multiple PDCCH-Config configuration: Multiple PDCCH-Configs are configured in one BWP, and each PDCCH-Config may include PDCCH configuration for each TRP. That is, one PDCCH-Config may be configured with a CORESET list for each TRP and/or a search space list for each TRP, and one or more CORESETs and one or more search spaces included in one PDCCH-Config may be regarded to correspond to a particular TRP.

CORESET beam/beam group configuration: a TRP corresponding to a CORESET may be identified based on a beam or beam group configured for each CORESET. For example, when a same TCI state is configured for a plurality of CORESETs, it may be assumed that the CORESETs are transmitted at the same TRP or a PDCCH scheduling a PDSCH of the same TRP is transmitted in the CORESET.

Search space beam/beam group configuration: a beam or beam group is configured for each search space, and by doing so, a TRP for each search space may be identified. For example, when a same beam/beam group or TCI state is configured for a plurality of search spaces, it may be assumed that the same TRP transmits a PDCCH in the search space or a PDCCH scheduling a PDSCH of the same TRP is transmitted in the search space.

By identifying the CORESET or search space for each TRP, classification of PDSCH and HARQ-ACK information for each TRP may be possible, such that it is possible to generate separate HARQ-ACK codebook and to use separate PUCCH resource for each TRP.

The above configuration may be independent for each cell or each BWP. For example, two different CORESETPoolIndex values may be configured for a PCell, but a CORESETPoolIndex value may not be configured for in a particular SCell. In this case, it may be assumed that NC-JT transmission is configured for the PCell and is not configured for the SCell for which the CORESETPoolIndex value is not configured.

A PDSCH TCI state activation/deactivation MAC CE that is applicable to the multi-DCI based multi-TRP transmission method may follow the configuration related to FIG. 16. If the UE is not configured with CORESETPoolIndex for each of CORESETs in PDCCH-Config that is higher layer signaling, the UE may ignore a CORESET Pool ID field 16-55 in the MAC CE 16-50. If the UE may support the multi-DCI based multi-TRP transmission method, i.e., if the UE is configured with a different CORESETPoolIndex for each CORESET in PDCCH-Config that is higher layer signaling, the UE may activate a TCI state in DCI included in the PDCCH transmitted in CORESETs having a same value of CORESETPoolIndex as the value of the CORESET pool ID field 16-55 in the MAC CE 16-50. For example, when the CORESET Pool ID field 16-55 in the MAC CE 16-50 has a value of 0, a TCI state in DCI included in the PDCCH transmitted in CORESETs having CORESETPoolIndex of 0 may follow activation information of the MAC CE 16-50.

When the UE is configured by the BS to use the multi-DCI based multi-TRP transmission method, i.e., when there may be more than one type of CORESETPoolIndex for each of the plurality of CORESETs included in PDCCH-Config that is higher layer signaling or each CORESET has a different CORESETPoolIndex, the UE may detect that, for PDSCHs scheduled from the PDCCH in each CORESET having two different values of CORESETPoolIndex, restrictions exist as below.

1) If PDSCHs indicated from PDCCHs in the respective CORESETs having two different values of CORESET-PoolIndex are fully or partially overlapped, the UE may apply, to different CDM groups, TCI states indicated by the respective PDCCHs. That is, two or more TCI states may not be applied to one CDM group.

2) When PDSCHs indicated from PDCCHs in the respective CORESETs having two different values of CORESET-PoolIndex are fully or partially overlapped, the UE may expect that the number of actual front loaded DMRS symbols, the number of actual additional DMRS symbols, a position of an actual DMRS symbol, and a DMRS type are not different for each PDSCH.

3) The UE may expect that BWPs indicated from PDCCHs in respective CORESETs having two different values of CORESETPoolIndex are the same and SCSs are also the same.

4) The UE may expect that information about PDSCHs scheduled from PDCCHs in the respective CORESETs having two different values of CORESETPoolIndex is fully included in the respective PDCCHs.

Single-DCI Based Multi-TRP

As an embodiment of the disclosure, the single-DCI based multi-TRP transmission method will now be described. The single-DCI based multi-TRP transmission method may include configuring a DL control channel for single-PDCCH based NC-JT transmission.

In the single-DCI based multi-TRP transmission method, PDSCHs transmitted by a plurality of TRPs may be scheduled in one DCI. Here, in order to indicate the number of TRPs that transmit the PDSCHs, the number of TCI states may be used. That is, when the number of TCI states indicated in DCI that schedules the PDSCH is two, it may be assumed as the single-PDCCH based NC-JT transmission, and when the number of TCI states is one, it may be assumed as the single-TRP transmission. TCI states indicated in the DCI may correspond to one or two TCI states among TCI states activated by an MAC CE. When the TCI states of the DCI correspond to two TCI states activated by an MAC CE, a correspondence relation is obtained between a TCI codepoint indicated in the DCI and the TCI states activated by the MAC CE, and TCI states activated by the MAC CE corresponding to the TCI codepoint may be two.

In another example, if at least one codepoint among all codepoints of the TCI state field in the DCI indicates two TCI states, the UE may assume that the BS can perform transmission based on the single-DCI based multi-TRP method. Here, at least one codepoint indicating two TCI states in the TCI state field may be activated by an Enhanced PDSCH TCI state activation/deactivation MAC CE.

Figure 21:
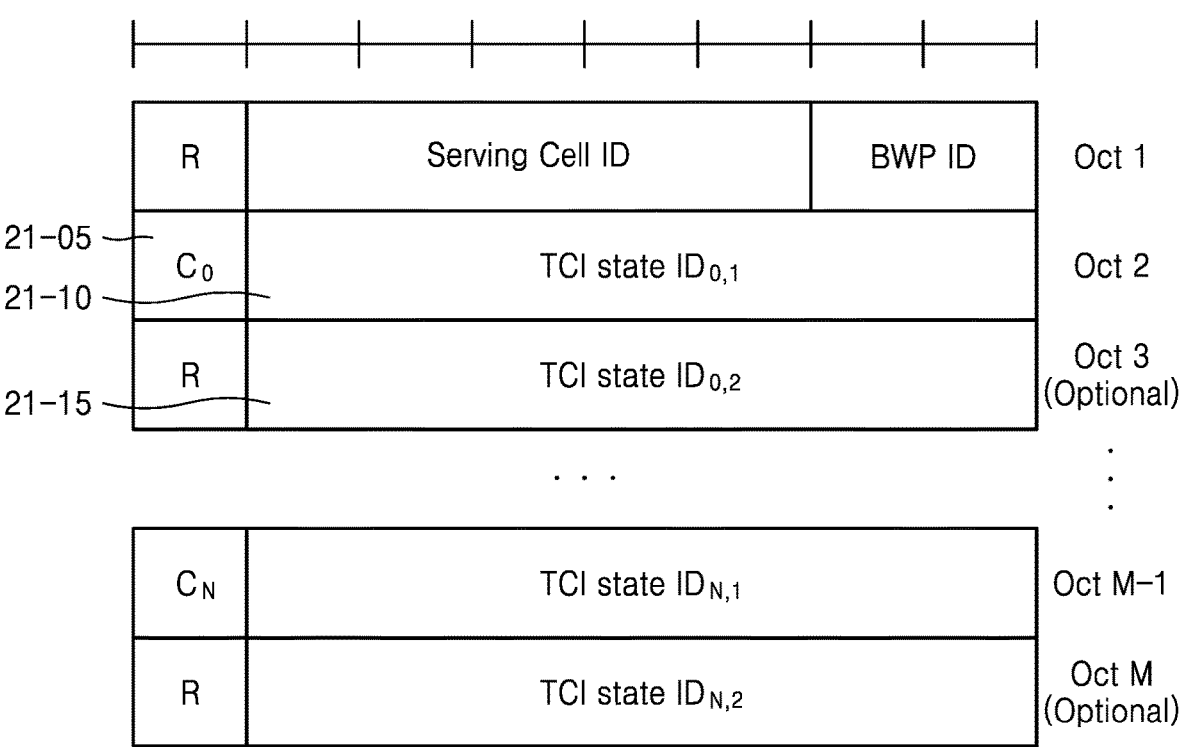
FIG. 21 is a diagram illustrating a structure of an Enhanced PDSCH TCI state activation/deactivation MAC CE according to an embodiment of the disclosure.

FIG. 21 is a diagram illustrating a structure of an Enhanced PDSCH TCI state activation/deactivation MAC CE. Meanings and configurable values of each field in the MAC CE are as below according to an embodiment of the disclosure.

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI bandwidth part indicator field as specified in TS 38.212 [9]. The length of the BWP ID field is 2 bits;
- $C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the
TCI States are mapped is determined by its ordinal position among all the TCI
codepoints with sets of TCI state $ID_{i,j}$ fields, i.e. the first TCI codepoint with TCI
state $ID_{0,1}$ and TCI state $ID_{0,2}$ shall be mapped to the codepoint value 0, the second
TCI codepoint with TCI state $ID_{1,1}$ and TCI state $ID_{1,2}$ shall be mapped to the
codepoint value 1 and so on. The TCI state $ID_{i,2}$ is optional based on the
indication of the Ci field. The maximum number of activated TCI codepoint is 8
and the maximum number of TCI states mapped to a TCI codepoint is 2.
- R: Reserved bit, set to "0".

Referring to FIG. 21, when a value of $C_0$ field 21-05 is 1, a MAC CE corresponding thereto may include TCI state $ID_{0,2}$ field 21-15 in addition to TCI state $ID_{0,1}$ field 21-10. This means that TCI state $ID_{0,1}$ and TCI state $ID_{0,2}$ are activated for 0th codepoint of a TCI state field included in DCI, and when the BS indicates the corresponding code-point to the UE, the UE may receive an indication of two TCI states. When a value of $C_0$ field 21-05 is 0, a MAC CE corresponding thereto cannot include the TCI state $ID_{0,2}$ field 21-15, and this means that one TCI state corresponding to TCI state $ID_{0,1}$ for the 0th codepoint of the TCI state field included in the DCI is activated.

The above configuration may be independent for each cell or each BWP. For example, there may be up to two activated TCI states corresponding to one TCI codepoint in the PCell, but there may be up to one activated TCI state corresponding to one TCI codepoint in a particular SCell. In this case, it may be assumed that NC-JT transmission is configured for the PCell and is not configured for the SCell.

Single-DCI Based Multi-TRP PDSCH Repetitive Transmission Schemes (TDM/FDM/SDM) Identification Methods Hereinafter, a method of identifying a single-DCI based multi-TRP PDSCH repetitive transmission scheme will now be described. The UE may receive, from the BS, an indication of different single-DCI based multi-TRP PDSCH repetitive transmission schemes (e.g., time division multiplexing (TDM), frequency division multiplexing (FDM), and space division multiplexing (SDM)) according to a value indicated by the DCI field and a higher layer signaling configuration. Table 31 below represents a method of distinguishing between single- or multi-TRP based schemes indicated to the UE according to a value of a particular DCI field and the higher layer signaling configuration.

Respective columns of Table 31 above will now be described as below.

The number of TCI states (second column): may indicate the number of TCI states indicated by a TCI state field in DCI, and may be one or two.

The number of CDM groups (third column): may indicate the number of different CDM groups of DMRS ports indicated by an antenna port field in the DCI. It may be one, two, or three.

repetitionNumber configuration and indication conditions (fourth column): may have three conditions according to whether repetitionNumber for all Time Domain Resource Allocation (TDRA) entries that are indicat-able by a Time Domain Resource Allocation field in the DCI is configured and whether a TDRA entry that is actually indicated has configuration of repetitionNum-ber.

1) Condition 1: Case where at least one of all TDRA entries that are indicatable by a Time Domain Resource Allocation field includes configuration of repetition-Number, and the TDRA entry indicated by the Time Domain Resource Allocation field in the DCI includes configuration of repetitionNumber greater than 1

2) Condition 2: Case where at least one of all TDRA entries that are indicatable by a Time Domain Resource Allocation field includes configuration of repetition-Number, and the TDRA entry indicated by the Time Domain Resource Allocation field in the DCI does not include configuration of repetitionNumber 3) Condition 3: Case where all TDRA entries that are indicatable by a Time Domain Resource Allocation field do not include configuration of repetitionNumber Association with repetitionScheme configuration (fifth column): indicates whether to configure repetition-

TABLE 31

| combination | Number of TCI state | Number of CDM groups | repetitionNumber configuration and indication condition | Association with repetitionScheme | Transmission scheme indicated to the UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP SDM scheme B |

Scheme that is higher layer signaling. repetitionScheme that is higher layer signaling may be configured with one of 'tdmSchemeA', 'fdmSchemeA', and 'fdmSchemeB'.

Transmission scheme indicated to the UE (sixth column): indicates single or multiple TRP schemes indicated according to each combination (first column) represented in Table 31 above.

1) Single-TRP: indicates single-TRP based PDSCH transmission. If the UE is configured with pdsch-AggregationFactor in PDSCH-config that is higher layer signaling, the UE may receive scheduling of the single-TRP based PDSCH repetitive transmission corresponding to the number of times the UE is configured. Otherwise, the UE may receive scheduling of the single-TRP based PDSCH single transmission.

2) Single-TRP TDM scheme B: indicates single-TRP based inter-slot time resource division based PDSCH transmission. According to Condition 1 associated with repetitionNumber, the UE repetitively transmits a PDSCH in the time domain by the number of slots corresponding to repetitionNumber greater than 1 configured to the TDRA entry indicated by the Time Domain Resource Allocation field. Here, for each of the slots as many as repetitionNumber, a start symbol and a symbol length of the PDSCH indicated by the TDRA entry are equally applied, and a same TCI state is applied for each PDSCH repetitive transmission. This scheme is similar to a slot aggregation scheme in that inter-slot PDSCH repetitive transmission is performed on a time resource, but is different from the slot aggregation in that whether to indicate repetitive transmission may be dynamically determined based on the Time Domain Resource Allocation field in the DCI.

3) Multi-TRP SDM: indicates a multi-TRP based spatial resource division PDSCH transmission scheme. It is a method of dividing a layer and receiving them from each TRP, and although the method is not a repetitive transmission scheme but may increase reliability of PDSCH transmission in that transmission may be performed with a decreased coding rate by increasing the number of layers. The UE may receive the PDSCH by respectively applying two TCI states indicated by the TCI state field in the DCI to the two CDM groups indicated from the BS.

4) Multi-TRP FDM scheme A: indicates a multi-TRP based frequency resource division PDSCH transmission scheme, and this scheme is not repetitive transmission like multi-TRP SDM because it has one PDSCH transmission occasion, but may perform transmit with high reliability by increasing an amount of frequency resource and thus decreasing the coding rate. Multi-TRP FDM scheme A may respectively apply two TCI states indicated by the TCI state field in the DCI to non-overlapping frequency resources. When a PRB bundling size is determined to be wideband, the UE performs reception by applying the first TCI state to first ceil(N/2) RBs and the second TCI state to the remaining floor(N/2) RBs, where N is the number of RBs indicated by the Frequency Domain Resource Allocation field. Here, ceil(.) and floor(.) are operators indicating rounding up and rounding down at a first decimal point. When the PRB bundling size is determined to be 2 or 4, reception is performed by applying the first TCI state to PRGs at even places and applying the second TCI state to PRGs at odd places.

5) Multi-TRP FDM scheme B: indicates a multi-TRP based frequency resource division PDSCH repetitive transmission scheme, and this scheme has two PDSCH transmission occasions and thus, may repetitively transmit a PDSCH on each occasion. Likewise, in regard to the multi-TRP FDM scheme A, the multi-TRP FDM scheme B may respectively apply two TCI states indicated by the TCI state field in the DCI to non-overlapping frequency resources. If a PRB bundling size is determined to be wideband, the UE performs reception by applying the first TCI state to first ceil(N/2) RBs and the second TCI state to the remaining floor(N/2) RBs, where N is the number of RBs indicated by the Frequency Domain Resource Allocation field. Here, ceil(.) and floor(.) are operators indicating rounding up and rounding down at a first decimal point. When the PRB bundling size is determined to be 2 or 4, reception is performed by applying the first TCI state to PRGs at even places and applying the second TCI state to PRGs at odd places.

6) Multi-TRP TDM scheme A: indicates a multi-TRP based time resource division intra-slot PDSCH repetitive transmission scheme. The UE has two PDSCH transmission occasions in one slot, and the first reception occasion may be determined based on a start symbol and symbol length of a PDSCH indicated by the Time Domain Resource Allocation field in the DCI. A start symbol of the second reception occasion of the PDSCH may be a position after a symbol offset corresponding to StartingSymbolOffsetK that is higher layer signaling from a last symbol of the first transmission occasion, and a transmission occasion may be determined to be as long as the symbol length indicated. If StartingSymbolOffsetK that is higher layer signaling is not configured, the symbol offset may be assumed to be 0.

7) Multi-TRP TDM scheme B: indicates a multi-TRP based time resource division inter-slot PDSCH repetitive transmission scheme. The UE may have one PDSCH transmission occasion in one slot, and may receive repetitive transmission based on a start symbol and symbol length of the same PDSCH during slots corresponding to repetitionNumber indicated in the Time Domain Resource Allocation field in the DCI. If repetitionNumber is 2, the UE may receive the PDSCH repetitive transmission in first and second slots by respectively applying first and second TCI states. If repetitionNumber is greater than 2, the UE may use different TCI state application schemes depending on which tciMapping that is higher layer signaling is configured. If tciMapping is configured as cyclicMapping, the first and second TCI states are respectively applied to the first and second PDSCH transmission occasions, and this TCI state application method is equally applied to the remaining PDSCH transmission occasions. If tciMapping is configured as sequentialMapping, the first TCI state is applied to the first and second PDSCH transmission occasions and the second TCI state is applied to the third and fourth PDSCH transmission occasions, and this TCI state application method is equally applied to the remaining PDSCH transmission occasions.

Referring to the above descriptions related to PDCCH transmission/reception configuration and transmission beam configuration, current Rel-15 and Rel-16 NR do not support PDCCH repetitive transmission, such that it may be difficult to obtain required reliability in a scenario such as URLLC that requires high reliability. In Rel-17 FeMIMO, standardization of a method of enhancing PDCCH reception reliability via PDCCH repetitive transmission is ongoing. As a representative method of repetitive transmission of a PDCCH, there may be a non-single frequency network (non-SFN) method by which control resource sets associated with a plurality of search spaces explicitly associated by higher layer signaling are separated into time or frequency resources via different TRPs for repetitive transmission, and a method by which a plurality of TCI states are configured in one control resource set which is repetitively transmitted in an SFN scheme. Among them, in the non-SFN method, different control resource sets may be associated with a plurality of search spaces explicitly associated by higher layer signaling, respectively, or the same control resource set may be associated with all search spaces. Here, a method of respectively associating the different control resource sets may be considered as the multi-TRP based PDCCH repetitive transmission method, assuming that each control resource set is transmitted at a different TRP. Also, a method to associating the same control resource set with all search spaces may be considered as the single-TRP based PDCCH repetitive transmission method, assuming that transmission is performed at the same TRP.

The single-TRP based PDSCH transmission or multi-TRP based PDSCH transmission and repetitive transmission scheme may be identified based on the number of TCI states detected from a TCI state field indicated by DCI, the number of CDM groups indicated by an antenna port, a condition of repetitionNumber indicated by a Time Domain Resource Allocation field, and/or whether repetitionScheme that is higher layer signaling is configured, and in particular, the single-TRP or multi-TRP transmission scheme was identified based on the number of TCI states. Here, whether the TCI state field exists in the DCI is determined according to whether tci-PresentInDCI is configured as higher layer signaling for each CORESET, and when the TCI state field does not exist, only the single-TRP transmission was available. However, as the multi-TRP based PDCCH repetitive transmission is supported for a case where the TCI state field does not exist, scheduling for the multi-TRP transmission scheme may be needed to overcome a reliability difference between control information and data information. In the disclosure, a method of identifying the single-TRP based PDSCH transmission and the multi-TRP based PDSCH transmission when a TCI state field does not exist will now be described in detail, and if the identified scheme is the multi-TRP based PDSCH transmission scheme, a method of applying a TCI state will be additionally described.

For convenience of descriptions, a cell, a transmission point, a panel, a beam or/and a transmission direction, which may be identified by a higher layer/L1 parameter such as a TCI sate or spatial relation information, or an indicator such as a cell ID, TRP ID, panel ID, or the like will now be collectively referred to as a TRP. Therefore, in actual applications, the TRP may be appropriately substituted with one of the terms described above.

Hereinafter, in the disclosure, when the UE determines whether to apply the cooperative communication, the UE may use various methods by which PDCCH(s) that allocates a PDSCH to which the cooperative communication is applied has a particular format, PDCCH(s) that allocates a PDSCH to which the cooperative communication is applied includes a particular indicator to indicate whether the cooperative communication is applied, PDCCH(s) that allocates a PDSCH to which the cooperative communication is applied is scrambled by a particular RNTI, application of the cooperative communication in a particular section indicated by a higher layer is assumed, or the like. For convenience of descriptions, a case in which the UE receives the PDSCH to which the cooperative communication is applied based on conditions similar to those as described above will now be referred to as a NC-JT case.

Hereinafter, in the following description of the disclosure, higher layer signaling may refer to signaling corresponding to at least one or a combination of signaling below.

MIB

SIB or SIB X (X=1, 2, . . . )

RRC

MAC CE

Also, L1 signaling may refer to signaling corresponding to at least one or a combination of signaling methods using a physical channel or signaling below.

PDCCH

DCI

UE-specific DCI group common DCI common DCI scheduling DCI (e.g., DCI used for scheduling DL or UL data)

non-scheduling DCI (e.g., DCI not used for scheduling DL or UL data)

PUCCH uplink control information (UCI)

First Embodiment: Multi-TRP Based PDCCH Repetitive Transmission Method

In an embodiment of the disclosure, a multi-TRP based PDCCH repetitive transmission method will now be described. The multi-TRP based PDCCH repetitive transmission may have many different methods according to how each TCI state to be applied to transmit a PDCCH at each TRP is to be applied to afore-described various parameters used in PDCCH transmission. For example, the various parameters used in PDCCH transmission to which different TCI states are to be applied may include a CCE, a PDCCH candidate group, a control resource set, a search space, or the like. For the multi-TRP based PDCCH repetitive transmission, a soft combining scheme, a selection scheme, or the like may be considered as a reception method for the UE.

For the multi-TRP based PDCCH repetitive transmission, there may be five methods (Method 1-1, Method 1-2, Method 1-3, Method 1-4, and Method 1-5) as below, and the BS may configure the UE with at least one of the five methods by higher layer signaling or may indicate at least one by L1 signaling or may configure and indicate at least one in a combination of higher layer signaling and L1 signaling.

Method 1-1 a Method of Repetitively Transmitting a Plurality of PDCCHs Having a Same Payload Method 1-1 is a method of repetitively transmitting a plurality of pieces of control information with a same DCI format and same payload. Each of the plurality of pieces of control information may indicate information for scheduling a PDSCH to be repetitively transmitted, e.g., {PDSCH #1, PDSCH #2, . . . , PDSCH #Y} being transmitted repetitively over multiple slots. That each of the plurality of pieces of control information repetitively transmitted having the same payload may be expressed that PDSCH scheduling information of each control information, e.g., the number of PDSCH repetitive transmissions, time-axis PDSCH resource allocation information, i.e., slot offset $K\_0$ between the control information and PDSCH #1 and the number of PDSCH symbols, frequency-axis PDSCH resource allocation information, DMRS port allocation information, PDSCH-to-HARQ-ACK timing, a PUCCH resource indicator, or the like are all equal. The UE may improve reception reliability of the control information by soft-combining the repetitively-transmitted plurality of pieces of control information with the same payload.

For the soft combining, the UE needs to pre-know a resource location of the control information to be repetitively transmitted, the number of repetitive transmissions, and the like. To do so, the BS may pre-indicate time domain, frequency domain and spatial domain resource configurations of the control information to be repetitively transmitted. In a case where the control information is repetitively transmitted in the time domain, the control information may be repetitively transmitted over different CORSETs, over different search space sets in one CORESET, or over different PDCCH monitoring occasions in one CORESET and one search space set. A resource unit (CORESET unit, search space set unit, or PDCCH monitoring occasion unit) to be repetitively transmitted in the time domain and a repetitive transmission resource location (a PDCCH candidate index, or the like) may be indicated by higher layer configuration of the BS. Here, the number of PDCCH repetitive transmissions and/or a list of TRPs participating in the repetitive transmission and a transmission pattern may be explicitly indicated, and for the explicit indication, higher layer indication, MAC CE/L1 signaling, or the like may be used. Here, the list of TRPs may be indicated in the form of TCI state or QCL assumption described above.

In a case where the control information is repetitively transmitted in the frequency domain, the control information may be repetitively transmitted over different CORESETs, over different PDCCH candidates in one CORESET, or in each CCE. The resource unit to be repetitively transmitted in the time domain and the repetitive transmission resource location may be indicated by higher layer configuration of the BS. Also, the number of repetitive transmissions and/or a list of TRPs participating in the repetitive transmission and a transmission pattern may be explicitly indicated, and for the explicit indication, higher layer indication, MAC CE/L1 signaling, or the like may be used. Here, the list of TRPs may be indicated in the form of TCI state or QCL assumption described above.

In a case where the control information is repetitively transmitted in the spatial domain, the control information may be repetitively transmitted over different CORESETs or may be repetitively transmitted by configuring two or more TCI states in one CORESET.

In an embodiment of the disclosure, a method by which the BS repetitively transmits a PDCCH will now be described. DCI that includes scheduling information for a PUSCH or a PDSCH in a wireless communication system may be transmitted from the BS to the UE on a PDCCH.

Figure 22:
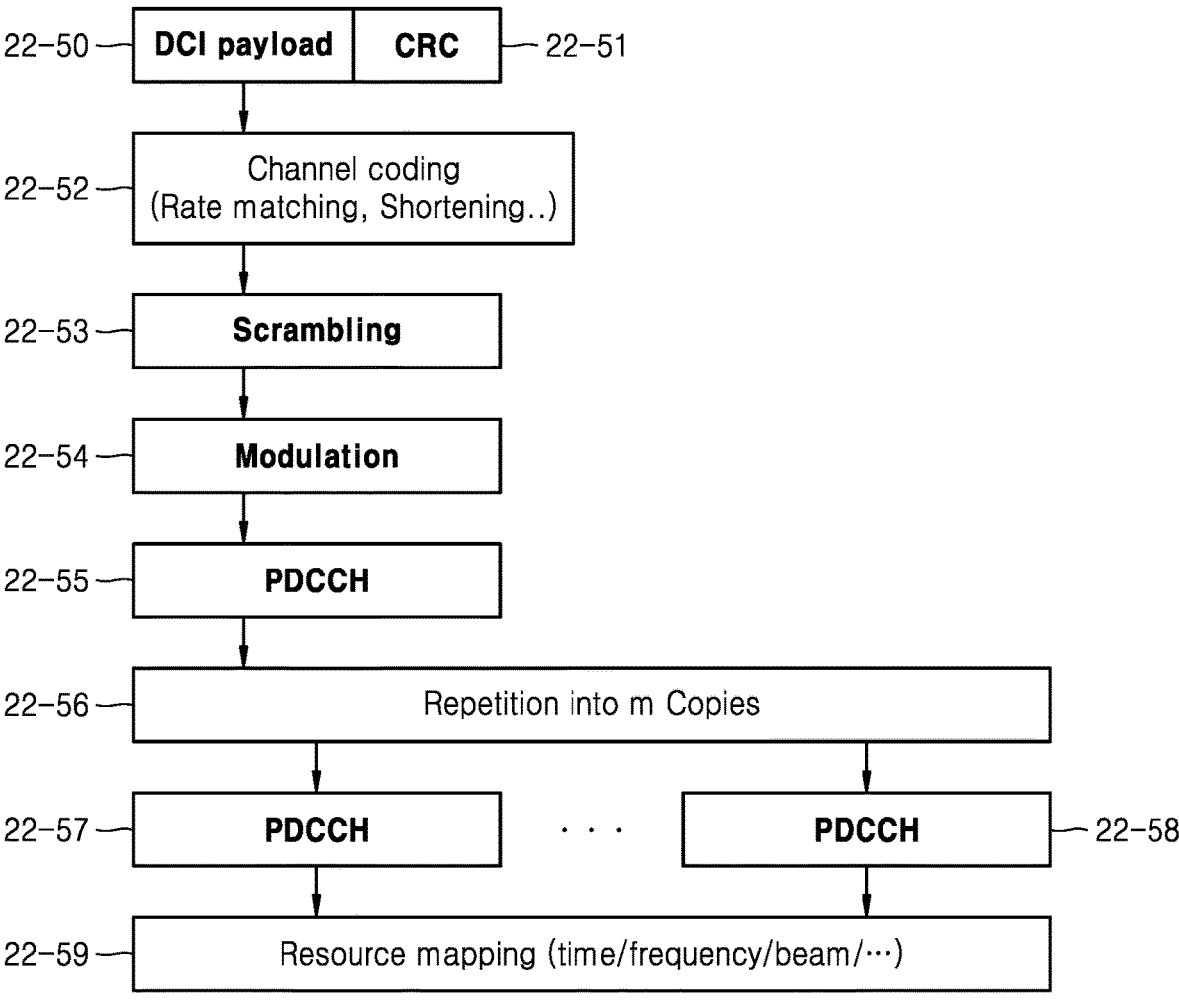
FIG. 22 is a diagram illustrating a procedure for generating a PDCCH being repetitively transmitted via two transmission and reception points (TRPs) according to an embodiment of the disclosure.

FIG. 22 is a diagram illustrating a procedure for generating a PDCCH being repetitively transmitted via two TRPs according to an embodiment of the disclosure.

The BS generates DCI (22-50), a CRC is attached to a DCI payload (22-51), and the DCI s channel coded (22-52), is scrambled (22-53), and then is modulated (22-54), such that the PDCCH may be generated (22-55). Afterward, the BS may copy the generated PDCCH multiple times (22-56, 22-57, 22-58). The BS may transmit a copied PDCCH by using a particular resource (e.g., a time, a frequency, a transmission beam, or the like) (22-59). Coded bits for a PDCCH to be repetitively transmitted at each TRP may be the same. In order to make the same coded bits, an information value for each DCI field in the PDCCH may also be equally configured. For example, all fields (e.g., TDRA, FDRA, TCI, antenna ports, and the like) included in the DCI information may be configured to have same values. Here, the same values may be generally interpreted as one meaning, but may imply different (e.g., two) values or may be interpreted as a plurality of meanings according to particular settings. Descriptions related thereto will now be provided below.

For example, referring to FIG. 22, if the BS repetitively performs transmission of the PDCCH twice (e.g., when m of 22-56 is 2), the BS may respectively map the PDCCHs to TRP A and TRP B. By doing so, the BS may repetitively transmit a PDCCH on a same beam or different beams in terms of a spatial domain. Here, the BS may perform PDCCH repetitive transmission based on CORESETs respectively associated with two search spaces that are explicitly associated with each other by higher layer signaling. When IDs of CORESETs associated with search spaces are the same or TCI states of the CORESETs are the same, the BS may perform PDCCH repetitive transmission based on a single TRP, and when IDs of CORESETs associated with search spaces are all different or TCI states of the CORESETs are all different, the BS may perform PDCCH repetitive transmission based on multiple TRPs. If the BS repetitively transmits the PDCCH four times, the BS may map two PDCCHs to each of TRP A and TRP B, and the two PDCCHs mapped to each TRP may be separately transmitted in the time domain. The separate PDCCH repetitive transmission in the time domain may be performed in a slot based, subslot based or mini-slot based time unit.

However, the method described above is merely an example and the disclosure is not limited thereto. In the disclosure, the UE and the BS may consider methods below for the PDCCH repetition operation described above.

PDCCH repetition in terms of the time/frequency/spatial domain in a same slot in a same CORESET PDCCH repetition in terms of the time/frequency/spatial domain in different slots in a same CORESET PDCCH repetition in terms of the time/frequency/spatial domain in a same slot in different CORESETs PDCCH repetition in terms of the time/frequency/spatial domain in different slots in different CORESETs Also, when CORESETPoolindex is configured, it may be considered for each CORESETPoolindex, in addition to the CORESET described above. Also, the number of PDCCH repetitions may independently increase, and accordingly, the afore-described methods may be simultaneously considered in combination.

The BS may pre-configure, by an RRC message, the UE with information about which domain is used for the PDCCH repetitive transmission. For example, in a case of PDCCH repetitive transmission in terms of the time domain, the BS may pre-configure the UE with information about which one of the slot based, subslot based, and mini-slot based time units is to be used for the repetition. As another example, in a case of PDCCH repetitive transmission in terms of the frequency domain, the BS may pre-configure the UE with information about which one of CORESET, BWP and component carrier (CC) is to be used for the repetition. As another example, in a case of PDCCH repetitive transmission in terms of the spatial domain, the BS may pre-configure the UE with information associated with a beam for the PDCCH repetitive transmission via configuration for each QCL type. The BS may combine a plurality of pieces of information described above and may transmit the combination to the UE in an RRC message. The BS may repetitively transmit the PDCH according to information pre-configured in an RRC message, and the UE may repetitively receive the PDCCH according to the information pre-configured in the RRC message.

Method 1-2 a Method of Repetitively Transmitting a Plurality of Pieces of Control Information in which DCI Formats and/or Payloads May be Different Method 1-2 is a method of repetitively transmitting a plurality of pieces of control information in which DCI formats and/or payloads may be different. The plurality of pieces of control information may schedule a PDSCH for repetitive transmission, and the number of repetitive transmissions of the PDSCH indicated by each control information may vary. For example, PDCCH #1 may indicate information scheduling {PDSCH #1, PDSCH #2, . . . , PDSCH #Y}, whereas PDCCH #2 may indicate information scheduling {PDSCH #2, . . . , PDSCH #Y}, . . . , and PDCCH #X may indicate information scheduling {PDSCH Y}. The method of repetitively transmitting the control information may have an advantage of reducing the total delay time required for control information and PDSCH repetitive transmission, compared to Method 1-1. However, in Method 1-2, payload of each control information to be repetitively transmitted may differ, such that soft combining of the plurality of pieces of control information to be repetitively transmitted is unavailable, and thus, may have low reliability, compared to Method 1-1.

In Method 1-2, the UE may not need to pre-know a resource location and the number of repetitive transmissions of the control information to be repetitively transmitted, and may independently decode and process each control information being repetitively transmitted. When the UE decodes a plurality of pieces of repetitive transmission control information that schedule the same PDSCH, the UE may process first repetitive transmission control information and may discard repetitive transmission control information from second control information A resource location, the number of repetitive transmissions, or the like of the control information to be repetitively transmitted may be indicated in advance, and the indication may be performed in a same manner as those described in Method 1-1.

Method 1-3 a Method of Repetitively Transmitting Each of a Plurality of Pieces of Control Information in which DCI Formats and/or Payloads May be Different Method 1-3 is a method of repetitively transmitting each of a plurality of pieces of control information in which DCI formats and/or payloads may be different. Here, each control information to be repetitively transmitted may have the same DCI format and payload. Method 1-2 may have lower reliability than Method 1-1 because soft-combining of a plurality of pieces of control information is unavailable in Method 1-2. On the other hand, Method 1-1 may have a long total delay time required for control information and PDSCH repetitive transmission, compared to Method 1-2. Method 1-3 uses advantages of Method 1-1 and Method 1-2, such that Method 1-3 may transmit control information with high reliability compared to Method 1-2 while decreasing the total delay time required for control information and PDSCH repetitive transmission compared to Method 1-1.

In Method 1-3, in order to decode and soft-combine the repetitively-transmitted control information, soft-combining of Method 1-1 and individual decoding of Method 1-2 may be used. For example, during repetitive transmission of a plurality of pieces of control information in which DCI formats and/or payloads may be different, first-transmitted control information may be decoded based on Method 1-2 and repetitive transmissions of the decoded control information may be soft-combined based on Method 1-1.

The BS may select and configure one of Method 1-1, Method 1-2 and Method 1-3 for repetitive transmission of control information. The control information repetitive transmission method may be explicitly indicated by the BS to the UE by higher layer signaling. Alternatively, the control information repetitive transmission method may be indicated by being combined with other configuration information. For example, higher layer configuration indicating the PDSCH repetitive transmission scheme may be combined with an indication of the control information repetitive transmission. When the PDSCH is indicated to be repetitively transmitted in an FDM scheme, the control information may be interpreted to be repetitively transmitted based on only Method 1-1. This is because the FDM based PDSCH repetitive transmission has no delay time decrease effect according to Method 1-2. For a similar reason, when the PDSCH is indicated to be repetitively transmitted in an intra-slot TDM scheme, the control information may be interpreted to be repetitively transmitted based on Method 1-1. On the other hand, when the PDSCH is indicated to be repetitively transmitted in a multiple inter-slot TDM scheme, Method 1-1, Method 1-2 or Method 1-3 for repetitive transmission of control information may be selected by higher layer signaling or L1 signaling.

The BS may explicitly indicate a control information repetitive transmission unit to the UE by higher layer configuration. Alternatively, the control information repetitive transmission unit may be indicated by being combined with other configuration information. For example, higher layer configuration indicating the PDSCH repetitive transmission scheme may be combined with an indication of the control information repetitive transmission. When the PDSCH is indicated to be repetitively transmitted in the FDM scheme, the control information may be interpreted to be repetitively transmitted in FDM or SDM. This is because, when the control information is repetitively transmitted as in a multiple inter-slot TDM scheme or the like, the delay time decrease effect according to PDSCH repetitive transmission in the FDM scheme does not occur. For a similar reason, when the PDSCH is indicated to be repetitively transmitted in an intra-slot TDM scheme, the control information may be interpreted to be repetitively transmitted in intra-slot TDM, FDM or SDM. On the other hand, when the PDSCH is indicated to be repetitively transmitted in multiple inter-slot TDM scheme, multiple inter-slot TDM, intra-slot TDM, FDM, or SDM may be selected by higher layer signaling to allow the control information to be repetitively transmitted.

Method 1-4 a PDCCH Transmission Scheme by which Each TCI State is Applied to Different CCEs in a Same PDCCH Candidate Group In Method 1-4, in order to improve PDCCH reception performance without PDCCH repetitive transmission, different TCI states meaning transmissions from multiple TRPs are applied to different CCEs in a PDCCH candidate group. This method is not PDCCH repetitive transmission but may be a method of obtaining spatial diversity in a PDCCH candidate group because different CCEs in the PDCCH candidate group are transmitted by applying different TCI states at each TRP. Different CCEs to which different TCI states are applied may be separated into time or frequency resources, and the UE may need to pre-know resource locations to which different TCI states are applied. The UE may receive the different CCEs to which different TCI states are applied in the same PDCCH candidate group and may separately decode the CCEs or may decode the CCEs at one time.

Method 1-5 a PDCCH Transmission Method by which a Plurality of TCI States are Applied to all CCEs in a Same PDCCH Candidate Group In Method 1-5, in order to improve PDCCH reception performance without PDCCH repetitive transmission, a plurality of TCI states are applied to all CCEs in a PDCCH candidate group and the CCEs are transmitted in an SFN scheme. This method is not PDCCH repetitive transmission but may be a method of obtaining spatial diversity via SFN transmission in a same CCE location in the PDCCH candidate group. The UE may receive CCEs in the same location to which different TCI states are applied in the same PDCCH candidate group, and may separately decode the CCEs or decode the CCEs at one time, by using some or all of the plurality of TCI states.

Second Embodiment: Soft-Combining Associated UE Capability Report in PDCCH Repetitive Transmission The UE may report, to the BS, UE capability associated with soft combining in PDCCH repetitive transmission, and there may be a few methods corresponding thereto. The methods will now be described in detail as below.

UE Capability Reporting Method 1

The UE may report, to the BS, UE capability in the form of available or unavailable only as to whether soft combining is available in PDCCH repetitive transmission.

For example, when the UE reports, to the BS, information indicating that soft combining is enabled in PDCCH repetitive transmission in the UE capability, the BS may determine whether the soft combining of the UE is enabled as most flexible (e.g., the BS determines that the UE is able to perform soft combining at an LLR level) and may notify PDCCH repetitive transmission associated configuration to the UE with maximum flexibility during the PDCCH transmission associated configuration. Here, as an example of PDCCH repetitive configuration, the BS may assume that soft combining between CORESETs or search spaces with different configurations, soft combining between PDCCH candidates at the same aggregation level, or soft combining between PDCCH candidates with different aggregation levels is available for the UE, and may notify the corresponding configuration to the UE.

As another example, when the UE reports information indicating that soft combining is available in PDCCH repetitive transmission to the BS in the UE capability, the BS may most conservatively determine a level of soft combining available in the UE (e.g., the BS determines that the UE can perform soft combining at an OFDM symbol level), and may most restrictedly notify PDCCH repetitive transmission associated configuration to the UE. Here, as an example of PDCCH repetitive configuration, the BS may assume that soft combining between a plurality of CORESETs having the same configuration or soft combining between PDCCH candidates with different aggregation levels is available for the UE, and may notify the configuration to the UE.

UE Capability Reporting Method 2

In order to further particularly represent the operation of soft combining available for the UE in the UE capability, compared to the UE capability reporting method 1, the UE may divide availability of soft combining into levels and may report the levels as the UE capability to the BS during PDCCH repetitive transmission. That is, the UE may identify a signal level at which the UE can apply soft combining for the PDCCH repetitive transmission among respective signal levels occurring from receiving operation procedures of the UE, and may report, to the BS, information of the applicable signal level as the UE capability. For example, the UE may notify the BS about soft combining being available at an OFDM symbol level as the signal level at which soft combining is applicable, about soft combining being available at a modulation symbol level, or about soft combining being available at an LLR level. Based on each signal level reported by the UE, the BS may notify the UE of appropriate configuration allowing the UE to perform soft combining according to the reported UE capability.

UE Capability Reporting Method 3

The UE may notify, in the UE capability, the BS of constraints required for the UE to perform soft combining in PDCCH repetitive transmission. For example, the UE may report, to the BSm that configurations of CORESETs respectively including two repetitive PDCCHs need to be equal. In another example, the UE may report, to the BS, that two repetitive PDCCH candidates need to at least have the same aggregation level.

UE Capability Reporting Method 4

When the UE receives PDCCH repetitive transmissions from the BS, the UE may report about which PDCCH repetitive transmission scheme is supported in the UE capability. For example, the UE may report, to the BS, that the UE supports Method 1-5 (SFN transmission scheme). In another example, the UE may report, to the BS, that the UE supports intra-slot TDM, inter-slot TDM or FDM scheme in Method 1-1 (method of repetitively transmitting a plurality of PDCCHs having the same payload) described above. In a case of TDM, the UE may report the BS of a maximum value of a time gap between two repetitive PDCCHs. For example, if the UE reported, to the BS, that the maximum value of the time gap between two repetitive PDCCHs corresponds to four OFDM symbols, when the BS performs TDM based PDCCH repetitive transmission to the UE based on the reported information, the BS may need to adjust the time gap between the two repetitive PDCCHs to four or less OFDM symbols.

UE Capability Reporting Method 5

When the UE receives PDCCH repetitive transmission from the BS, the UE may report, to the BS in the UE capability, the number of times of blind decoding to be consumed. For example, the UE may report the BS of the number of times of blind decoding to be consumed in receiving PDCCH repetitive transmissions as 1, 2, or 3 regardless of a receiving method by the UE (e.g., individual decoding, soft combining, other receiving schemes, or a combination thereof). The BS assumes that the UE is to consumed as much as the reported number of times of blind decoding when the UE receives PDCCH repetitive transmissions, and may notify the UE of configuration about a search space and a CORESET not to exceed a maximum number of times of blind decoding that the UE is able to use in a slot or span.

The afore-described UE capability reporting methods may be configured as a combination of two or more of the UE capability reporting methods for actual application. For example, the UE may simultaneously report, to the BS, that soft combining is available at a LLR level according to UE capability reporting method 2, that two repetitive PDCCH candidates need to have at least the same aggregation level according to UE capability reporting method 3, and that TDMed PDCCH repetitive transmission is supported and a maximum value of a time gap between two repetitive PDCCHs corresponds to four OFDM symbols according to UE capability reporting method 4. There may be applications based on a combination of other various UE capability reporting methods, but further descriptions thereof are not provided here.

Third Embodiment: Method of Configuring PDCCH Repetitive Transmission and Explicit Association In an embodiment of the disclosure, a PDCCH repetitive transmission method for allowing soft combining in PDCCH repetitive transmission will now be described. The BS may perform PDCCH repetitive transmission on the UE based on Method 1-1 (a method of repetitively transmitting a plurality of PDCCHs having the same payload) among various PDCCH repetitive transmission methods. In this case, the BS may configure the UE with information indicating that there is explicit linkage or association between repetitive PDCCH candidates by higher layer signaling, may indicate the information to the UE by L1 signaling, or may configure and indicate the information to the UE by a combination of higher layer signaling and L1 signaling, so as to reduce the number of times of blind decoding in consideration of whether or not soft combining of the UE is available. In more detail, there may be various association methods as below.

There may be various configuration methods below related to PDCCH repetitive transmission and explicit association by higher layer signaling.

PDCCH Repetitive Configuration Method 1

When there is configuration information in PDCCH-config that is higher layer signaling, For PDCCH repetitive transmission and explicit association related configuration, the BS may configure the UE with PDCCH-repetition-config in PDCCH-config that is higher layer signaling, and PDCCH-repetition-config may include a plurality of pieces of information below.

PDCCH repetitive transmission scheme—one of TDM, FDM, and SFN

CORESET-search space combination(s) to be used in PDCCH repetitive transmission

1) CORESET index(es)—OPTIONAL

2) Search space index(es)—OPTIONAL

Aggregation level(s) for explicit association—OPTIONAL

PDCCH candidate index(es) for explicit association—OPTIONAL

Frequency resource for explicit association—OPTIONAL

Based on the plurality of pieces of information above, the BS may configure the UE with PDCCH repetitive transmission by higher layer signaling. For example, when the PDCCH repetitive transmission scheme is configured to SFN, and as a CORESET-search space combination to be used in PDCCH repetitive transmission, the CORESET index is configured to 1 whereas the search space index is not configured, the UE may expect a PDCCH to be repetitively transmitted based on Method 1-5 (SFN transmission scheme) in a CORESET with an index of 1. Here, one TCI state or different multiple TCI states for the configured CORESET may be configured by higher layer signaling, may be indicated by L1 signaling or MAC CE signaling, or may be configured and indicated by a combination of higher layer signaling and L1 signaling or a combination of higher layer signaling and MAC CE signaling. When the PDCCH repetitive transmission scheme is configured to SFN, the UE may not expect the search space index to be configured in the CORESET-search space combination to be used in PDCCH repetitive transmission. In another example, when the PDCCH repetitive transmission scheme is configured to TDM or FDM and a total of two CORESET-search space combinations to be used in PDCCH repetitive transmission are configured, the first combination having the CORESET index 1 and search space index 1 and the second combination having the CORESET index 2 and search space index 2, the UE may expect a PDCCH to be repetitively transmitted in the TDM or FDM scheme based on Method 1-1 by using the two CORESET-search space combinations. Here, same multiple TCI states or different multiple TCI states for the configured CORESET may be configured by higher layer signaling, may be indicated by L1 signaling or MAC CE signaling, or may be configured and indicated by a combination of higher layer signaling and L1 signaling or a combination of higher layer signaling and MAC CE signaling. Also, when the PDCCH repetitive transmission scheme is configured to TDM or FDM, the UE may expect that maximally up to two CORESET-search space combinations to be used in PDCCH repetitive transmission are to be configured and may expect that both the CORESET and search space indexes are to be configured in each combination.

Also, values of the five pieces of information above may be updated based on a MAC CE, without RRC reconfiguration. If the BS does not configure the UE with PDCCH-repetition-config, the UE may not expect PDCCH repetitive transmission but may expect only PDCCH single transmission. The aggregation level for explicit association, the PDCCH candidate index, and the frequency resources may not be configured or at least one of them may be configured, according to an explicit association method to be described at a later time.

PDCCH Repetitive Configuration Method 2

In a case where there is configuration information in higher layer signaling for a search space, the BS may add higher layer signaling to searchSpace that is higher layer signaling about a search space for PDCCH repetitive transmission and may notify it to the UE. For example, a parameter 'repetition' that is additional higher layer signaling may be configured to 'on' or 'off' in searchSpace that is higher layer signaling, thereby indicating that the search space is to be used for repetitive transmission. There may be one or two search spaces for which 'repetition' is configured to 'on', for each BWP. For example, when searchSpaceId is configured to 1, controlResourceSetId is configured to 1, and 'repetition' is configured to 'on' in searchSpace that is higher layer signaling for search space index 1, the UE may expect that PDCCH repetitive transmission is to be performed according to Method 1-5 (SFN transmission method) in CORESET 1 associated with search space 1. In another example, when searchSpaceId is configured to 1, controlResourceSetId is configured to 1, and 'repetition' is configured to 'on' in searchSpace that is higher layer signaling for search space index 1, and when searchSpaceId is configured to 2, controlResourceSetId is configured to 2, and 'repetition' is configured to 'on' in searchSpace that is higher layer signaling for search space index 2, the UE may detect that PDCCH repetitive transmission is to be performed in TDM or FDM according to Method 1-1 in a combination of CORESET 1+search space 1 or a combination of CORESET 2+search space 2. TDM and FDM may be identified by time and frequency configuration by higher layer signaling of CORESET 1 or 2 and search space 1 or 2. Also, an aggregation level for explicit association or PDCCH candidate indexes specified in PDCCH repetitive configuration method 1 may be configured in higher layer signaling for a search space for which 'repetition' is configured to 'on', and according to an explicit association method to be described at a later time, both of them may not be configured, only one of them may be configured, or both of them may be configured.

Fourth Embodiment: Method of Determining TCI of PDSCH when TCI State Field is not Present in DCI In an embodiment of the disclosure, a method by which, when a TCI state field is not present in DCI transmitted from the BS, a TCI state of a PDSCH scheduled by the DCI is determined will now be described. If the UE has received DCI on a PDCCH transmitted in a CORESET for which tci-PresentInDCI that is higher layer signaling is not configured, the DCI may not include a TCI state field. Depending on whether the PDCCH is solely transmitted or repetitively transmitted from the BS, a method of determining a TCI state of a PDSCH may vary. How the method of determining a TCI state of a PDSCH varies according to two conditions will now be described in Fourth-1 embodiment and Fourth-1 embodiment below.

Fourth-1 Embodiment: Method of Determining TCI State of Single-TRP Based PDSCH During PDCCH Single Transmission In an embodiment of the disclosure, a method by which, when a PDCCH not including a TCI state field is solely transmitted, a TCI state of a single-TRP based PDSCH scheduled by the PDCCH is determined will now be described. If scheduling offset from the PDCCH to the PDSCH is longer than timeDurationForQCL that is reported UE capability, the UE may determine, as a TCI state of the PDSCH, a TCI state of a CORESET including the received PDCCH. If scheduling offset from the PDCCH to the PDSCH is shorter than timeDurationForQCL that is reported UE capability, the UE may determine, as a TCI state of the PDSCH, a TCI state corresponding to lowest ID among CORESETs that can be monitored in a most recent slot.

Fourth-2 Embodiment: Method of Determining TCI State of Single-TRP Based PDSCH During PDCCH Repetitive Transmission In an embodiment of the disclosure, a method by which, when a PDCCH not including a TCI state field is repetitively transmitted, a TCI state of a single-TRP based PDSCH scheduled by the PDCCH is determined will now be described. If symbol locations on which transmissions of two PDCCHs are respectively ended are different from each other, when scheduling offset from a PDCCH whose transmission end is made at a later time to a PDSCH scheduled by the PDCCH is longer than timeDurationForQCL that is reported UE capability, the UE may determine, as a TCI state of the PDSCH, a TCI state of a CORESET with lower ID among two CORESETs including the received PDCCHs. If scheduling offset from a PDCCH whose transmission end is made at a later time among two repetitive PDCCHs to a PDSCH scheduled by the PDCCH is shorter than timeDurationForQCL that is reported UE capability, the UE may determine, as a TCI state of the PDSCH, a TCI state corresponding to lowest ID among CORESETs that can be monitored in a most recent slot.

Fifth Embodiment: Single- or Multi-TRP Based PDSCH Transmissions Determining Method for Case where TCI State Field is not Present in DCI that is Repetitively Transmitted In an embodiment of the disclosure, a method by which, when a TCI state field is not present in DCI transmitted from the BS, single-TRP based PDSCH transmission or multi-TRP based PDSCH transmission is determined will now be described. As described above, if the UE has received DCI on a PDCCH transmitted in a CORESET for which tci-PresentInDCI that is higher layer signaling is not configured, the DCI may not include a TCI state field. In this regard, according to the current standard, regardless of DCI being solely transmitted or repetitively transmitted, the UE may be scheduled only single-TRP based PDSCH transmission. In sub-embodiments below, when the UE receives repetitive PDCCHs and UE capability reporting or particular conditions are satisfied, how the UE can be scheduled single- or multi-TRP based PDSCH and can distinguish between them will now be described.

Fifth-1 Embodiment: UE Capability Reporting

In an embodiment of the disclosure, descriptions are provided for UE capability reporting by the UE which has received PDCCH repetitive transmission, in which the UE attempts to receive single-TRP based PDSCH transmission or multi-TRP based PDSCH transmission by DCI when a TCI state field is not present in the DCI. The UE may report the BS of at least one or a combination of UE capabilities listed below. The BS may identify that the UE can be scheduled single-TRP or multi-TRP based PDSCH and can distinguish between them even when a TCI state field is not present in DCI being repetitively transmitted, and the BS may schedule multi-TRP based PDSCH to the UE even when the TCI state field is not present in the DCI. An example of UE capabilities the UE can report as one or a combination thereof When a TCI state field is not present in DCI, the UE may report, in UE capability, that the UE can receive multi-TRP based PDSCH transmission by the DCI. Such UE capability reporting may mean that all multi-TRP transmission schemes described above with reference to Table 31 are supported or some of all multi-TRP transmission schemes are supported.

The UE may report, in UE capability, a method of distinguishing, by DCI, between single-TRP based PDSCH transmission and multi-TRP based PDSCH transmission when a TCI state field is not present in the DCI. The distinguishing method may include at least one of methods described with reference to Fifth-2 embodiment below.

The UE may report, in UE capability, a method of determining a TCI state of a PDSCH when the UE receives multi-TRP based PDSCH transmission by DCI when a TCI state field is not present in the DCI. The determining method may include at least one of methods described with reference to Fifth-3 embodiment below.

Fifth-2 Embodiment: Method of Distinguishing Between Single- or Multi-TRP Based PDSCH Transmissions when TCI State Field is not Present in DCI being Repetitively Transmitted In an embodiment of the disclosure, a method by which the UE having received PDCCH repetitive transmission distinguishes, by DCI, between single-TRP or multi-TRP based PDSCH transmission when a TCI state field is not present in the DCI will now be described.

Method 5-2-1 to Use Condition of TCI State Codepoint Activated for PDSCH

When the UE receives PDCCH repetitive transmission, a TCI state field may not be present in DCI corresponding thereto. In this case, in order to distinguish, by the DCI, between single-TRP or multi-TRP based PDSCH transmission, the UE may use a condition of TCI state codepoint of a PDSCH activated for a BWP scheduled by the DCI.

For example, if first TCI state codepoint of the activated PDSCH includes two TCI states, the UE may determine multi-TRP based PDSCH transmission when a TCI state field is not present in the DCI.

As another example, if at least one TCI state codepoint of the activated PDSCH includes two or more TCI states, the UE may determine multi-TRP based PDSCH transmission when a TCI state field is not present in the DCI.

As another example, if at least half of TCI state codepoints of the activated PDSCH includes two or more TCI states, the UE may determine multi-TRP based PDSCH transmission when a TCI state field is not present in the DCI.

In the examples described above, after multi-TRP based PDSCH transmission is determined, as described above with reference to Table 31, a particular multi-TRP transmission scheme may be indicated according to higher layer signaling configuration associated with an antenna port field, a repetitionNumber associated condition in a Time Domain Resource Allocation field, and/or repetitionScheme associated configuration in the DCI.

Method 5-2-2 to Use Different Numbers of TCI States of CORESETs Used in PDCCH Repetitive Transmission When the UE receives PDCCH repetitive transmission, a TCI state field may not be present in DCI corresponding thereto. In this case, in order to distinguish, by the DCI, between single-TRP or multi-TRP based PDSCH transmission, the UE may use different numbers of TCI states of CORESETs used in PDCCH repetitive transmission. Here, considerable PDCCH repetitive transmission may be Method 1-1 to Method 1-5 described above with reference to First embodiment. In particular, according to Method 1-1, the UE may use TCI states of different or same CORESETs respectively associated with two search spaces that are explicitly associated with each other, and according to Method 1-5, the UE may use a TCI state activated for one CORESET being transmitted based on the SFN scheme. If the number of different TCI states of CORESETs used in PDCCH repetitive transmission is 1, the UE may determine single-TRP based PDSCH transmission, and if the number thereof is 2, the UE may determine multi-TRP based PDSCH transmission.

For example, if PDCCH repetitive transmission is performed based on same CORESETs respectively associated with two search spaces that are explicitly associated with each other, according to Method 1-1, the number of TCI states of CORESETs used in PDCCH repetitive transmission is 1, and thus, the UE may determine single-TRP based PDSCH transmission.

As another example, if PDCCH repetitive transmission is performed based on different CORESETs respectively associated with two search spaces that are explicitly associated with each other, according to Method 1-1, and the CORESETs have the same TCI state, the number of TCI states of CORESETs used in PDCCH repetitive transmission is 1, and thus, the UE may determine single-TRP based PDSCH transmission.

As another example, if PDCCH repetitive transmission is performed based on different CORESETs respectively associated with two search spaces that are explicitly associated with each other, according to Method 1-1, and the CORESETs have different TCI states, the number of TCI states of CORESETs used in PDCCH repetitive transmission is 2, and thus, the UE may determine multi-TRP based PDSCH transmission.

As another example, if PDCCH repetitive transmission is performed based on one CORESET being transmitted based on the SFN scheme according to Method 1-5, and the CORESET has one TCI state, the number of TCI states of the CORESET used in PDCCH repetitive transmission is 1, and thus, the UE may determine single-TRP based PDSCH transmission.

As another example, if PDCCH repetitive transmission is performed based on one CORESET being transmitted based on the SFN scheme according to Method 1-5, and the CORESET has two TCI states, the number of TCI states of the CORESET used in PDCCH repetitive transmission is 2, and thus, the UE may determine multi-TRP based PDSCH transmission.

In the examples described above, after multi-TRP based PDSCH transmission is determined, as described above with reference to Table 31, a particular multi-TRP transmission scheme may be indicated according to higher layer signaling configuration associated with an antenna port field, a repetitionNumber associated condition in a Time Domain Resource Allocation field, and/or repetitionScheme associated configuration in the DCI.

Method 5-2-3 to Use Index of Pair of Search Spaces being Explicitly Associated with Each Other or Index of CORESET, which are Used in PDCCH Repetitive Transmission When the UE receives PDCCH repetitive transmission, a TCI state field may not be present in DCI corresponding thereto. In this case, in order to distinguish, by the DCI, between single-TRP or multi-TRP based PDSCH transmission, the UE may use, as a condition, an index of a pair of search spaces being explicitly associated with each other or an index of a CORESET, which are used in PDCCH repetitive transmission. Here, considerable PDCCH repetitive transmission may be Method 1-1 to Method 1-5 described above with reference to First embodiment. In particular, according to Method 1-1, when a pair of two search spaces being explicitly associated with each other is plural in number in a corresponding BWP, the UE may distinguish between single- or multi-TRP based PDSCH schedulings, depending on which index of search space pair is used in PDSCH scheduling. Also, according to Method 1-1, the UE may use an index of one CORESET being transmitted based on the SFN scheme.

For example, when PDCCH repetitive transmission is performed at even or odd indexes, the UE may determine single- or multi-TRP based PDSCH transmission, based on an index. For example, in a case where PDCCH transmission is performed based on same CORESETs respectively associated with two search spaces that are explicitly associated with each other according to Method 1-1, four search space pairs are present in a corresponding BWP, and a PDSCH is scheduled in a search space pair indexed by 1, the UE may determine multi-TRP based PDSCH transmission. When a PDSCH is scheduled in a search space pair indexed by 4, the UE may determine single-TRP based PDSCH transmission. Similarly, in a case where an index of one CORESET being transmitted based on the SFN scheme according to Method 1-5 is used, transmission may be identified based on an index of a CORESET. Obviously, multi- or single-TRP based PDSCH transmission may be identified based on even and odd indexes. The association between single- or multi-TRP based PDSCHs based on even and odd indexes may be preset using a rule between the BS and the UE, or the BS may explicitly notify the UE of a determining method by higher layer signaling.

As another example, the half of all indexes may be associated with single- or multi-TRP based PDSCH transmissions, such that single- or multi-TRP based PDSCH transmissions may be identified based on indexes. For example, in a case where PDCCH transmission is performed based on same CORESETs respectively associated with two search spaces that are explicitly associated with each other, according to Method 1-1, and N search space pairs are present on a BWP corresponding thereto, when a PDSCH is scheduled in search space pairs indexed by 1, . . . , ceil(N/2), the UE may determine single-TRP based PDSCH transmission. When a PDSCH is scheduled in search space pairs indexed by ceil(N/2)+1, . . . , N, the UE may determine multi-TRP based PDSCH transmission. Similarly, when an index of one CORESET being transmitted based on the SFN scheme according to Method 1-5 is used, PDCCH transmission may be identified according to the index of the CORESET. Obviously, the UE may determine that the first half of indexes are for multi-TRP based PDSCH transmission, and the other half of the indexes are for single-TRP based PDSCH transmission. The association between single- or multi-TRP based PDSCHs based on indexes may be preset using a rule between the BS and the UE, or the BS may explicitly notify the UE of a determining method by higher layer signaling.

As another example, an index configured by higher layer signaling may be associated with single- or multi-TRP based PDSCH transmission, such that single- or multi-TRP based PDSCH transmission may be identified. For example, in a case where PDCCH transmission is performed based on same CORESETs respectively associated with two search spaces that are explicitly associated with each other, according to Method 1-1, and a PDSCH is scheduled in search space pairs indexed by 1 and 2 among N search space pairs on a BWP corresponding thereto, the UE may determine single-TRP based PDSCH transmission. When a PDSCH is scheduled in search space pairs indexed by 3, . . . , N, the UE may determine multi-TRP based PDSCH transmission. Similarly, when an index of one CORESET being transmitted based on the SFN scheme according to Method 1-5 is used, PDCCH transmission may be identified according to the index of the CORESET.

With respect to each of the examples described above, in a case of PDCCH repetitive transmission based on Method 1-1, when a search space pair with a particular index is determined as multi-TRP based PDSCH transmission, it may be assumed that CORESETs respectively associated with search space pairs are different from each other and different TCI states are activated. Also, in a case of PDCCH repetitive transmission based on Method 1-5, when a CORESET with a particular index is determined as multi-TRP based PDSCH transmission, it may be assumed that two TCI states are activated for the CORESET.

After multi-TRP based PDSCH transmission is determined in the examples described above, as described above with reference to Table 31, a particular multi-TRP transmission scheme may be indicated according to higher layer signaling configuration associated with an antenna port field, a repetitionNumber associated condition in a Time Domain Resource Allocation field, and/or repetitionScheme associated configuration in the DCI.

Method 5-2-4 Based on New Higher Layer Signaling Configuration

When the UE receives PDCCH repetitive transmission, a TCI state field may not be present in DCI corresponding thereto. In this case, in order to distinguish, by the DCI, between single-TRP or multi-TRP based PDSCH transmission, the UE may configure and use new higher layer signaling as a condition. Here, new higher layer signaling may be configured for each cell or each BWP, and if it is PDCCH repetitive transmission based on Method 1-1, new higher layer signaling may be configured for each search space pair in a particular BWP, and if it is PDCCH repetitive transmission based on Method 1-5, new higher layer signaling may be configured for each CORESET in a particular BWP. If new higher layer signaling is configured for each cell, when a TCI state field is not present in DCI in a cell corresponding thereto, all PDSCHs to be scheduled may be single- or multi-TRP based PDSCH scheduling depending on higher layer signaling corresponding thereto.

After multi-TRP based PDSCH transmission is determined according to afore-described new higher layer signaling, as described above with reference to Table 31, a particular multi-TRP transmission scheme may be indicated according to higher layer signaling configuration associated with an antenna port field, a repetitionNumber associated condition in a Time Domain Resource Allocation field, and/or repetitionScheme associated configuration in the DCI.

Fifth-3 Embodiment: Method of Determining TCI State of Multi-TRP Based PDSCH Transmission when TCI State Field is not Present in DCI being Repetitively Transmitted In an embodiment of the disclosure, when the UE receives PDCCH repetitive transmission, a TCI state field may not be present in the DCI. In this case, the UE may distinguish, by the DCI, between single-TRP or multi-TRP based PDSCH transmission. Hereinafter, descriptions are provided for a method of determining a TCI state of each PDSCH transmission when PDSCH transmission is multi-TRP based PDSCH transmission.

Method 5-3-1 to Use TCI State of CORESET Used in PDCCH Repetitive Transmission

In a case where a TCI state field is not present in DCI being repetitively transmitted and the UE determines to have been scheduled multi-TRP based PDSCH transmission, the UE may apply a TCI state of a CORESET used in PDCCH repetitive transmission to a TCI state of PDSCH.

For example, when PDCCH repetitive transmission is performed based on different CORESETs respectively associated with two search spaces that are explicitly associated with each other, according to Method 1-1, TCI states of the CORESETs may be respectively applied to TCI states of multi-TRP based PDSCH transmission. Here, TCI states 1 and 2 to be applied in PDSCH transmission may be determined using methods below.

1) A TCI state activated for a CORESET having a lower index among two CORESETs may be applied to TCI state 1, and a TCI state activated for a CORESET having a higher index may be applied to TCI state 2.

2) A TCI state activated for a CORESET having a higher index among two CORESETs may be applied to TCI state 1, and a TCI state activated for a CORESET having a lower index may be applied to TCI state 2.

3) A TCI state activated for a CORESET to be first transmitted among two CORESETs may be applied to TCI state 1, and a TCI state activated for a CORESET to be later transmitted may be applied to TCI state 2.

4) A TCI state activated for a CORESET to be later transmitted among two CORESETs may be applied to TCI state 1, and a TCI state activated for a CORESET to be first transmitted may be applied to TCI state 2.

5) A TCI state activated for a CORESET to be first completed in transmission among two CORESETs may be applied to TCI state 1, and a TCI state activated for a CORESET to be later completed in transmission may be applied to TCI state 2.

6) A TCI state activated for a CORESET to be later completed in transmission among two CORESETs may be applied to TCI state 1, and a TCI state activated for a CORESET to be first completed in transmission may be applied to TCI state 2.

7) A TCI state activated for a CORESET among two CORESETs, the CORESET being associated with a search space having a lower index may be applied to TCI state 1, and a TCI state activated for a CORESET associated with a search space having a higher index may be applied to TCI state 2.

8) A TCI state activated for a CORESET among two CORESETs, the CORESET being associated with a search space having a higher index may be applied to TCI state 1, and a TCI state activated for a CORESET associated with a search space having a lower index may be applied to TCI state 2.

9) A TCI state activated for a CORESET among two CORESETs, the CORESET being transmitted from an RB with a lower index on a frequency resource may be applied to TCI state 1, and a TCI state activated for a CORESET being transmitted from an RB with a higher index may be applied to TCI state 2.

10) A TCI state activated for a CORESET among two CORESETs, the CORESET being transmitted from an RB with a higher index on a frequency resource may be applied to TCI state 1, and a TCI state activated for a CORESET being transmitted from an RB with a lower index may be applied to TCI state 2.

11) When two CORESETs are completely overlapped on a time domain (when start and end points are the same), one of 1), 2), 7), 8), 9), and 10) may be selected and applied.

TCI state 1 and TCI state 2 determined based on one of 1) to 11) described above may be equally used in each TCI state application method of multi-TRP based PDSCH transmission schemes described with reference to Table 31 above.

Method 5-3-2 to Use Codepoint Having Two TCI States Among TCI States Activated for PDSCH In a case where a TCI state field is not present in DCI being repetitively transmitted and the UE determines to have been scheduled multi-TRP based PDSCH transmission, the UE may apply, to TCI states of a PDSCH, TCI state 1 and TCI state 2 of lowest codepoint having two TCI states among TCI states activated for the PDSCH. TCI state 1 and TCI state 2 determined as described above may be equally used in each TCI state application method of multi-TRP based PDSCH transmission schemes described with reference to Table 31 above.

Method 5-3-3 to Use TCI State Configured for PDSCH

In a case where a TCI state field is not present in DCI being repetitively transmitted and the UE determines to have been scheduled multi-TRP based PDSCH transmission, the UE may apply, to TCI states of a PDSCH, two TCI states among TCI states configured for a PDSCH on a BWP corresponding thereto. For example, TCI state 1 and TCI state 2 determined by using TCI states with two lowest indexes among the TCI states configured for the PDSCH on the corresponding BWP may be equally used in each TCI state application method of multi-TRP based PDSCH transmission schemes described with reference to Table 31 above.

Figure 23A:
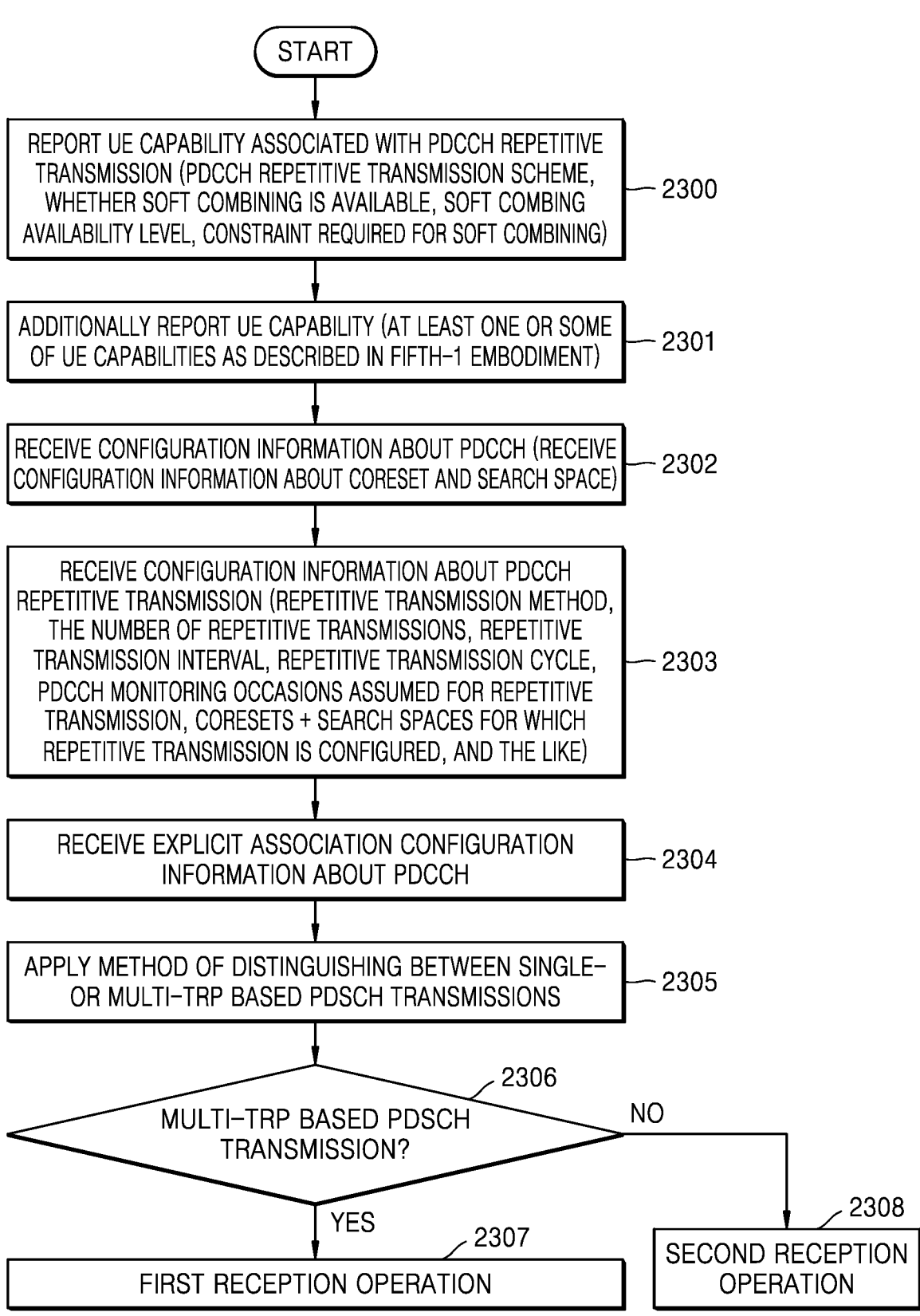
FIGS. 23A and 23B are flowcharts for respectively describing operation orders of a UE and a BS, in which a procedure for distinguishing between single- or multi-TRP based PDSCH transmissions when a TCI state field is not present in DCI is illustrated according to various embodiments of the disclosure.
Figure 23B:
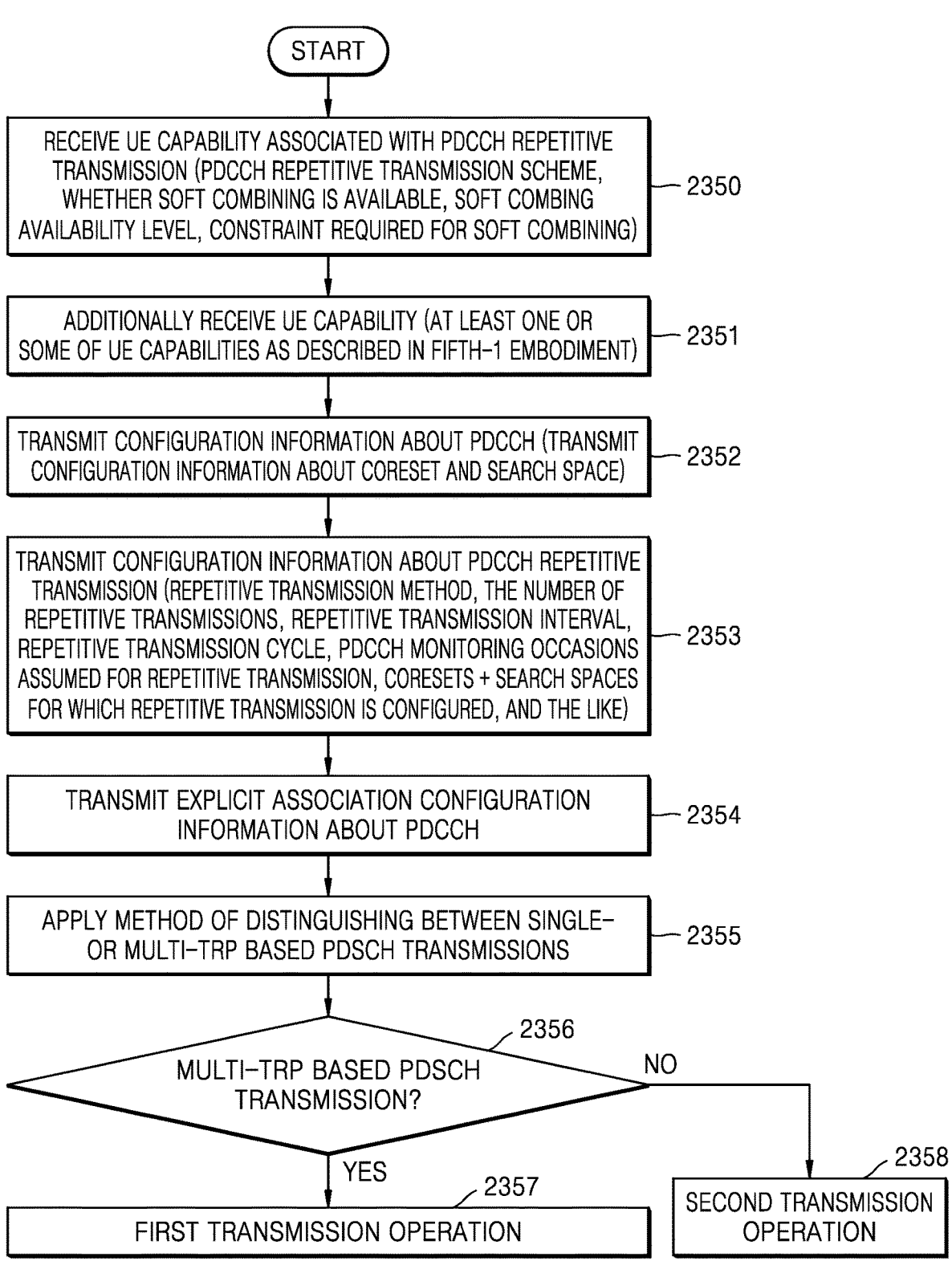

FIGS. 23A and 23B are diagrams for respectively describing operation orders of a UE and a BS, in which a procedure for distinguishing between single- or multi-TRP based PDSCH transmissions when a TCI state field is not present in DCI is illustrated according to various embodiments of the disclosure.

Referring to FIG. 23A, an operation of the UE for distinguishing between single- or multi-TRP based PDSCH transmissions when a TCI state field is not present in DCI may include operations 2300 to 2308.

In operation 2300, the UE may report, as UE capability, information associated with PDCCH repetitive transmission (e.g., at least one or some of a PDCCH repetitive transmission scheme, whether soft combining is available, a soft combing availability level, a constraint required for soft combining, and the like) to the BS.

In operation 2301, the UE may report the BS of UE capability associated with PDCCH repetitive transmission. When the UE receives PDCCH repetitive transmission, a TCI state field may not be present in DCI corresponding thereto. In this case, the UE may report, by DCI, the BS of UE capability (e.g., at least one or some of UE capabilities as described in Fifth-1 embodiment) for receiving single-TRP based PDSCH transmission or multi-TRP based PDSCH transmission.

In operation 2302, the UE may receive configuration information about a PDCCH (e.g., configuration information about CORESET and search space) from the BS.

In operation 2303, the UE may additionally receive, from the BS, configuration information about PDCCH repetitive transmission (e.g., a repetitive transmission method, the number of repetitive transmissions, a repetitive transmission interval, a repetitive transmission cycle, PDCCH monitoring occasions assumed for repetitive transmission, CORESETs and search spaces for which repetitive transmission is configured, and the like).

In operation 2304, the UE may additionally receive information related to configuration of explicit association in PDCCH repetitive transmission (e.g., an aggregation level, a PDCCH candidate group, a frequency resource, and the like).

In operation 2305, the UE may determine a method of distinguishing between single- or multi-TRP based PDSCH transmissions when a TCI state field is not present in DCI (e.g., at least one of Method 5-2-1 to Method 5-2-4 as described in Fifth-2 embodiment), and may apply the determined method.

In operation 2306, the UE may determine whether multi-TRP based PDSCH transmission is scheduled, based on a plurality of pieces of configuration and indication information received from the BS and the method of distinguishing between single- or multi-TRP based PDSCH transmissions.

When multi-TRP based PDSCH transmission is scheduled, the UE may perform a first reception operation in operation 2307. The first reception operation may be an operation to which at least one of Method 5-3-1 to Method 5-3-3 is applied, wherein Method 5-3-1 to Method 5-3-3 are described in Fifth-3 embodiment as an operation of determining and receiving each TCI state for multi-TRP based PDSCH transmission or repetitive transmission.

When multi-TRP based PDSCH transmission is not scheduled, the UE may perform a second reception operation in operation 2308. The second reception operation may be a reception operation for single-TRP based PDSCH transmission, according to receiving methods of afore-described Fourth-1 and Fourth-2 embodiments according to whether or not PDCCH repetitive transmission is present.

Referring to FIG. 23B, an operation of the BS for distinguishing between single- or multi-TRP based PDSCH transmissions when a TCI state field is not present in DCI may include operations 2350 to 2358.

In operation 2350, the BS may receive, as UE capability, information associated with PDCCH repetitive transmission (e.g., at least one or some of a PDCCH repetitive transmission scheme, whether soft combining is available, a soft combing availability level, a constraint required for soft combining, and the like) from the UE.

In operation 2351, the BS may receive UE capability associated with PDCCH repetitive transmission. When the UE receives PDCCH repetitive transmission, a TCI state field may not be present in DCI corresponding thereto. In this case, the UE may transmit, by DCI, UE capability (e.g., at least one or some of UE capabilities as described in Fifth-1 embodiment) capable of receiving single-TRP based PDSCH transmission or multi-TRP based PDSCH transmission, and the BS may receive the UE capability from the UE.

In operation 2352, the BS may transmit configuration information about a PDCCH (e.g., configuration information about CORESET and search space) to the UE.

In operation 2353, the BS may additionally transmit, to the UE, configuration information about PDCCH repetitive transmission (e.g., a repetitive transmission method, the number of repetitive transmissions, a repetitive transmission interval, a repetitive transmission cycle, PDCCH monitoring occasions assumed for repetitive transmission, CORESETs and search spaces for which repetitive transmission is configured, and the like).

In operation 2354, the BS may additionally transmit, to the UE, information related to configuration of explicit association in PDCCH repetitive transmission (e.g., an aggregation level, a PDCCH candidate group, a frequency resource, and the like).

In operation 2355, the BS may determine a method of distinguishing between single- or multi-TRP based PDSCH transmissions when a TCI state field is not present in DCI (e.g., at least one of Method 5-2-1 to Method 5-2-4 as described in Fifth-2 embodiment), and may apply the determined method.

In operation 2356, whether multi-TRP based PDSCH transmission is scheduled may be determined.

When multi-TRP based PDSCH transmission is scheduled, the BS may perform a first transmission operation in operation 2357. The first transmission operation may be an operation to which at least one of Method 5-3-1 to Method 5-3-3 is applied, wherein Method 5-3-1 to Method 5-3-3 are described in Fifth-3 embodiment as an operation of determining and transmitting each TCI state for multi-TRP based PDSCH transmission or repetitive transmission.

When multi-TRP based PDSCH transmission is not scheduled, the BS may perform a second transmission operation in operation 2358. The second transmission operation may be a transmission operation for single-TRP based PDSCH transmission, according to receiving methods of afore-described Fourth-1 and Fourth-2 embodiments according to whether or not PDCCH repetitive transmission is present.

Figure 24:
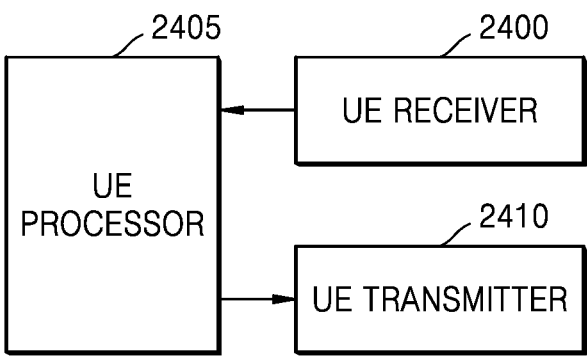
FIG. 24 is a diagram illustrating a structure of a UE in a wireless communication system according to an embodiment of the disclosure.

FIG. 24 is a diagram illustrating a structure of a UE in a wireless communication system according to an embodiment of the disclosure.

Referring to FIG. 24, the UE may include a transceiver collectively referring to a UE receiver 2400 and a UE transmitter 2410, a memory (not shown), and a UE processor (or a UE controller or a processor) 2405. According to the communication method of the UE described above, the transceiver 2400 or 2410, the memory, and the UE processor 2405 of the UE may operate. However, elements of the UE are not limited to the example above. For example, the UE may include more elements than those described above or may include fewer elements than those described above. In addition, the transceiver 2400 or 2410, the memory, and the processor 2405 may be implemented as one chip.

The transceiver (e.g., UE receiver 2400 or UE transmitter 2410) may transmit or receive a signal to or from a BS. Here, the signal may include control information and data. To this end, the transceiver 2400 or 2410 may include a radio frequency (RF) transmitter for up-converting and amplifying a frequency of signals to be transmitted, and an RF receiver for low-noise-amplifying and down-converting a frequency of received signals. However, this is merely an example of the transceiver 2400 or 2410, and elements of the transceiver 2400 or 2410 are not limited to the RF transmitter and the RF receiver.

Also, the transceiver 2400 or 2410 may receive signals through wireless channels and output the signals to the processor 2405, and may transmit signals output from the processor 2405, through wireless channels.

The memory may store programs and data required for the UE to operate. Also, the memory may store control information or data included in a signal transmitted or received by the UE. The memory may include any or a combination of storage media such as read-only memory (ROM), random access memory (RAM), a hard disk, a compact disc (CD)-ROM, a digital versatile disc (DVD), or the like. Also, the memory may include a plurality of memories.

Also, the processor 2405 may control a series of processes to allow the UE to operate according to the embodiments of the disclosure. For example, the processor 2405 may control elements of the UE to receive DCI consisting of two layers so as to simultaneously receive a plurality of PDSCHs. The processor 2405 may be provided in a multiple number, and may perform an element control operation of the UE by executing a program stored in the memory.

Figure 25:
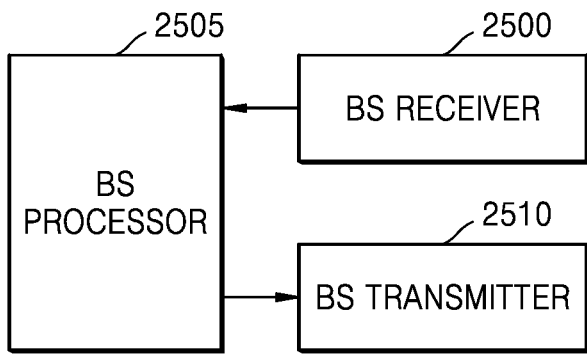
FIG. 25 is a diagram illustrating a structure of a BS in a wireless communication system according to an embodiment of the disclosure.

FIG. 25 is a diagram illustrating a structure of a BS in a wireless communication system according to an embodiment of the disclosure.

Referring to FIG. 25, the BS may include a transceiver collectively referring to a BS receiver 2500 and a BS transmitter 2510, a memory (not shown), and a BS processor (or a BS controller or a processor) 2505. According to the communication method of the BS described above, the transceiver (e.g., BS receiver 2500 or BS transmitter 2510), the memory, and the BS processor 2505 of the BS may operate. However, elements of the BS are not limited to the example above. For example, the BS may include more elements than those described above or may include fewer elements than those described above. In addition, the transceiver 2500 or 2510, the memory, and the processor 2505 may be implemented as one chip.

The transceiver 2500 or 2510 may transmit or receive a signal to or from a UE. Here, the signal may include control information and data. To this end, the transceiver 2500 or 2510 may include a RF transmitter for up-converting and amplifying a frequency of signals to be transmitted, and an RF receiver for low-noise-amplifying and down-converting a frequency of received signals. However, this is merely an example of the transceiver 2500 or 2510, and elements of the transceiver 2500 or 2510 are not limited to the RF transmitter and the RF receiver.

Also, the transceiver (e.g., BS receiver 2500 or BS transmitter 2510) may receive signals through wireless channels and output the signals to the processor 2505, and may transmit signals output from the processor 2505, through wireless channels.

The memory may store programs and data required for the BS to operate. Also, the memory may store control information or data included in a signal transmitted or received by the BS. The memory may include any or a combination of storage media such as ROM, RAM, a hard disk, a CD-ROM, a DVD, or the like. Also, the memory may include a plurality of memories.

Also, the processor 2505 may control a series of processes to allow the BS to operate according to the embodiments of the disclosure. For example, the processor 2505 may configure a plurality of pieces of DCI consisting of two layers and including allocation information associated with a plurality of PDSCHs, and may control each element to transmit the DCI. The processor 2505 may be provided in a multiple number, and may perform an element control operation of the BS by executing a program stored in the memory.

The methods according to the embodiments of the disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

According to embodiments of the disclosure, a service may be further effectively provided in a mobile communication system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined to be implemented, when required. For example, the BS and the UE may be operated in a manner that portions of an embodiment of the disclosure are combined with portions of another embodiment of the disclosure. For example, the BS and the UE may be operated in a manner that portions of a first embodiment of the disclosure are combined with portions of a second embodiment of the disclosure. Also, although the embodiments are described based on a frequency division duplex (FDD) LTE system, modifications based on the technical scope of the embodiments may be applied to other communication systems such as a time division duplex (TDD) LTE system, a 5G or NR system, or the like.

The description order of the method of the disclosure as in the drawings may not exactly correspond to actual execution order, but may be performed reversely or in parallel.

In the drawings for describing the methods of the disclosure, some components may be omitted and only some components may be shown within a range that does not deviate the scope of the disclosure.

In the disclosure, a method may be performed by combining some or all of the contents included in each of the embodiments of the disclosure within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

transmitting, to a base station (BS), UE capability for a physical downlink shared channel (PDSCH) reception;

receiving, from the BS, configuration information related to downlink control information (DCI);

receiving, from the BS, the DCI repeatedly based on the configuration information;

identifying whether a transmission configuration indication (TCI) state field is included in the DCI;

determining whether a PDSCH scheduled by the DCI is based on a single-transmission and reception point (TRP) or a multi-TRP;

in response to identifying that the TCI state field is not included in the DCI and determining that the scheduled PDSCH is a multi-TRP based PDSCH, determining TCI states for the multi-TRP based PDSCH based on a first TCI state and a second TCI state of a lowest codepoint having two TCI states among TCI states activated for the scheduled PDSCH; and receiving, from the BS, the scheduled PDSCH based on the determined TCI states.

2. The method of claim 1, wherein the configuration information related to the DCI is determined based on the UE capability for the PDSCH reception.

3. The method of claim 1, wherein the UE capability for the PDSCH reception includes at least one of:

information indicating that the UE can receive the multi-TRP based PDSCH, information indicating a method of distinguishing between a single-TRP based PDSCH and the multi-TRP based PDSCH, or information indicating a method of determining the TCI states for the multi-TRP based PDSCH.

4. The method of claim 1, wherein whether the scheduled PDSCH is based on the single-TRP or the multi-TRP is determined, based on at least one of:

a TCI state codepoint activated for the scheduled PDSCH, or higher layer signaling received from the BS.

5. The method of claim 1, wherein whether the scheduled PDSCH is based on the single-TRP or the multi-TRP is determined, based on at least one of:

a number of different TCI states of a control resource set (CORESET) associated with the repeated reception of the DCI, an index of the CORESET associated with the DCI, or an index of a search space pair associated with the DCI.

6. The method of claim 1, further comprising:

determining a TCI state for the scheduled PDSCH, based on at least one of:

a TCI state for a control resource set (CORESET) associated with the DCI, a TCI state codepoint activated for the scheduled PDSCH, or a TCI state configured in a bandwidth for reception of the scheduled PDSCH.

7. The method of claim 1, wherein the configuration information related to the DCI includes at least one of configuration information about a control resource set (CORESET) associated with the DCI or configuration information about a search space associated with the DCI.

8. The method of claim 1, wherein a TCI state for a control resource set (CORESET) having a lower index has a higher priority.

9. A user equipment (UE) in a wireless communication system, the UE comprising:

a transceiver configured to transmit or receive a signal to or from a base station (BS);

a memory; and a processor connected with the transceiver and the memory, the processor configured to:

transmit, to the BS, UE capability for a physical downlink shared channel (PDSCH) reception, receive, from the BS, configuration information related to downlink control information (DCI), receive, from the BS, the DCI repeatedly based on the configuration information, identify whether a transmission configuration indication (TCI) state field is included in the DCI, determine whether a PDSCH scheduled by the DCI is based on a single-transmission and reception point (TRP) or a multi-TRP, in response to identifying that the TCI state field is not included in the DCI and determining that the scheduled PDSCH is a multi-TRP based PDSCH, determine TCI states for the multi-TRP based PDSCH based on a first TCI state and a second TCI state of a lowest codepoint having two TCI states among TCI states activated for the scheduled PDSCH, and receive, from the BS, the scheduled PDSCH based on the determined TCI states.

10. The UE of claim 9, wherein the configuration information related to the DCI is determined based on the UE capability for the PDSCH reception.

11. The UE of claim 9, wherein the UE capability for the PDSCH reception includes at least one of:

information indicating that the UE can receive the multi-TRP based PDSCH, information indicating a method of distinguishing between a single-TRP based PDSCH and the multi-TRP based PDSCH, or information indicating a method of determining the TCI states for the multi-TRP based PDSCH.

12. The UE of claim 9, wherein whether the scheduled PDSCH is based on the single-TRP or the multi-TRP is determined, based on at least one of:

a TCI state codepoint activated for the scheduled PDSCH, or higher layer signaling received from the BS.

13. The UE of claim 9, wherein whether the scheduled PDSCH is based on the single-TRP or the multi-TRP is determined, based on at least one of:

a number of different TCI states of a control resource set (CORESET) associated with the repeated reception of the DCI, an index of the CORESET associated with the DCI, or an index of a search space pair associated with the DCI.

14. The UE of claim 9, wherein the processor is further configured to determine a TCI state for the scheduled PDSCH, based on at least one of:

a TCI state for a control resource set (CORESET) associated with the DCI, a TCI state codepoint activated for the scheduled PDSCH, or a TCI state configured in a bandwidth for reception of the scheduled PDSCH.

15. The UE of claim 9, wherein the configuration information related to the DCI includes at least one of configuration information about a control resource set (CORESET) associated with the DCI or configuration information about a search space associated with the DCI.

16. The UE of claim 9, wherein a TCI state for a control resource set (CORESET) having a lower index has a higher priority.

* * * * *